(12) United States Patent
Anfindsen

(10) Patent No.: US 6,751,617 B1
(45) Date of Patent: Jun. 15, 2004

(54) METHOD, SYSTEM, AND DATA STRUCTURES FOR IMPLEMENTING NESTED DATABASES

(75) Inventor: Ole Jorgen Anfindsen, Enebakk (NO)

(73) Assignee: Xymphonic Systems AS, Kjeller (NO)

( * ) Notice: Subject to any disclaimer, the term of this patent is extended or adjusted under 35 U.S.C. 154(b) by 92 days.

(21) Appl. No.: 09/628,728

(22) Filed: Jul. 28, 2000

Related U.S. Application Data

(60) Provisional application No. 60/143,378, filed on Jul. 12, 1999.

(51) Int. Cl.[7] .............................................. G06F 17/30
(52) U.S. Cl. .............................. 707/8; 710/200; 707/10
(58) Field of Search .......................... 707/104.1, 103 R, 707/8, 1, 4, 10; 711/100; 710/200

(56) References Cited

U.S. PATENT DOCUMENTS

| | | | | |
|---|---|---|---|---|
| 4,965,719 A | | 10/1990 | Shoens et al. ............... | 711/100 |
| 5,062,038 A | * | 10/1991 | Jordan, Jr. .................. | 710/200 |
| 5,226,143 A | | 7/1993 | Baird et al. ................. | 711/145 |
| 5,414,839 A | * | 5/1995 | Joshi ............................. | 707/8 |
| 5,551,046 A | | 8/1996 | Mohan et al. ................. | 707/8 |
| 5,983,225 A | | 11/1999 | Anfindsen ..................... | 707/8 |
| 6,044,370 A | | 3/2000 | Anfindsen ..................... | 707/4 |

OTHER PUBLICATIONS

"Transaction Processing: Concepts and Techniques", Jim Gray and Andreas Reuter, Morgan Kaufmann Publishers, Inc., 1993, pp. 449–485.

"Parameterized access modes in Apotram", Ole Jørgen Anfindsen, Telektronikk, vol. 91(4), 1995, pp. 153–162.

"Using Apotram to alleviate problems in distributed database systems", Ole Jørgen Anfindsen, Telektronikk, vol. 91(4), 1995, pp. 163–170.

"Locking in OODMBS Clients Supporting Nested Transactions", L. Daynes, O. Gruber and P. Valduriez, In Proc. Of the 11th Int. Conf. On Data Engineering, Taipei Taiwan, Mar. 1995, pp. 316–323.

"Dynamic Cooperation between Database Transactions by means of Generalized Isolation Levels", Ole Jørgen Anfindsen, Concurrent Engineering: A Global Perspective, CE95 Conference, 1995, pp. 249–260.

"Cooperative Work for Support in Engineering Environments by Means of Nested Databases", Ole Jørgen Anfindsen Proceedings of CEEDA, Poole, UK, Jan. 18–19, 1996, pp. 325–330.

"Cooperative work support in multimedia conferences by means of nested databases", Ole Jørgen Anfindsen, Proceedings of IFIP/ICCC, INDC '96, Trondheim, Norway, 1996, pp. 317–326.

(List continued on next page.)

*Primary Examiner*—Jean M. Corrielus
*Assistant Examiner*—Gwen Liang
(74) *Attorney, Agent, or Firm*—Oblon, Spivak, McClelland, Maier & Neustadt, P.C.

(57) ABSTRACT

A method and system for processing and managing requests for concurrent use of data. Nested databases are utilized in order to create different environments in which the data can be accessed and modified. For each transaction which is in existence, there is an indication or reference to a database or subdatabase associated with that transaction. There are also data structures which indicate, for each data item at issue, which database or subdatabase is associated with that item. The use of data structures relating the transactions, subdatabases, and data items allows the creation of spheres of control for the various transactions and subdatabases. Thus, data can be readily shared among a plurality of users. The creation of the subdatabases does not require plural copies of data and the database management system may be implemented using one copy of the data, although multiple copies may be utilized, if desired.

33 Claims, 34 Drawing Sheets

OTHER PUBLICATIONS

"Supportive Cooperative Work in Multimedia Conferences by means of Nested Databases", Ole Jørgen Anfindsen, Proceedings of Norwegian Computer Science Conference—NIK '96, Alta, Norway, Nov. 18–20, 1996, pp. 1–12.

"Apotram—an Application–Oriented Transaction Model", Doctor Scient Thesis, Ole Jørgen Anfindsen, Research Report 215, 1997, pp. i–xii; 1–124.

Letter for Intent for EPM Technology and Apotram AS, translated from Norwegian, dated, Oslo, Feb. 26, 1999.

Non–Disclosure Agreement between Apotram AS and EPM Technology, translated from Norwegian, dated, Oslo, Feb. 26, 1999, pp 1–2.

Provisional Application to The Research Council of Norway for Grant to R&D Based It–Project from Apotram AS, Kjeller and EPM Technology AS, Oslo, translated from Norwegian, dated Kjeller, Mar. 13, 1999, pp. 1–4.

Standard Contract for funding of R&D projects between The Research Council of Norway and Apotram AS, translated from Norwegian, May 1999, pp. 1–4.

Collaboration Agreement between Apotram AS and EPM Technology AS, translated from Norwegian, dated, Oslo, Apr. 12, 1999, pp. 1–6.

"Dynamically Cooperating Database Transactions", Ole Jørgen Anfindsen, Proceedings of Norwegian Computer Science Conference—NIK '95, Gran, Norway, Nov. 20–22, 1995, pp. 233–244.

* cited by examiner

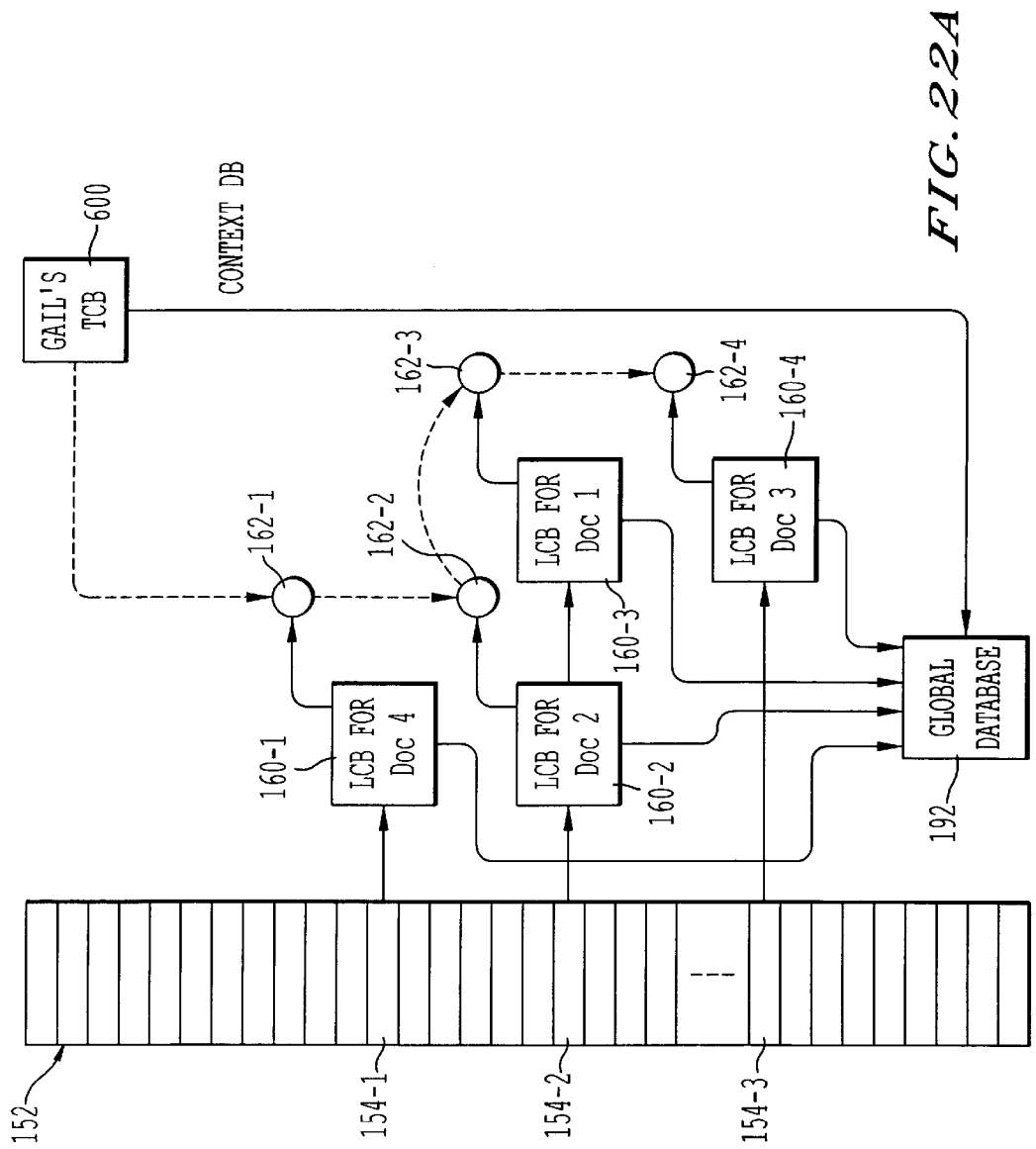

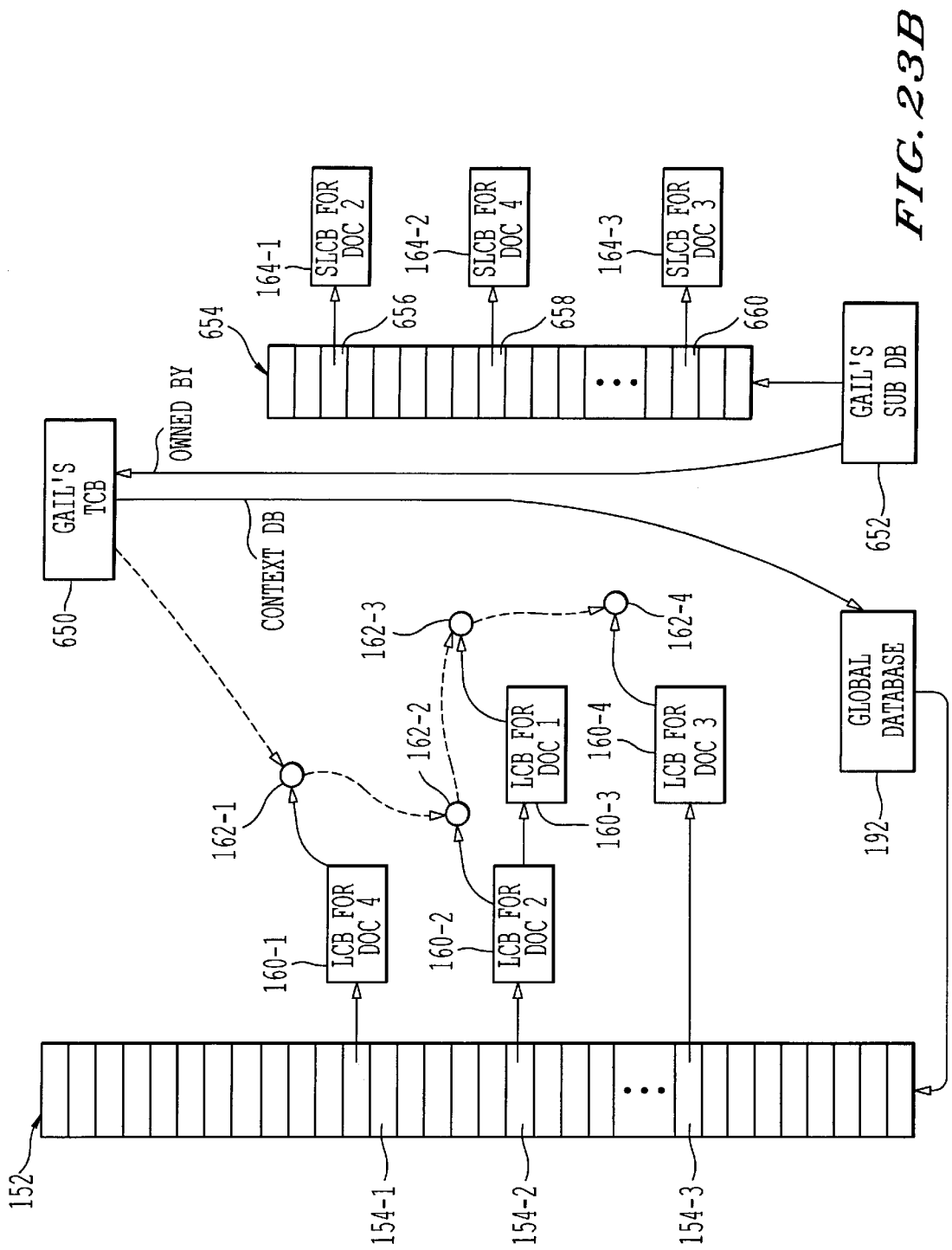

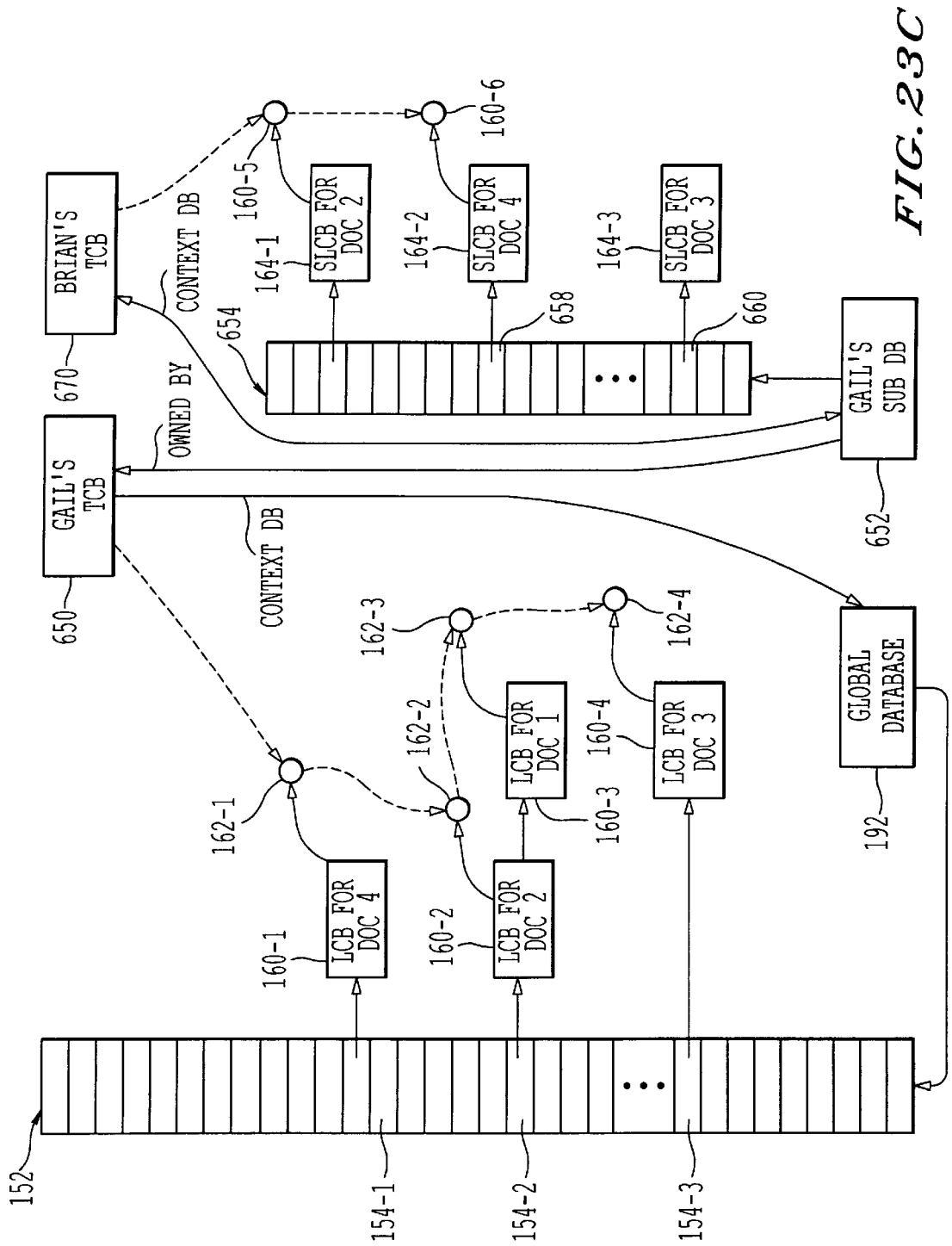

710

GAIL'S TEXT EDITOR

SECTION 1

This is section 1 text. This is section 1 text. This is section 1 text. This is section 1 text. This is section 1 text. This is section 1 text. This is section 1 text. This is section 1 text. This is section 1 text. This is section 1 text. This is ...

SECTION 2

This is section 2 text. This is section 2 text. This is section 2 text. This is section 2 text. This is section 2 text. This is section 2 text. This is section 2 text. This is section 2 text. This is section 2 text. This is section 2 text. This is ...

SECTION 3

This is section 3 text. This is section 3 text. This is section 3 text. This is section 3 text. This is section 3 text. This is section 3 text. This is section 3 text. This is section 3 text. This is section 3 text. This is section 3 text. This is ...

SECTION 4

This is section 4 text. This is section 4 text. This is section 4 text. This is section 4 text. This is section 4 text. This is section 4 text. This is section 4 text. This is section 4 text. This is section 4 text. This is section 4 text. This is ...

GAIL'S TEXT EDITOR

SECTION 1

This is section 1 text. This is section 1 text. This is section 1 text. This is section 1 text. This is section 1 text. This is section 1 text. This is section 1 text. This is section 1 text. This is section 1 text. This is section 1 text. This is ...

SECTION 2

This is section 2 text. This is section 2 text. This is section 2 text. This is section 2 text. This is section 2 text. This is section 2 text. This is section 2 text. This is section 2 text. This is section 2 text. This is section 2 text. This is ...

SECTION 3

This is section 3 text. This is section 3 text. This is section 3 text. This is section 3 text. This is section 3 text. This is section 3 text. This is section 3 text. This is section 3 text. This is section 3 text. This is section 3 text. This is ...

SECTION 4

This is section 4 text. This is section 4 text. This is section 4 text. This is section 4 text. This is section 4 text. This is section 4 text. This is section 4 text. This is section 4 text. This is section 4 text. This is section 4 text. This is ...

BRIAN'S TEXT EDITOR

SECTION 1

This is section 1 text. This is section 1 text. This is section 1 text. This is section 1 text. This is section 1 text. This is section 1 text. This is section 1 text. This is section 1 text. This is section 1 text. This is section 1 text. This is section 1 text. This is ...

SECTION 2

This is section 2 text. This is section 2 text. This is section 2 text. This is section 2 text. This is section 2 text. This is section 2 text. This is section 2 text. This is section 2 text. This is section 2 text. This is section 2 text. This is section 2 text. This is ...

SECTION 3

This is section 3 text. This is section 3 text. This is section 3 text. This is section 3 text. This is section 3 text. This is section 3 text. This is section 3 text. This is section 3 text. This is section 3 text. This is section 3 text. This is section 3 text. This is ...

SECTION 4

This is section 4 text. This is section 4 text. This is section 4 text. This is section 4 text. This is section 4 text. This is section 4 text. This is section 4 text. This is section 4 text. This is section 4 text. This is section 4 text. This is section 4 text. This is ...

Fig. 24C

METHOD, SYSTEM, AND DATA STRUCTURES FOR IMPLEMENTING NESTED DATABASES

This is a continuation of provisional application of 60/143,378 filed on Jul. 12, 1999.

BACKGROUND OF THE INVENTION

1. Field of the Invention

The present invention relates generally to database management systems. The invention is more particularly related to data management systems and transaction processing systems that utilize a lock manager for protecting database resources from incompatible uses. The invention is still further related to the manner of implementing a database management system which allows the use of nested databases based on computer data structures which are stored in a memory. Moreover, the invention is related and applicable to any system which provides concurrent access to shared data.

2. Discussion of the Background

When two people or entities desire access to information within a database or other location at the same time, or desire to write data into a database related to the same information at or around the same time, there is an inherent conflict and problem which exists. These problems can occur in any type of application where data is shared, and word processing and engineering design are two areas in which such simultaneous access occurs, although this invention is applicable to any setting or situation where there is a desire to use the same data by more than one entity.

In a database management system, ACID ("Atomicity, Consistency, Isolation, Durability") properties are desirable.

Atomicity means that either the results of the transaction (i.e., changes to the database) are all properly reflected in the database, or none of them are. Generally, a transaction is said to commit or abort. When a transaction commits, all changes made to the database by the transaction are durably stored, leaving the database in a consistent state. When a transaction aborts, any changes made to the database by the transaction are backed out, once again leaving the database in a consistent state.

Consistency means that each transaction commits only legal results to the database. Thus a transaction must bring the database from one consistent state to another consistent state.

Isolation means that events within a transaction must be hidden from other transactions running concurrently. Concurrent transactions must not interfere with each other. They execute as if they had the database to themselves.

Durability means that once a transaction has been completed and has committed its results to the database, the system must guarantee that these results survive any subsequent malfunctions.

While the above ACID properties are highly desirable, having multiple writers of the same data usually requires a compromise with regard to the ACID properties. It is extremely difficult to ensure transactional properties, and at the same time also allow everyone or each transaction to do whatever he, she or it needs to do, whenever he, she or it would like to. Simply allowing another to access data while the data is in use poses an inherent conflict to the ACID properties.

SUMMARY OF THE INVENTION

Accordingly, it is an object of the invention to allow multiple entities to access the same data. It is a further object of the invention to lock the data in a multiuser environment such that, to the extent possible, the ACID properties are maintained. It is yet another object of the invention to have a database management system in which multiple users or entities have access to the data through different databases, which may be referred to as databases, virtual databases, or subdatabases. It is a still further object of the invention to provide a database management system and/or the data structures thereof which allow the implementation of the subdatabases or virtual databases.

These and other objects are accomplished by a memory including data structures, a method, system, and computer program product which allow concurrency control and locking of data in a multiuser environment. For transactions which are in existence, there is an association or reference to a database or subdatabase associated with that transaction. This data structure related to the transaction may be referred to as a transaction control block. Data structures, which are referred to herein as database control blocks, indicate which database or subdatabase relates to a data item. Moreover, there is a data structure related to the actual lock of the data, referred to as a lock control block, and/or a lock request block. The association among the various data structures allows the implementation of the concept of nested databases, subdatabases or virtual databases. For example, the data structure arrangement preferably allows there to be a determination as to the context database of a particular transaction, and also the subdatabases under that transaction. Further, the data structure related to the transaction may also contain references to granted and pending lock requests which may be represented by the data structures relating to locks of the data. The data structures related to the virtual databases, the database control blocks, are referenced by the locking data structures so that it can be determined to which database or subdatabase the lock relates.

In accordance with one embodiment of the invention, there is a memory for storing data for access by a data processing system. This data is not necessarily the data item which the end user ultimately desires, but may be the data related to the data structures indicating the locking and subdatabase information. The memory includes a data structure including information of a transaction. This data structure is preferably implemented as a transaction control block. The memory further includes a data structure including information of a lock of data of the transaction. This data structure may be referred to as a lock control block and/or a lock request block. Further, there is a plurality of data structures including information of a plurality of databases. These data structures related to the databases may be referred to as database control blocks. The database control blocks are utilized to associate a particular database or subdatabase with a lock and transaction, or vice versa, in order to properly control the nested or subdatabases.

The invention also relates to the creation and use of the data structures which implement the concept of the nested databases or subdatabases. A method of indicating that a data item is locked includes the steps of creating in a first hierarchical level, a data structure indicating that the data item is locked by a first transaction associated with the first hierarchical level. Further, the method includes a step of creating, at a second hierarchical level, a data structure indicating that the data item is locked by a second transaction associated with a second hierarchical level. Thus, the above steps create a hierarchy of locking controlled data structures, such as lock control blocks. Each level in the hierarchy may be utilized by a different database, subdatabase, or virtual database.

In order to gain access to a data item, it must first be determined if there is an existing lock on that data item. This may be performed by the steps of (a) determining if a lock for the data item exists at a first hierarchical level, and (b) creating a lock for the data item at the first hierarchical level when step (a) determines that the lock for the data item does not exist. There is a step (c) for determining if a lock for the data item exists at a second level when step (a) determines that the lock for the data item does not exist. Further, there is a step (d) of creating a lock on the data item, when a lock on the data item does not exist at the second hierarchical level.

In addition to the method steps for performing the above functionality, the invention includes a system having various means for carrying out the above functionality. Moreover, the invention still further includes a computer program product including executable instructions for carrying out the methodology of the invention.

BRIEF DESCRIPTION OF THE DRAWINGS

A more complete appreciation of the invention and the attendant advantages thereof will become better understood with reference to the following drawings in which:

FIGS. 22A–22D respectively correspond to FIGS. 21A–21D and show the data structure arrangements as the example of FIGS. 21A–21D is carried out; and FIGS. 23A–23D respectively correspond to the example of FIGS. 21A–21D but utilize a data structure arrangement in which there is a search table or array for each database; and FIGS. 24A–24D illustrate and example of the sharing of sections of a document by multiple people having different read and write capabilities by utilization of nested databases.

DESCRIPTION OF THE PREFERRED EMBODIMENTS

Figure 1:
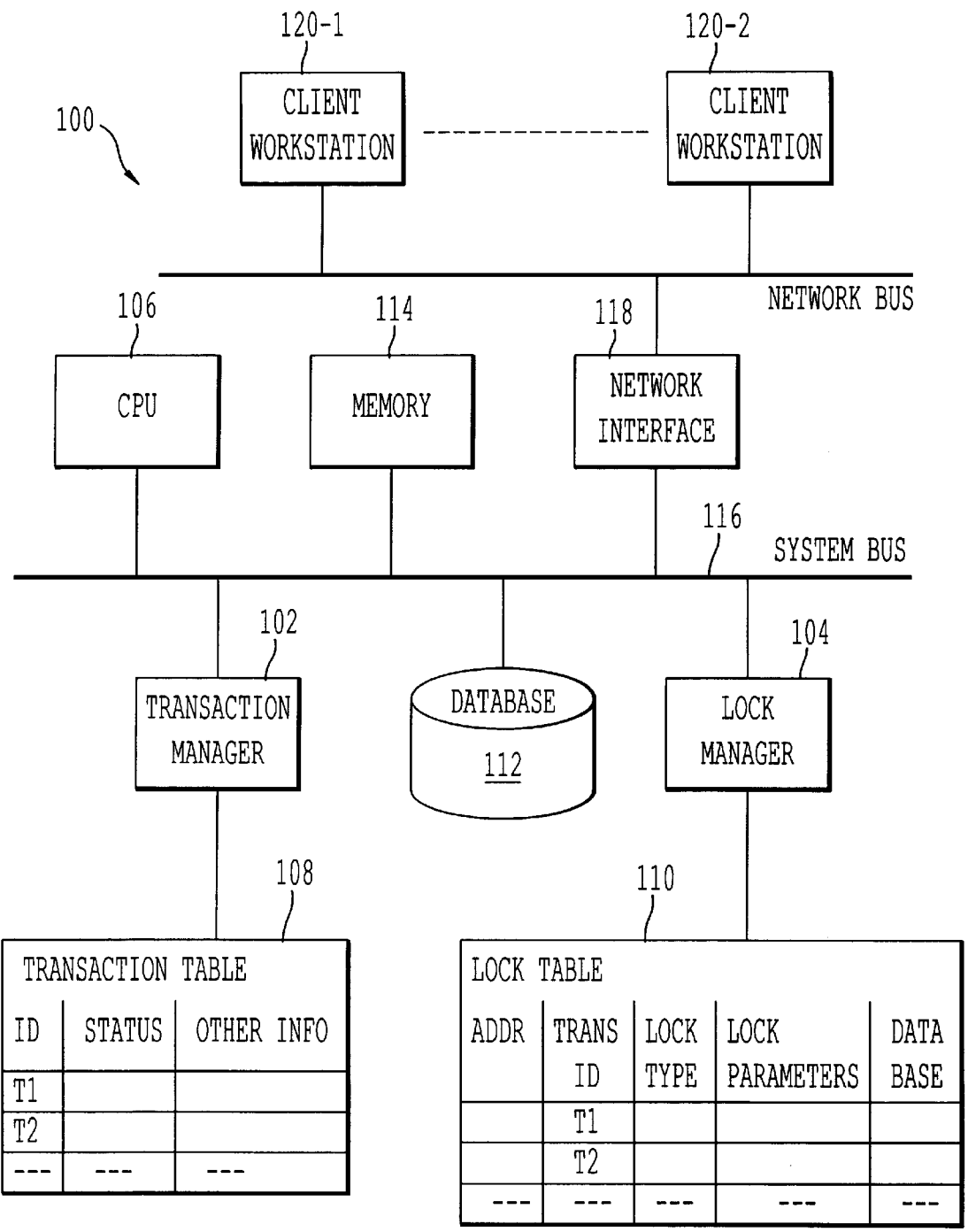
FIG. 1 is a block diagram of database management system implementing the present invention.

Referring now to the drawings, wherein like reference numerals designate identical or corresponding parts throughout the several views, and more particularly to FIG. 1 thereof, there is illustrated a database management system ("DBMS") 100. Transaction operation and management are handled by a transaction manager 102 and a lock manager 104, both of which are software procedures executed by the system's data processor(s) or CPU 106. The transaction manager maintains a transaction table 108, sometimes implemented as a tree structure, for keeping track of the identity and status of pending transactions. The lock manager 104 maintains a lock table 110, usually implemented using a hash table and various linked lists and/or tree structures (which will be discussed in more detail below). The lock table 110 keeps track of locks that have been requested on resources in a database 112. The lock table 110 may store information related to a memory address of a transaction, a transaction identification, a type or mode of lock, parameters of the lock, and the database or subdatabase which is associated with the lock. The database 112 stores data that is accessible to transactions executed by the DBMS 100. The database 112 is not required to store persistent data, although this may be the usual case. As an alternative, the stored data could be transient. Thus, the transactions that are collaboratively working on the contents of a database could be manipulating data resources that live only for a few minutes, hours, or days, and will cease to exist when the system is taken away or shut down.

The DBMS 100 will typically also include additional memory resources 114, one or more system busses 116 for interconnecting the various parts of the system, and a network interface 118 or other communications interface for handling communications with client workstations 120. The memory 114 may be implemented using any type of memory including but not limited to random access memory, and is preferably both readable and writeable. Moreover, the memory 114 may be utilized to store the data structures of the present invention. While FIG. 1 illustrates one possible implementation of the invention, any desired hardware and software can be utilized to achieve the functionality of the invention. For example, the invention may be implemented using any type of computer, computer server, and/or personal computer and/or hardware running any desired operating system. The components, structure, and operation of such hardware are well known.

Figure 2:
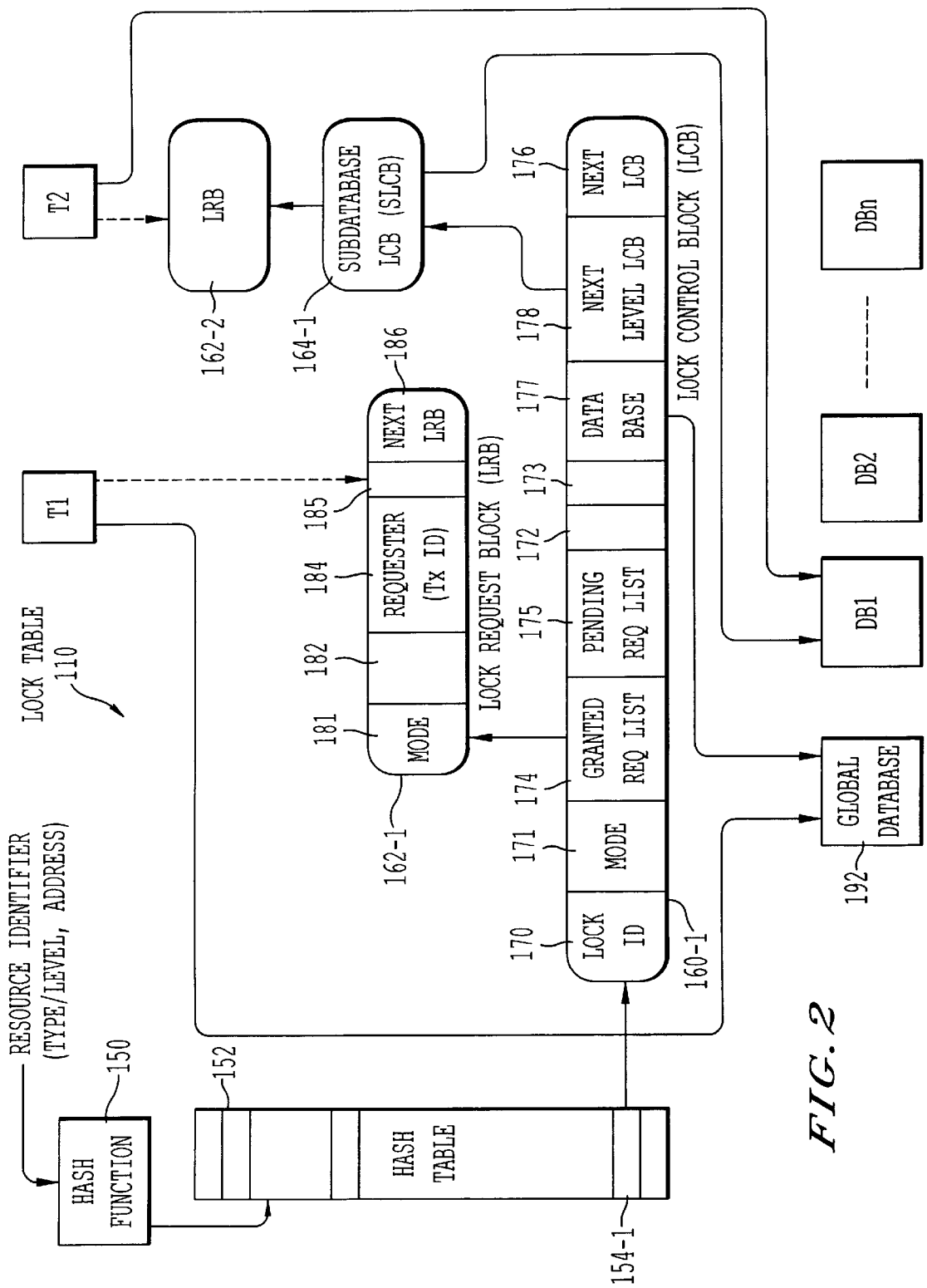
FIG. 2 illustrates data structures for keeping track of resources which are divided into subdatabases.

Referring to FIG. 2, the "lock table" 110 in a preferred embodiment is implemented as follows. A hash function 150 is used to convert a resource identifier ("RID") into a hash table address in a hash table 152 which may be implemented to have fixed size. The resource identifier that is hashed by function 150 may include a resource type or level indicator (e.g., indicating whether the resource to be locked is a database, table, page, tuple or other) and the starting address of the resource. Each addressable slot 154, such as reference 154-1 of the hash table includes either a null value if there are no locked resources corresponding to that slot's hash table address, or a pointer to a list of lock control blocks (LCB's) 160 such as LCB 160-1, if there is at least one locked resource whose hash value corresponds to that slot's hash table address.

The lock manager will allocate (i.e., generate and store) one lock control block ("LCB") 160 for each lockable data item that is actually locked, and will allocate (i.e., generate and store) one lock request block ("LRB") 162, such as LRB 162-1, for each lock held by a transaction. Thus, if a particular database object is locked by three different transactions at a given point in time, there will be one LCB 160 for that object and a linked list of three LRB's (one per transaction) "hanging" from that LCB.

Each LCB 160 preferably includes:
 a lock ID 170, which will typically include a copy of the resource identifier for a locked resource;
 a mode indicator 171 indicating the most restrictive access mode (e.g., browse, read, parameterized read, write, parameterized write, or exclusive) of all the locks granted on the database resource represented by this LCB;
 an optional read parameters indicator 172, preferably in the form of a bitmap, representing the logical OR of the read parameters being used by the parameterized read locks (if any) outstanding on the locked resource;
 an optional write parameters indicator 173, preferably in the form of a bitmap, representing the write parameters of the parameterized write lock (if any) outstanding on the locked resource. Details of the read and write parameters indicators 172 and 173 further constitute an aspect of this invention and are described in detail in U.S. Pat. No. 5,983,225 to Anfindsen, which is incorporated by reference;
 a granted request list pointer 174 to a list of LRBs 162 for granted resource requests for the database resource represented by this LCB;
 a pending request list pointer 175 to a list (also called a queue) of LRBs 162 for pending (i.e., not yet granted) resource requests represented by this LCB;
 a database field 177 which is a reference to a database or subdatabase to which this LCB belongs. A feature of this invention is that the data may be divided into different databases, referred to herein as subdatabases, virtual databases, or as databases. By making such a division, it is possible to have multiple people or transactions using the same data. In such a system, the present inventor has determined that it is desirable to know to which database a lock belongs, and such information can be readily determined using the database 17 field. While this feature of the invention is implemented using a reference such as the database reference 177, other implementations are possible such as including the database name in the LCB. In FIG. 2, the database reference 177 refers to a Global Database 192. This Global Database 192 is the highest level database, and further subdatabases are referred to as DB1, DB2 . . . DBn. Further details of the use of subdatabases are explained below;
 a next level LCB reference 178 which indicates a subdatabase (a virtual or subdatabase at a different hierarchical level) lock control block, such as the subdatabase lock control block ("SLCB") 164-1. This reference refers to either null, or a subdatabase lock control block at a different hierarchical level. Further information about this field is set forth below; and
 a next LCB pointer 176 to the next LCB (if any) sharing the same hash address as this LCB.

The read and write parameters represented by fields 172 and 173 in LCB 160 are not essential to the present invention but represent a feature which may used together with, or separate from the subdatabase aspect of the present invention. Moreover, parameters 172 and 173 represent an extension by the present invention to the conventional access modes used by DBMSs. Each distinct value of a defined set of read/write parameter domain represents a corresponding data reliability classification or category. Thus a parameter domain having eight parameter values (each represented by a corresponding bit of an eight-bit parameter field) would allow for the definition of up to eight different data reliability classifications. In other embodiments of the present invention the parameters may be used to indicate properties of a database object other than "reliability," such as the type or identity of the application which holds a write lock on the object, or other information that can be used by applications to determine if they are willing to read the data despite the presence of a write lock on it.

Each LRB 162, representing one granted or pending lock request, preferably includes:
 a mode indicator 181, indicating the access mode (e.g., browse, read, parameterized read, write, parameterized write, or exclusive) in which the resource is being accessed or being requested by a particular transaction;
 a transaction identifier 184, which identifies the transaction that requested or holds the lock corresponding to this LRB;
 an optional parameters indicator 182, preferably in the form of a bit map, representing the read or write access mode parameters (if any) being used by the owner of this read or write lock; this field is used only if the owner of this lock or lock requested is using a parameterized access request. As with the parameters 172 and 173 of the lock control block, the parameters field 182 is not essential or necessary to implement the nested databases or subdatabase aspect of the invention;
 a lockset pointer 185 that is used to form a linked list of the LRB's owned by transaction, such as transaction T1, identified by the transaction ID 184. It is to be noted that the linked list of LRBs may be implemented to include further features such as being doubly linked lists to allow for tracing a chain of LRBs in two directions. Further alternatives of the LRBs are described below; and
 a Next LRB pointer 186 to the next LRB (if any) for the same database resource as this LRB.

Typical sizes for the read and write parameter fields in the LCB's and the access mode parameter field in the LRB's are one to two bytes, supporting eight to sixteen distinct parameter values.

The subdatabase LCB ("SLCB") 164-1 may be constructed in the same or similar fashion as the LCB 160-1. Thus, the subdatabase LCB 164 will be referred to as an SLCB in order to clearly indicated that the LCB is used to control the locking of access to data of a subdatabase. In FIG. 2, the reference or pointer from SLCB 164-1 to the subdatabase DB1 is the database reference 177, indicating that the SLCB 164-1 is associated with subdatabase DB1. In a similar manner, database reference 177 of LCB 160-1 refers to the Global Database 192. However, as the DBMS could be set up to have all LCBs, or at least the LCBs at the first level, reference the Global Database 192, it may be possible or preferable to eliminate the database reference field 177 from the LCBs.

It is to be noted that throughout this specification, the drawings illustrate what appear to be pointers which point from one field to another item in the figure. These pointers are not limited to conventional computer pointers but may be implemented as any type of reference or tree structure. Additionally, information which is referenced may alternatively be contained in the data structure itself. Therefore, instead of having field 177 reference the Global Database 192, it is possible to put the information related to the Global Database 192 into the database field 177. It will be explained in more detail below but it should be noted that the various databases including the Global Database 192 and the subdatabases DB1, DB2, . . . , DBn are database control blocks ("DBCBs") and do not contain the data which the end user will ultimately desire, in the preferred embodiment. Instead, the database control block are utilized to indicate which database or subdatabase the lock or lock control block (or LCB) relate.

The SLCB 164-1 references LRB 162-2 which may be implemented to have the same structure as the LRB 162-1. FIG. 2 also illustrates two transaction control blocks T1 and T2. The transaction T1 is associated with the Global Database whereas the transaction T2 is associated with subdatabase DB1. Moreover, it is seen that transaction T1 has a granted block request by referring to the LRB 162-1. Similarly, the transaction T2 references LRB 162-2, indicating the transaction T2 has a lock on the data associated with subdatabase DB1.

In the present invention, a main entity of the lock manager is the Lock Control Block ("LCB"). As in conventional database management systems, and LCB identifies a lockable resource, e.g., an object, a row (also known as a tuple) in a relational a table, or a record. Such resources are typically identified by an object ID ("OID"), tuple ID ("TID"), or a row/record ID ("RID"). For simplicity, the term RID will be used as a generic term for xID hereinafter.

In FIG. 2, a hash table is illustrated but the present invention is not limited to hash table implementations. The point of consideration is that it is desirable to use a RID to find the corresponding LCB, and a hash table is the preferred implementation. However, an array or other search-type structure may be implemented and the present invention is not limited to the use of hash tables.

If no lock is placed by any transaction on a given RID, then a convenient way to represent this would be simply not to have an LCB for that RID in the data structures. In other words, the LCBs that are reachable from the hash table merely represent a subset of all the lockable resources such as those that happen to be locked by at least one transaction at this point in time.

As an alternative to linking the LCBs in one direction, a doubly linked list can be implemented so that it is possible to trace a chain of LCBs in both directions. For each lockable resource, it is possible that there is a plurality of transactions holding a lock (or the lock) on the resource in question. Each granted or pending lock request is represented by a Lock Request Block ("LRB"). It is preferable for each LRB to refer back or reference its LCB. This feature may be not be included in the drawings for the interest of clarity and space. It is also possible for the LRB chains to be implemented using a doubly linked structure so that it is possible to trace the chain of LRBs in either direction. Moreover, it is also possible for the first LRB to reference the last LRB in a chain of LRBs. This increases performance whenever one needs to locate the end of a chain as fast as possible (e.g., when a new LRB should be inserted at the end of the pending list). For example, in order to implement this feature, in FIG. 3, the LRB 162-5 would reference the LRB 162-7.

Figure 3:
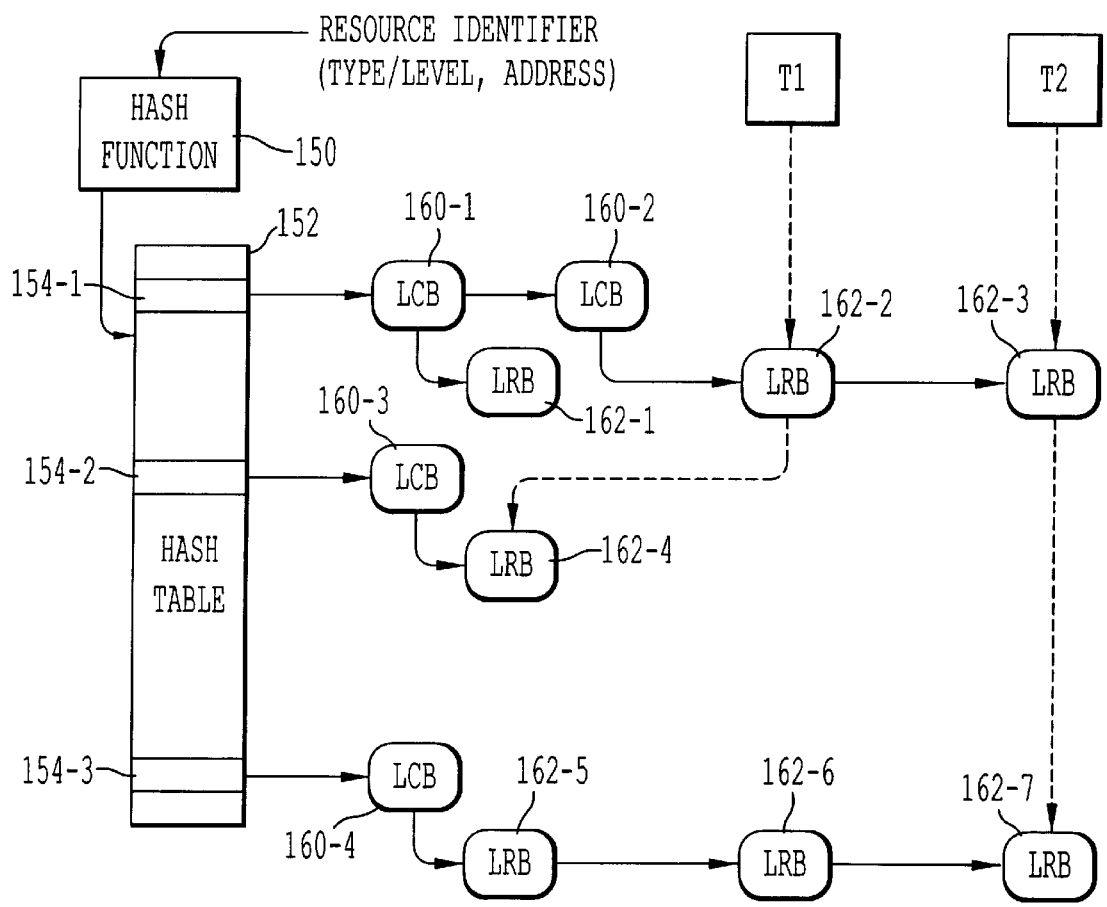
FIG. 3 illustrates a plurality of linked lock control blocks and lock request blocks.

FIG. 3 is an example set of data structures which may be utilized with the invention. However, the DBCBs have not been illustrated for clarity. The transaction control blocks ("TCBs") T1 and T2 represent transactions. A transaction can have many locks, and therefore many LRBs, while an LRB preferably belongs to only one transaction. For each TCB, a set of LRBs is maintained. In the figures, the dashed or broken line is utilized to represent the relationship between the LRBs, and from the TCBs to the LRBs. It is also possible for the LRBs to be constructed in a double linked list and further, the LRBs may be implemented such that each LRBs refers to its transaction control block. For example, in this case, each of the LRBs 162 of FIG. 3 would refer to one of the TCBs T1 or T2.

As should be apparent from the LCB and SLCB data structures of the present invention, an LCB is utilized to represent both a lockable resource and a database. In other words, an LCB now represents a lockable resource within a particular database (the Global Database or one of the subdatabases within it).

Figure 4:
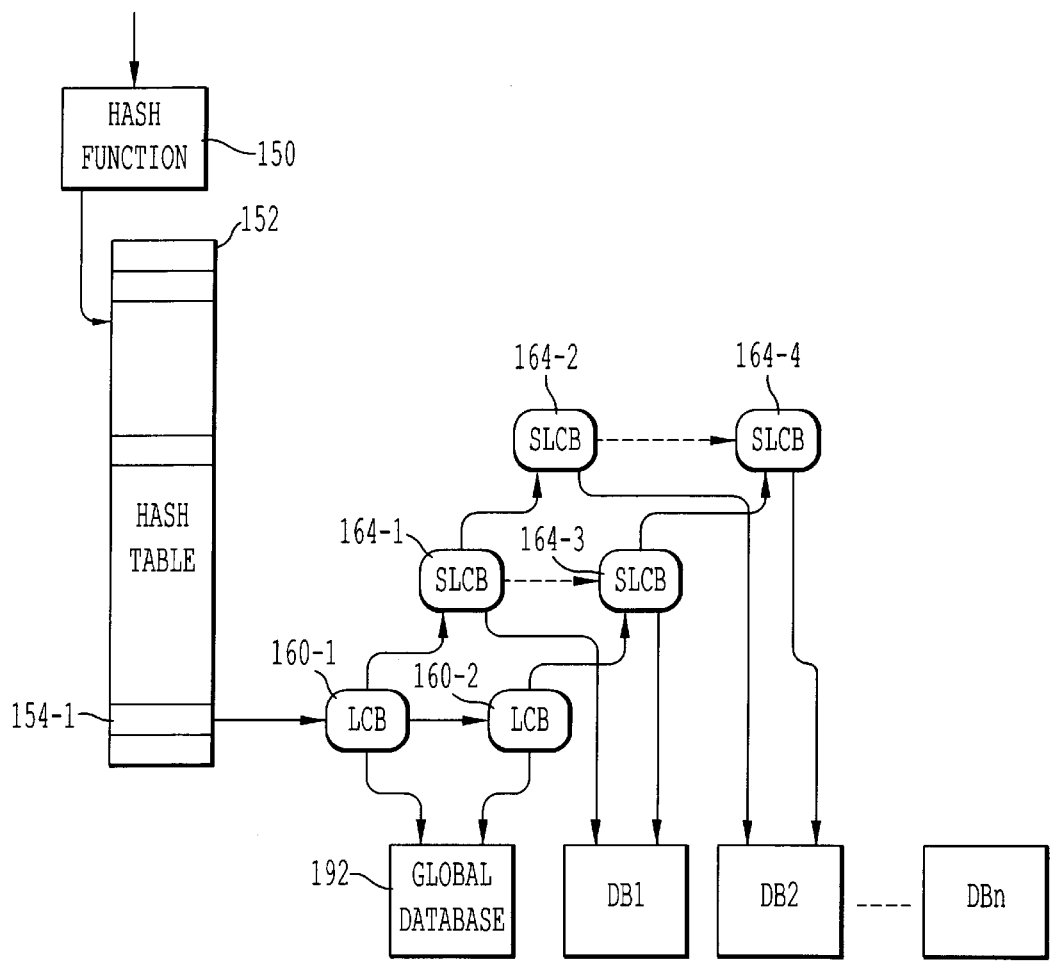
FIG. 4 illustrates data structures including subdatabase lock control blocks ("SLCBs") which are utilized to establish locks for data items within subdatabases.

FIG. 4 illustrates the data structures utilized for locking and is presented to show that each LCB (or SLCB) preferably relates to a single database, and therefore refers to a single database control block ("DBCB"). For example in FIG. 1, SLCB 164-1 references DB1, SLCB 164-2 references DB2, SLCB 164-3 references DB1, and SLCB 164-4 references DB2. If desired, it is possible to avoid having a database control block for the Global Database as each of the LCBs at the lowest hierarchical level belong to the Global Database and could be considered a default for the LCBs as well as for transactions. In that case, references from LCBs and TCBs would be used to indicate a relationship with the Global Database, as appropriate.

In FIG. 4, it is further shown how an arbitrary number of levels of subdatabases can be created. As explained above, it is possible to implement the SLCBs to have the same structure as the LCBs and such labeling has been done in this patent application merely to distinguish the LCBs for the subdatabases from the LCBs of the Global Database. However, some memory can be saved by implementing the SLCBs without the "next LCB reference" used to chain together LCBs. However, if desired, the SLCBs may be linked to one another in a single direction or doubly linked as desired. In FIG. 4, LCBs 160-1 and 160-2 are first level LCBs and are associated with the Global Database. SLCBs 164-1 and 164-3 are second level LCBs, or may be considered first level SLCBs. The SLCBs 164-2 and 164-4 are third level LCBs, or second level SLCBs. The optional link between the SLCBs at the same level is represented using a dashed or broken arrow or reference, and it is also possible for double linking to be implemented so that SLCB 164-3 could also reference SLCB 164-1.

Figure 5:
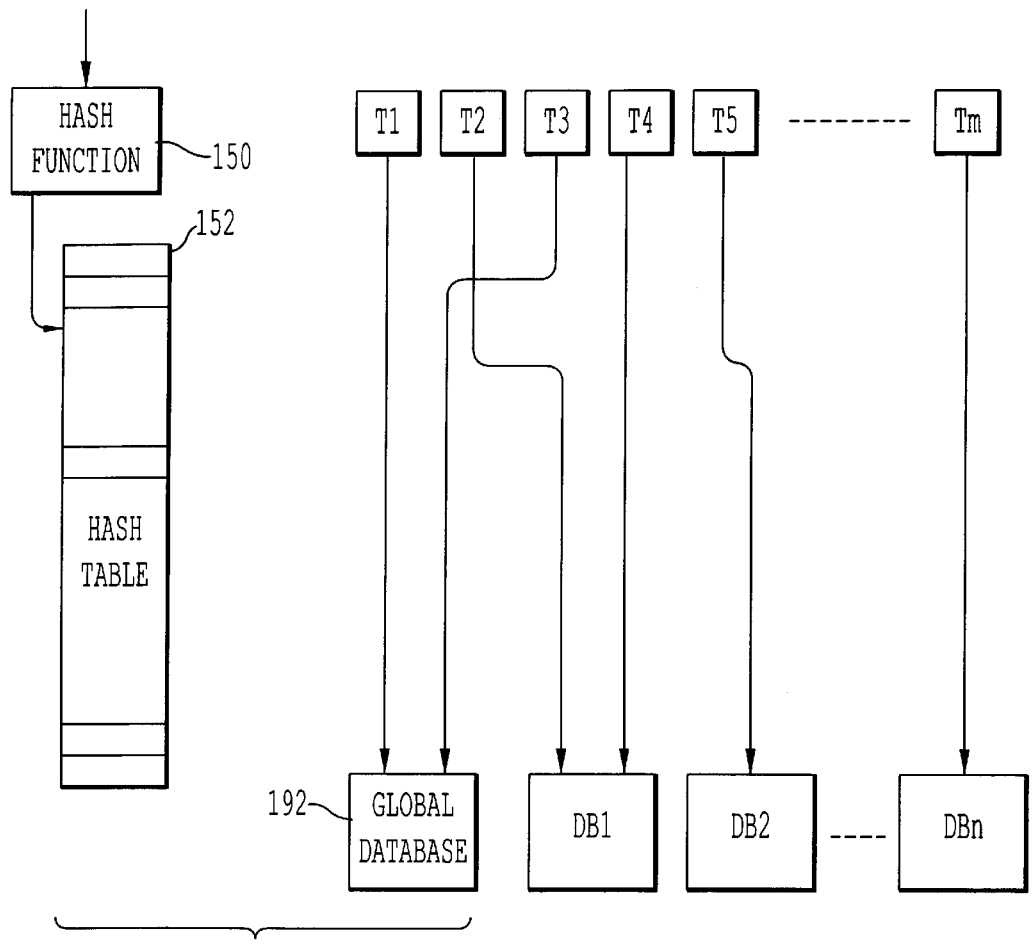
FIG. 5 illustrates that each transaction belongs to a particular database or subdatabase.

FIG. 5 illustrates that each transaction, in the preferred embodiment, belongs to a single database. The transaction control blocks T1, T2, T3, . . . , Tm each reference a single database control block. Thus, it is possible to determine the level of the database or subdatabase which is associated with a particular transaction.

Figure 6:
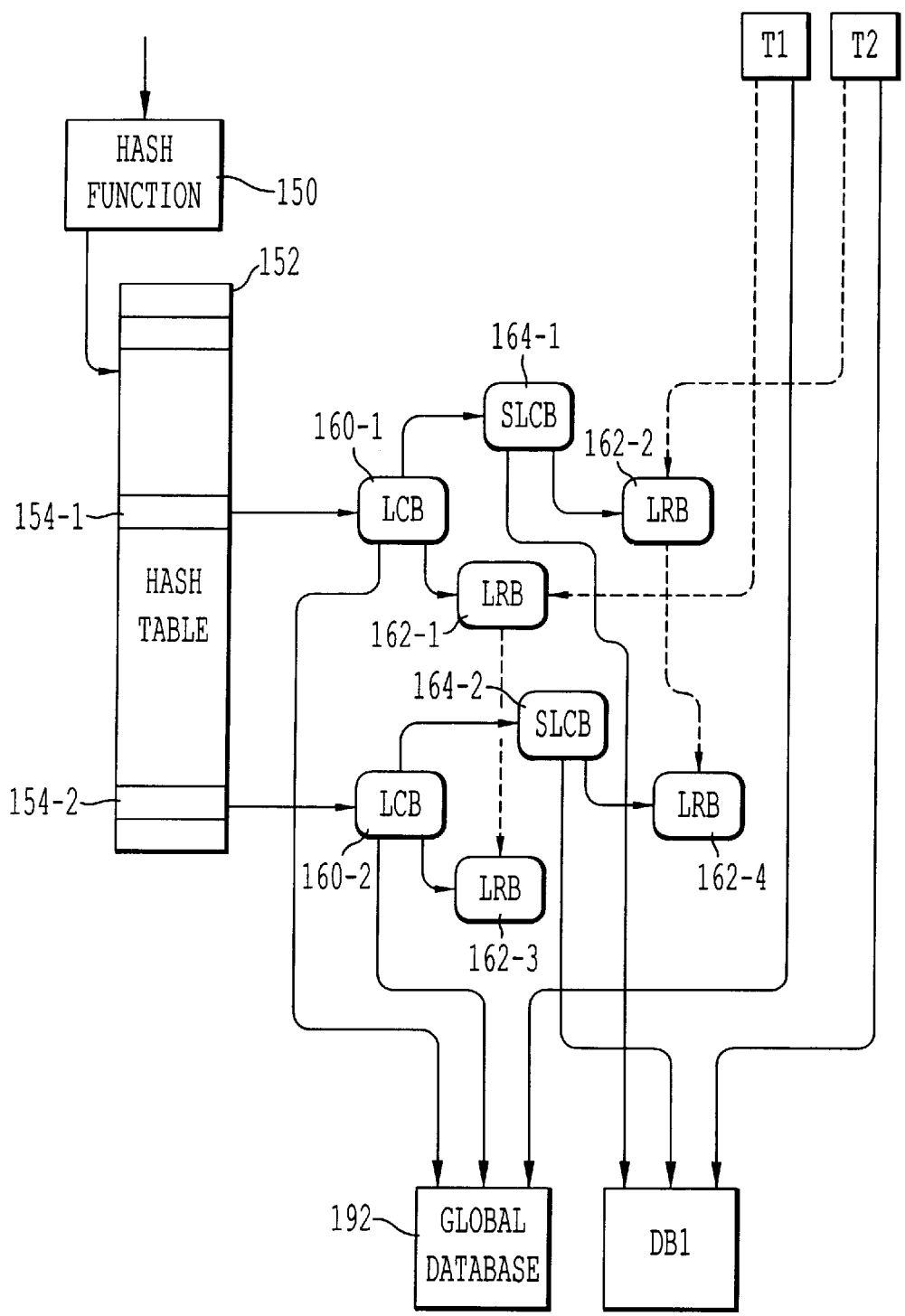
FIG. 6 illustrates that in this particular embodiment, a transaction can only access resources in its own database or subdatabase.

FIG. 6 illustrates exemplary data structures in which the preferred embodiment has transactions which only access resources within their own database. For example, it is seen that for transaction T1 which references the Global Database 192 using the solid arrow, transaction T1 also references, using arrows constructed with broken lines, LRBs 162-1 and 162-3 which are each associated with the first level or LCB level referenced by the Hash Table 152. Also, transaction T2 and its transaction control block reference or is part of subdatabase DB1, and further references, using the arrows constructed with broken lines, LRB 162-2 and 162-4 which are associated with the second LCB level or the first SLCB level and which correspond to DB1. In the preferred embodiment, a transaction executes within the context of one and only one database. Moreover, it is preferred that a transaction is prohibited from accessing resources not within the scope of that transaction's database. At the implementation level, this causes the LRBs of a transaction to belong to or be associated with LCBs (or SLCBs) that reference the same database control block as that transaction's transaction control block references. For example, in FIG. 6, T2 executes within DB1. Therefore, the LRBs of T2 (162-2 and 162-4) belong to the LCBs (SLCBs 164-1 and 164-2) that reference the same database, DB1.

Figure 7:
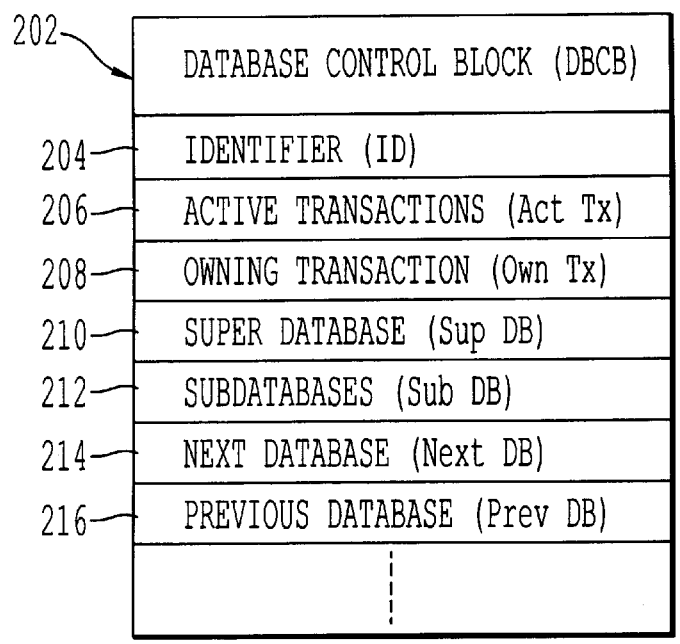
FIG. 7 illustrates an exemplary implementation of a database control block (DBCB) data structure.

FIG. 7 illustrates an exemplary implementation of the database control block ("DBCB"). In a preferred embodiment, there is no requirement for the DBCB to store the data which the end user ultimately desires, but a purpose of the DBCB is to indicate to which database or subdatabase a lock, as represented at least in part by the LCB or SLCB, belongs. In FIG. 7, the DBCB 202 includes an identifier field 204 which is abbreviated as ID. This field indicates the name or identification of the DBCB. An Active Transactions field 206, abbreviated Act Tx, enables one to trace from a DBCB to each transaction that is active at this point in time within the database or subdatabase in question. This is desirable, for example, if the owner of a subdatabase wishes to commit or terminate the subdatabase. The system should determine what are the active transactions of the subdatabase and if the list of active transactions is not empty, the owner of the subdatabase should get a warning indicating that there are others working within the subdatabase and questioning whether it is desirable to terminate their transactions at this point in time. It is desirable to give the entity responsible for terminating the subdatabase the possibility of changing the decision to terminate. Alternatively, the system could be implemented so that it is not permissible to terminate a subdatabase at a point in time when there are active transactions running inside of it. In this case, the transactions must be gone so that only when there are no active transactions will it be permitted to terminate the subdatabase. Without such checking, the system will cease to be transactional, and the properties of the database management system will not be desirable. The Active Transactions field 206 may contain a plurality of references, a single reference which is part of a linked list containing a list of all active transactions, or may contain the name or other identification of the active transactions. Additionally or alternatively, the Active Transactions field may be implemented using a doubly linked list which references each of the active transactions for the database or subdatabase at issue.

The owning transaction field 208, abbreviated as Own Tx, is a reference to the transaction that created and therefore owns the DBCB in question. For the Global Database, this field may be set to be a null reference and for the subdatabases, this field will reference its creator/owner transaction control block. A Super Database field 210, abbreviated as Sup DB, is a reference to the DBCB that represents the database of which this database is a part.

A Subdatabases field 212, abbreviated as Sub Db, is a reference to the set of DBCBs that represent the subdatabases of this database. A next database field 214, abbreviated Next DB, references the next DBCB within the same level in the database hierarchy. A Previous Database field 216, abbreviated as Prev DB, is a reference to the previous DBCB within the same level in the subdatabase hierarchy. The Next DB and the Prev DB fields are used to create a doubly linked list of DBCBs within a given level in the sub-database hierarchy. Thus, the subdatabases that have the same parent database may be linked together in such a list. The three dots or ellipses of the last field of the DBCB 202 represent that additional fields may be contained in the DBCB, as desired.

The purpose of the DBCB is to specifically and accurately indicate where in the resource hierarchy or the database hierarchy a specific thing such as a lock belongs. Thus, one is able to readily determine the relationships of the subdatabase to the rest of the system.

With regard to the DBCB discussed above and the transaction control block ("TCB") discussed in detail below, there are a number of fields contained within these data structures which may not be illustrated in every figure. In order to keep the number of references manageable and comprehensible, not every reference has been illustrated, or may be necessary. Thus, the fact that a diagram does not contain a reference should not be interpreted to mean that the reference is not there, and similarly, the fact that a data structure contains a specific reference or field should not be interpreted to have such a reference as an absolute requirement of the data structure. The DBCBs preferably form a hierarchy. However, alternative implementations are possible which do not have the DBCBs arranged in a hierarch.

Figure 8:
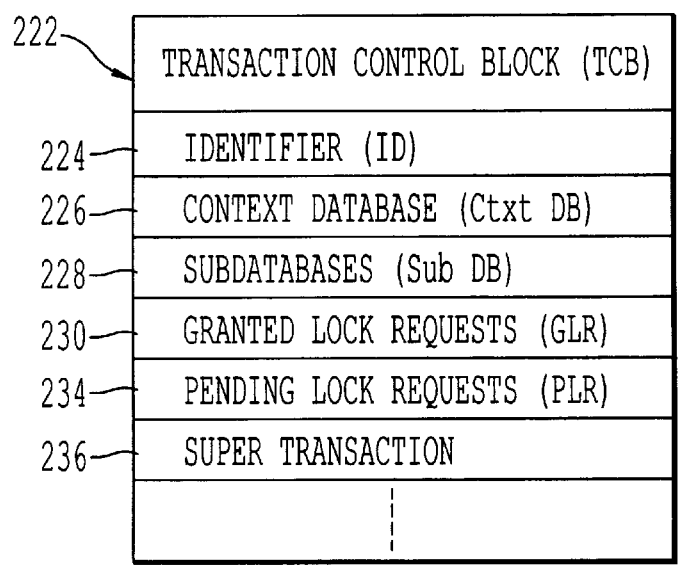
FIG. 8 illustrates an exemplary implementation of a transaction control block ("TCB") data structure.

FIG. 8 illustrates a Transaction Control Block ("TCB") data structure 222. This data structure is utilized in order to indicate the active transactions, indicate to what database or subdatabase level the transaction belongs, and/or to determine the locked resource and status of the locks of a transaction.

In a TCB, there is an Identifier field 224 which identifies, for example, the name of a transaction. A Context Database field 226, abbreviated Ctxt DB, is used to reference the DBCB of the database that represents the scope or context for the transaction in question. This may be determined at the time of transaction creation. In accordance with an embodiment of the invention, from the time a transaction is born until it is terminated, it lives its life and performs all its actions within a single database. The present invention operates efficiently and properly by utilizing, in the preferred embodiment, a rule which makes a transaction exist from the beginning to the end of its lifetime in a single context. Thus, the context database field 226 may be utilized to represent the scope or content of the transaction in question. For example, the context database field 226 may reference the Global Database, meaning the transaction corresponding to the TCB executes within the Global Database or has the Global Database as its context database.

The Subdatabases field 228 of FIG. 8 is utilized to represent a set of subdatabases that this transaction has created. Note that it is possible for this field to be empty or to reference null. A transaction can create and therefore own a number of subdatabases. Depending on what action is being performed, it may be desirable to determine how many subdatabases exist for a specific transaction. Therefore, when it becomes desirable to terminate a transaction, it is preferable to know what subdatabases exist before such a termination is performed. Similarly, it is desirable to know the subdatabases for the database control block, as explained above.

Field 230 represents the Granted Lock Requests of the TCB and field 234 represents the Pending Lock Requests of the TCB. These fields 230 and 234 may be implemented using references from TCBs to the LRBs, as illustrated in the figures, for example in FIG. 6.

The Super Transaction field 236 may be utilized, if desired, to maintain a hierarchy of transactions or TCBs. The super transaction field 236 will reference or point to a transaction which is higher in the hierarchy than the transaction at issue. For example, the transaction field 236 may be utilized to reference the transaction which has created or allowed the creation of the transaction at issue.

Figure 9:
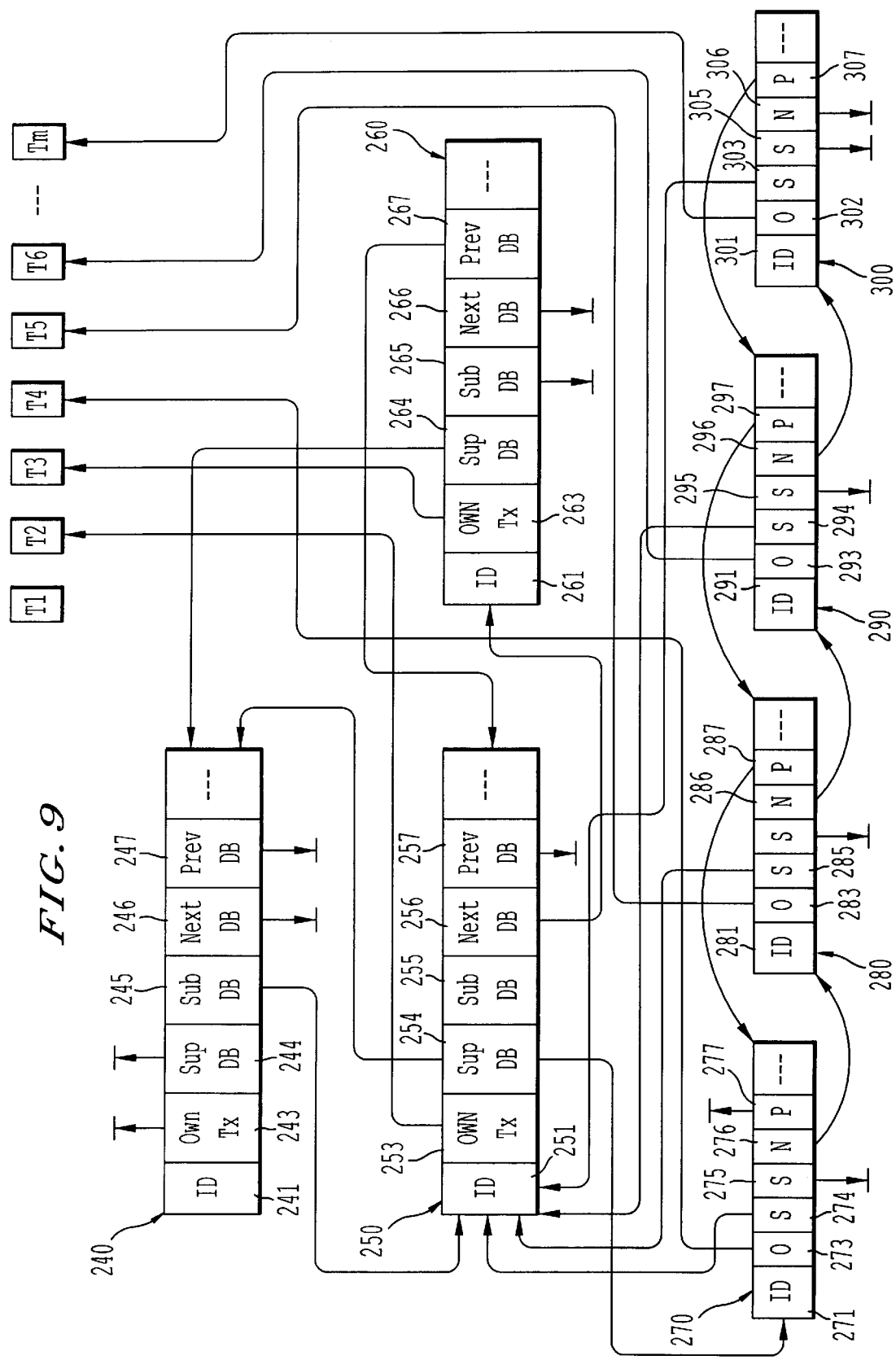
FIG. 9 illustrates an exemplary implementation of sub-databases into a hierarchy.

FIG. 9 illustrates the relationships between the DBCBs, and also the relationship between the DCBCs and the TCBs. These data structures are utilized to control the locking of resources. In FIG. 9, the hash table, LCBs, SLCBs, and LRBs are not illustrated so that the diagram does not become overly complicated. However, these data structures are ordinarily present in the system. In FIG. 9, there are illustrated TCBs T1, T2, T3, . . . , Tm. There are also illustrated DBCBs 240, 250, 260, 270, 280, 290, and 300. In this example, the hierarchy of the DBCBs can be observed. For example, the DBCB 240 is the highest DBCB in the hierarchical DBCB structure, and may correspond to the Global Database 192. With regard to the DBCB 240, the ID field 241 would indicate that this DBCB is for the Global Database. The Own Tx field 243 points to null, as it is not necessary to expressly identify in the DBCB the owner or owning transaction of the Global Database. Similarly, the Sup DB field 244 also points to null, as there is no super database for the Global Database.

A Sub DB field 245 references the set of subdatabases for this database, and in this case references DBCB 250. At the Global Database level in this particular example, there are no other databases at the Global Database level, and therefore, the Next DB field 246 and the Prev DB field 247 each point to null. It is to be noted that in FIG. 9, the Active Transactions field 206 shown in FIG. 7 has not been illustrated simply to simplify the diagram but in a preferred embodiment, the Active Transactions field would be utilized, as explained above.

At the hierarchical level below the DBCB 240 are the DBCBs 250 and 260. Not every field in FIG. 9 will be explained as these fields are self-explanatory. However, with regard to DBCB 250, it is seen that the Owning Transaction 253 references T2, that the Super Database 254 for this DBCB is the Global Database, as represented by DBCB 240. The subdatabases for this DBCB 250 are indicated by the reference Sub DB 255 which references DBCB 270. The other subdatabases 280, 290, and 300 of the database 250 are linked to the subdatabase 270. The Next DB field 256 references DBCB 260, and the Prev DB field 257 references null.

With regard to DBCB 260 which is at the same hierarchical level as DBCB 250, the Owning Transaction 263 is T3, the Super Database 264 references DBCB 240, there is no subdatabase for the DBCB 260, as represented by the Sub DB field 265 referencing null, and there is no Next DB, as indicated by the field 266. The Prev DB field 267 references DBCB 250. Based on the above description of the DBCBs 240, 250, and 260, it is evident that the DBCBs 270, 280, 290, and 300 are each at the same hierarchical level which is below the hierarchical level of DBCBs 250 and 260.

With respect to the DBCBs, as a generalization, the Super Database field will generally reference one super database except for the Global Database which will not reference any super database. Such referencing is what allows the hierarchy to be represented. The illustration of FIG. 9 is merely an example of how the DBCBs may be arranged during a specific series of transactions, and the exact hierarchy in FIG. 9 is not required.

When a transaction creates a subdatabase, the subdatabase will be created based on a context of the creating transaction. In FIG. 9, transactions T2 and T3 preferably execute in the Global Database because otherwise, they probably would not have been able to create subtransactions that belong within the Global Database. Therefore, the fact that the DBCBs 250 and 260 have the Global Database, as represented by DBCB 240, as their superior database indicates that the owning transaction has the Global Database as its scope or context. Moreover, as explained above, it is preferable that for each DBCB, there is only one super database but there is any number of subdatabases. However, alternative implementations may not have such a requirement.

While FIG. 9 illustrates a doubly linked list structure, for example by having DBCB 250 reference DBCB 260, and also having DBCB 260 reference DBCB 250, such a doubly linked list relationship between the DBCBs is not an essential requirement, but other implementations such as tree structure implementations may be utilized. For example, there could be a pointer or reference from a DBCB which points to or references a separate object whose purpose is to represent a set or list of some structure which indicates the location of the DBCBs. This alternative implementation would add another data structure to the data structure arrangement. Such an alternative arrangement might add more complexity into the data structure arrangement, but there may be advantages to doing so. One such example would be allowing one to eliminate, if desired, the next and/or previous references of the DBCBs.

Figure 10:
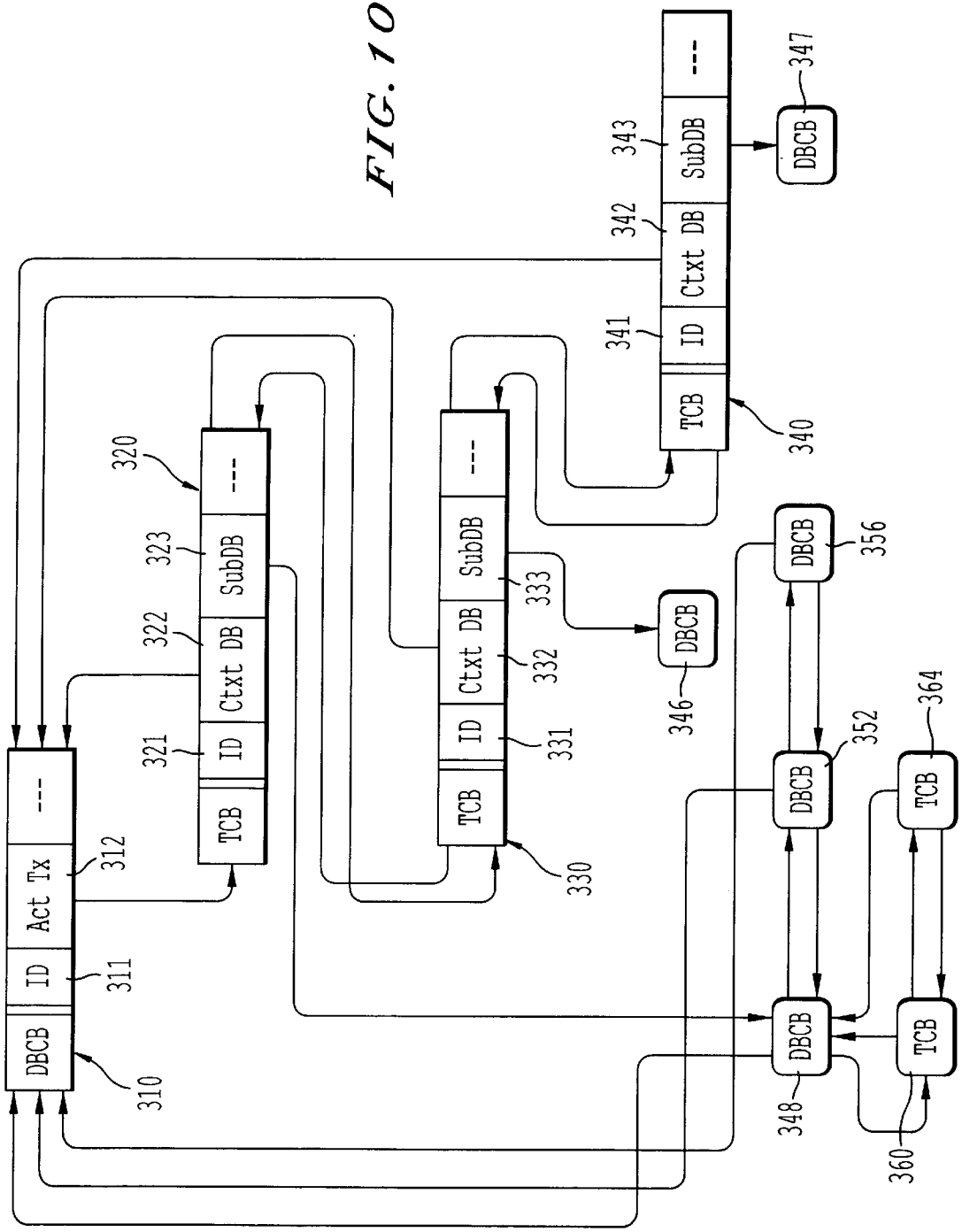
FIG. 10 illustrates an example using an active transactions field in a database control block, and context database and subdatabases fields in transaction control blocks.

FIG. 10 illustrates additional details of the TCBs and the DBCBs which are not shown in FIG. 9. This detail was omitted from FIG. 9 for purposes of clarity and to prevent the drawing from becoming too cluttered. Similarly, features of the DBCBs which are contained in FIG. 9 have been omitted from FIG. 10 for purposes of clarity. In FIG. 10, the Active Transaction field has been illustrated in the DBCBs, and the use of the Context Database and Sub-Database fields has been illustrated with respect to the TCBs. These fields in FIG. 10 show in a more detailed manner the relationship between the DB CBs and TCBs.

It is preferable for the DBCB to keep track of its owning transaction, as illustrated in FIG. 9, and it is also preferable to keep track of the active transactions of the subdatabase. Such a function is performed by the Active Transactions reference or field of the DBCB. As shown in FIG. 10, the DBCB 310 has an identification field 311 and an Active Transaction field 312. The Active Transaction field 312 references TCB 320. Thus, the owner of the subdatabase corresponding to DBCB 310 can determine that the transaction corresponding to TCB 320 is an active transaction for the DBCB 310. Moreover, it is seen at the right-most portion of TCB 320 that there is a reference to TCB 330, and TCB 330 references TCB 340. Also, the TCB 340 references the TCB 330 which references the TCB 320. Further, the Context Database field of each of TCBs 320, 330, and 340 reference DBCB 310.

When a transaction is created, started, or begun, that transaction preferably has some sort of context within which it is going to execute. In a classical context and in the prior art, this setting is always the Global Database. However, with the nested databases of the present invention, a transaction can be started and execute in the Global Database, or a transaction can begin in a subdatabase. Preferably, no data outside of the subdatabase within which a transaction has been started is accessible, and preferably, the lock manager knows or can determine the database within which this transaction is executing, and this is what is referred to as the context database. If the resource which a transaction is requesting is outside of the context database, a request to access such information will preferably be denied by the lock manager. However, as an alternative, it is possible to dynamically grow the subdatabase in question. If desired, this dynamic growth can occur right then, and if further desired, there could be an automatic triggering (e.g., without user intervention) of the growth. Such growth can occur in a manner which is analogous to the process of FIG. 16 which shows how new data items are brought into a subdatabase. If the data which is being requested is part of the context database, the resource belongs to the database which is accessible and the next issue to evaluate is whether there are any conflicting locks on that resource. When there are no conflicting locks, the lock manager can then grant the lock request. Therefore, the data structures of the present invention allow for both an indication of whether a resource is accessible, and then determining whether such resource has been locked.

Referring back to FIG. 10, it is seen that the Sub DB field 323 of TCB 320 references DBCB 348, the Sub DB field 333 of TCB 330 references DBCB 346, and the Sub DB field 343 of TCB 340 references DBCB 347. With regard to the DBCBs 348, 352 and 356, a super database pointer or reference of these DBCBs references the DBCB 310. The DBCB 348 references TCB 360 using the Active Transaction reference thereof. TCBs 360 and 364 each reference DBCB 348 using their corresponding Context Database references. The detailed structure of the fields of the simplified DBCBs and TCBs of FIG. 10 has been omitted for clarity and to prevent FIG. 10 from becoming overly cluttered with references.

Figure 11:
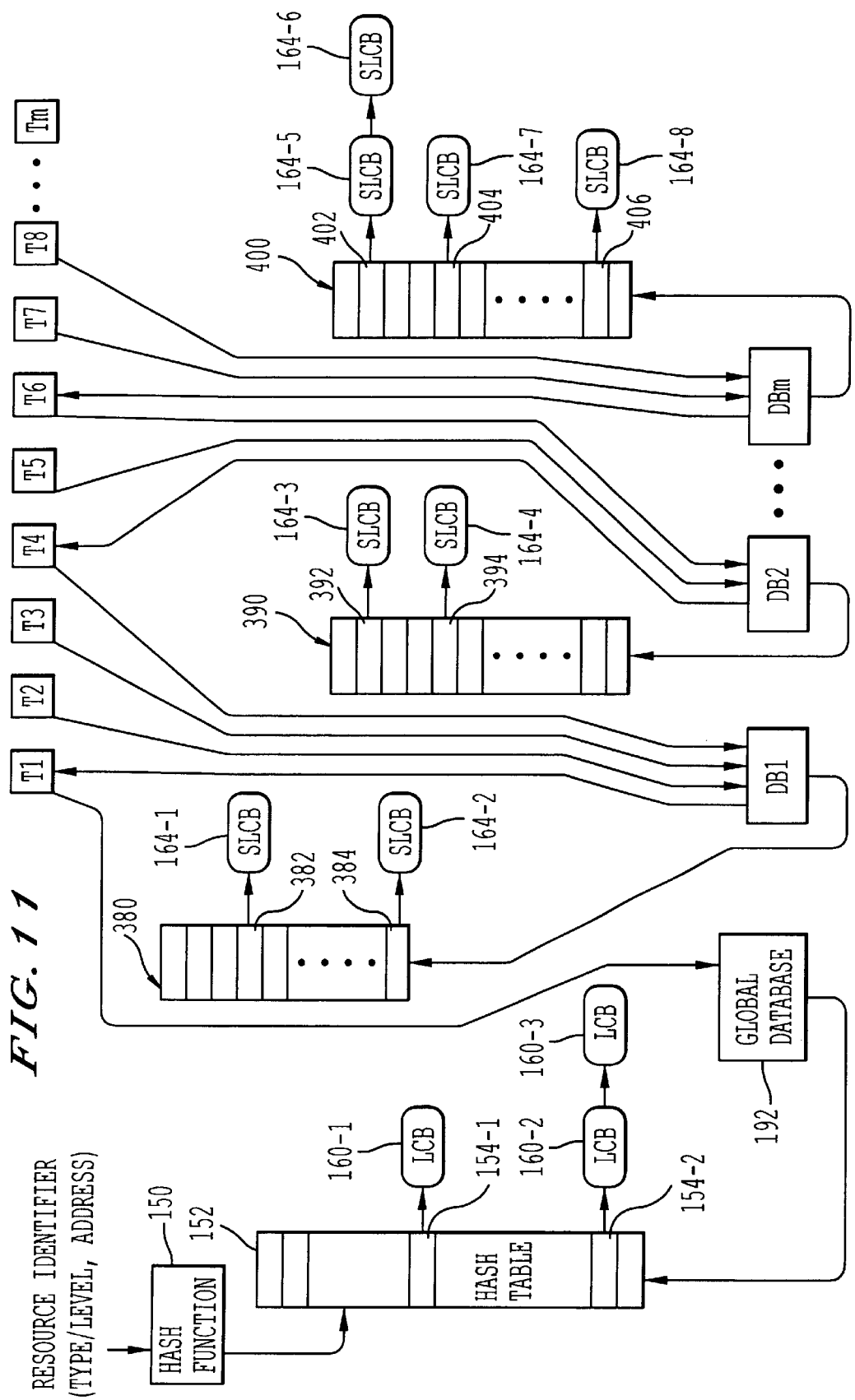
FIG. 11 illustrates an alternative implementation in which there is one search table per subdatabase, and the search table includes references to subdatabase lock control blocks.

FIG. 11 illustrates an alternative implementation of the data structures utilized to control and monitor the locking of resources. In the embodiment illustrated with respect to FIGS. 2, 4, and 6, when the lock manager processes a lock request for a lock on a certain resource in a certain database, it will first use the resource ID ("RID") to find the LCB for the given resource in the global database. Thereafter, if necessary, it will use the "Next Level LCB" reference to find the LCB for the same RID but in the particular database or subdatabase identified by the lock request being processed. The alternative embodiment of FIG. 11 (and also the alternative embodiment of FIG. 12) allows a reverse sequence of events as compared with what was previously described. That is, the data structures of FIG. 11 allow the lock manager to first locate the database, as represented by the DBCB, and subsequently locate the RID within that database. This is achieved by having one search table per DBCB rather than just a single global search table such as the previously described hash table.

In FIG. 11, the DBCBs, in addition to referencing their owning TCB, reference a search table that provides access to the RIDs contained within the database in question. For example, DB1 references table 380, DB2 references table 390, and DBn references search table 400. Each of the search tables 380, 390, and 400 have references to the SLCB which provides information relating to the lock of a particular data item. While not shown in FIG. 11, LRBs can be used for granted and pending lock requests associated with SLCBs, in the same manner as they were used with respect to the embodiment described above.

The subdatabase search tables such as 380, 390, and 400 can be implemented as hash tables, but they can be implemented in alternative manners. For example, they could be implemented using fixed-size arrays of LCB references. Such an implementation could be beneficial if the size of the subdatabase is fixed at the time of the subdatabase creation, or alternatively can be implemented utilizing dynamic size arrays (growable arrays) of LCB references. If hash tables are used as the subdatabase search tables, these hash tables can be allocated with fewer entries, if desirable, than the Global Database hash table. If hash tables are used as the subdatabase search tables, it would be possible to have chains of LCBs for any given hash table, for example as shown with respect to the search table 400 having reference 402 refer to SLCB 164-5 which references SLCB 164-6. In the alternative embodiment of FIG. 11, as LCBs are now organized under different search tables, the "Next Level LCB" field of the LCB or SLCB is no longer necessary. Thus, from a given entry in one such search table, one gets access to a linear structure of LCBs, in contrast to the hierarchical structure of LCBs and SLCBs of the earlier embodiment. In FIG. 11, each subdatabase DBCB has a reference to its owning TCB, and also each TCB has a reference to its containing DBCB. The data structure of FIG. 11 does not eliminate the use of super database references, even though such references are not shown in FIG. 11 or 12.

In FIG. 11, there are references going in both directions between the TCBs and DBCBs which indicate information related to the context database for the transactions. That is, referring to T1 for example, T1 points to the Global Database 192, indicating T1 executes within the Global Database or has the Global Database as its context database. With regard to the reference from DB1 to transaction T1, this reference indicates that DB1 is owned by or was created by T1. T2, T3, and T4 all reference DB1, indicating those transactions execute within the scope or context of DB1. In FIG. 11, it is illustrated that T4 is the creator of DB2 by the reference from DB2 to T4, but T4 executes within DB1. From this information, it is possible to conclude that DB2 is a subdatabase that is contained within DB1. It should be kept in mind that FIG. 11 is merely an example of a subdatabase system and could have been illustrated in other manners. However, as shown in FIG. 11, whatever is inside of DB2 is a subset of DB1 because of the connection through T4. FIG. 11 also illustrates that T5 and T6 execute with DB2 as their context. T6 creates DBn, and T7 and T8 execute within DBn.

Figure 12:
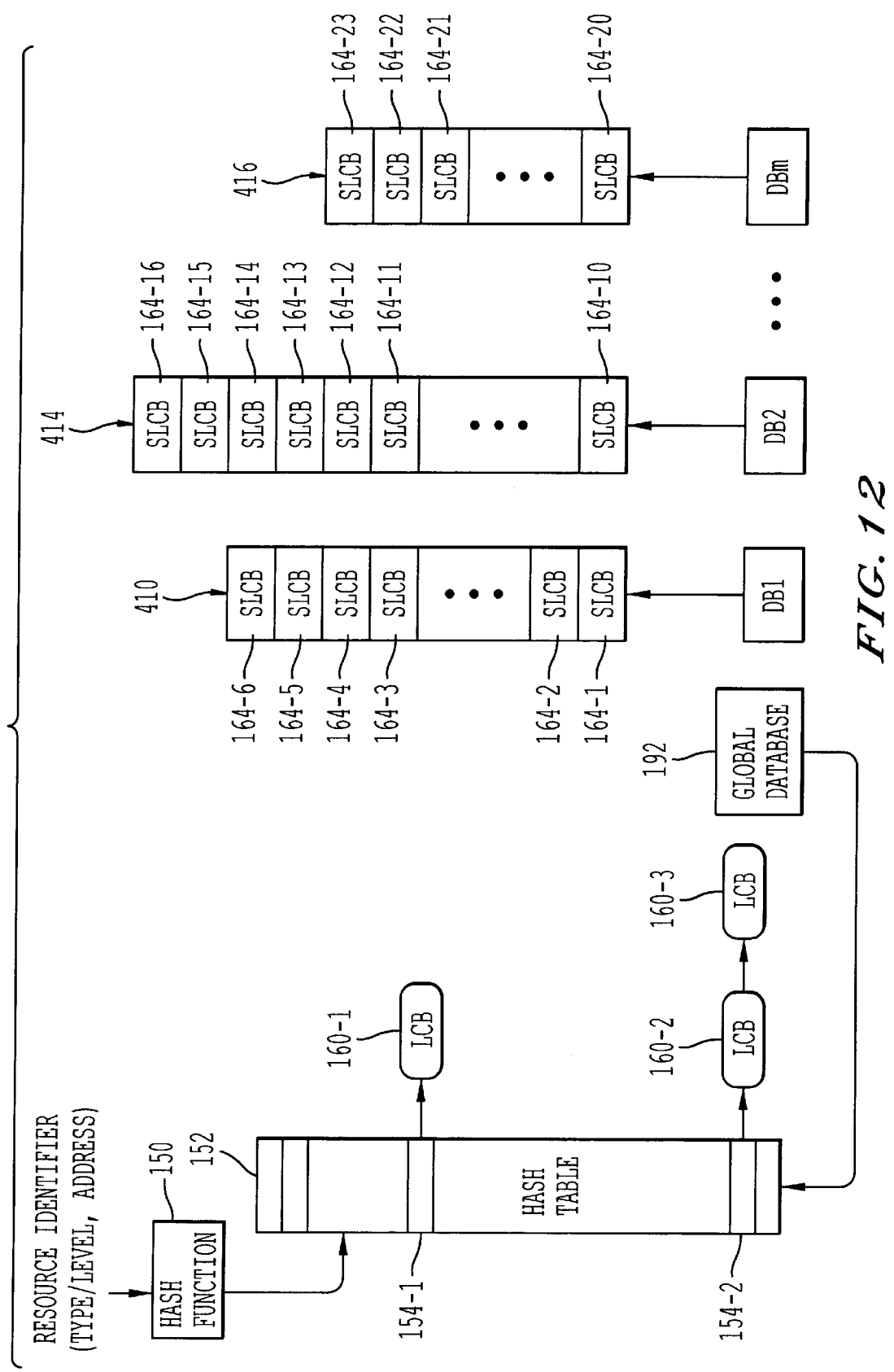
FIG. 12 illustrates an exemplary implementation in which the subdatabase lock control blocks are contained within an array or table.

FIG. 12 illustrates a further alternative implementation of the invention. As subdatabases can be small in size, because they may be implemented to contain a small number of lockable resources, it may be possible to implement the subdatabases as a fixed size, if desired, and the Search tables 410, 414, and 416 may be implemented, if desired, as an array of LCBs. As the LCBs are for subdatabases, the LCBs in FIG. 12 are illustrated as SLCBs ("Subdatabase Lock Control Blocks") 164-1 through 164-20. The arrays of SLCBs may be utilized as opposed to an array of references or a hash table of LCB references. Note that the Hash Table 152 is preferably implemented in the same manner as described with respect to the earlier embodiments. This hash table implementation for the Global Database allows a large number of LCBs to be used for the Global Database, if desired. If a specific use of the subdatabase is known, or even if it is not known, it may be appropriate to limit the number of items in a subdatabase to an arbitrary number, such as 20 data items. This number may be larger or smaller if desired. However, it is a fixed number and the embodiment may be implemented such that the arrays 410, 414, and 416 are created to have 20 pieces of memory, each capable of holding one entire SLCB. Then if only a portion of the allocated memory is used, the unused portion is wasted but this unused portion may not be so large and the advantage of not having to deal with dynamic memory allocation whenever a new LCB is introduced may be achieved. It is also possible to have chains of LCBs such as linked lists or double linked lists without a search table and to do sequential searches of the pointer or the reference chains whenever there is a need to locate a specific LCB.

Figure 13:
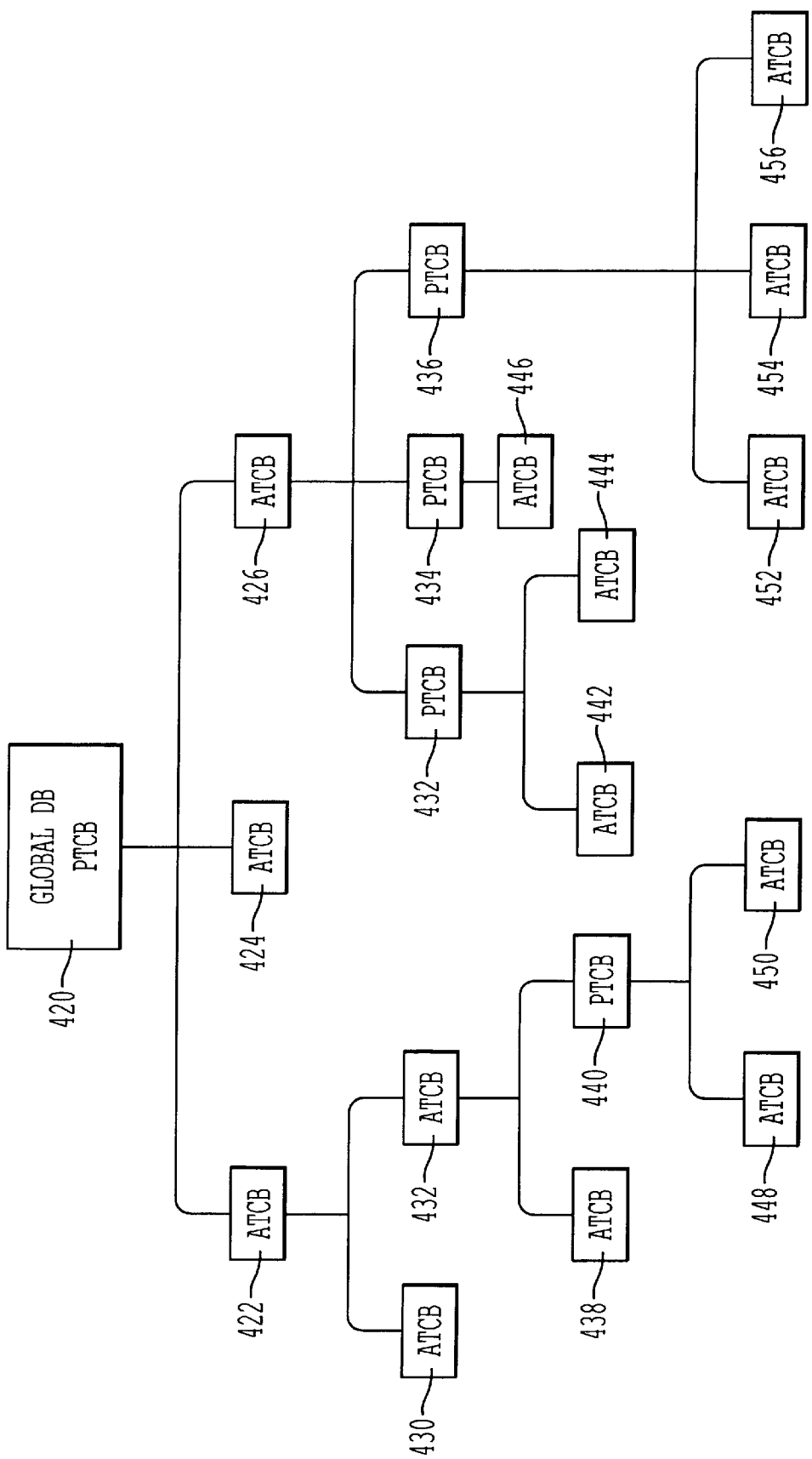
FIG. 13 illustrates that it is possible to implement database control blocks and transaction control blocks into a single hierarchical data structure arrangement.

FIG. 13 illustrates a hierarchy which contains both data structures related to the DBCBs, and the TCBs. With the invention, it is possible to view the transactions and databases as being the same kind of "thing." This is possible as the database can be viewed as a passive transaction. Thus, with the database being viewed as a passive transaction, and what has been previously described as a transaction (e.g., T1) being labeled an active transaction, a unified approach of the DBCBs and the TCBs in a single hierarchical data structure is possible.

In FIG. 13, there are illustrated ATCBs and PTCBs which refer to active TCBs and passive TCBs respectively. An active TCB ("ATCB") corresponds to the previously described TCB, and the passive TCB ("PTCB") is another name for a DBCB. In FIG. 13, the root of the hierarchy which may be referred to a as a database/transaction hierarchy, is the Global Database PTCB 420. This node corresponds to the Global Database data structure 192 described above. In the hierarchy, it is possible to allow any node to have any type of child node, although it may not be common or ordinarily utilized to have a PTCB have another PTCB as its immediate parent node. Phrased differently from what has been stated above, the starting point of the hierarchy is the Global Database which is the root of the hierarchy, and from then on, the database/transaction hierarchy can dynamically develop (grow and shrink) in almost any conceivable way as transactions and subdatabases are created and terminated. This means that the PTCB for a Global Database will be present as long as the system exists for which the transaction management and lock management is being done, while all other nodes may be transient. In this case, the PTCB for the Global Database may be implemented such that it is permanently present. The unified structure of FIG. 13 can be used with any of the implementations described above. This means that the system can be implemented either to have a global search table that provides access to all LCBs, or can be implemented to have a search table per PTCB which gives access to those LCBs that belong to the PTCB in question.

Referring to FIG. 13, the Global Database PTCB 420 is seen to be at the highest hierarchical level. Immediately below the Global Database PTCB 420 are four transactions ATCB 422, ATCB 424, and ATCB 426. These three ATCBs are top level transactions which have the Global Database PTCB as their immediate parent node. All other transactions and ATCBs in the hierarchy of FIG. 13 may be considered subtransactions. A reason why it is possible to implement the data structure relationship illustrated in FIG. 13 is that the inventor has determined that a subdatabase can be regarded as a passive transaction, and as a subdatabase will always be created by an active transaction, the subdatabase is going to be a subtransaction. An advantage of the hierarchy and unification of data structures illustrated in FIG. 13 is that there is provided a potential simplification as compared to the arrangement illustrated in FIG. 10. This simplification may result because rather than having pointers or references that cross back and forth between the two different hierarchies of TCBs and DBCBs, there is a single hierarchy. Thus, rather than having a database control block distinguish between its owing transaction and its super database, it may be possible to implement the data structures such that only one of those two fields is now needed; the system may be implemented to only include the supermode. For example, looking at FIG. 10 where the transaction control blocks have a pointer or reference to the context database, the data structure in those previous implementations is preferably implemented, though not required, with another pointer or reference to a super transaction. With the embodiment of FIG. 13, such a super transaction and context database references or pointers may be combined into a single reference. The search table such as a hash table, the LCBs, the SLCBs, and the LRBs are used in this embodiment in a similar manner they are used in the preciously described embodiments.

When performing lock request processing steps similar to the steps for the previous embodiment are performed. When processing, it may be desired to go from a TCB to an LCB or vice versa. Just like before, the answer can be determined by the TCB or ATCB referencing a PTCB, which corresponds to the DBCB. As an alternative, it is possible to go upward in the hierarchy until a PTCB is located. In either case, it is possible to go quickly from the transaction control block to the database control block of that transaction. At this point, two options may be followed such as utilizing a RID with the hash table to find the LCB for the reference in question and then the LCB for the database in question, or it is possible to go the DBCB and then go to the hash table or to the database control block which is utilized in searching for the LCB for the one RID which is desired. With regard to the structure of the PTCB, this structure would be similar to the previously described DBCB. However, the PTCB would be preferably implemented by combining the Owning Transaction and Super Database fields of the DBCB, and this combined field could simply be called superior.

With regard to the implementation of the ATCBs which correspond to the above-described TCBs, the Context Database field 226 of FIG. 8 could be combined with the Super Transaction or parent transaction field of the TCB of FIG. 8. Thus, it may be possible to implement the ATCB in a very similar manner as the TCB, although additional changes may be made, if desired.

Figure 14:
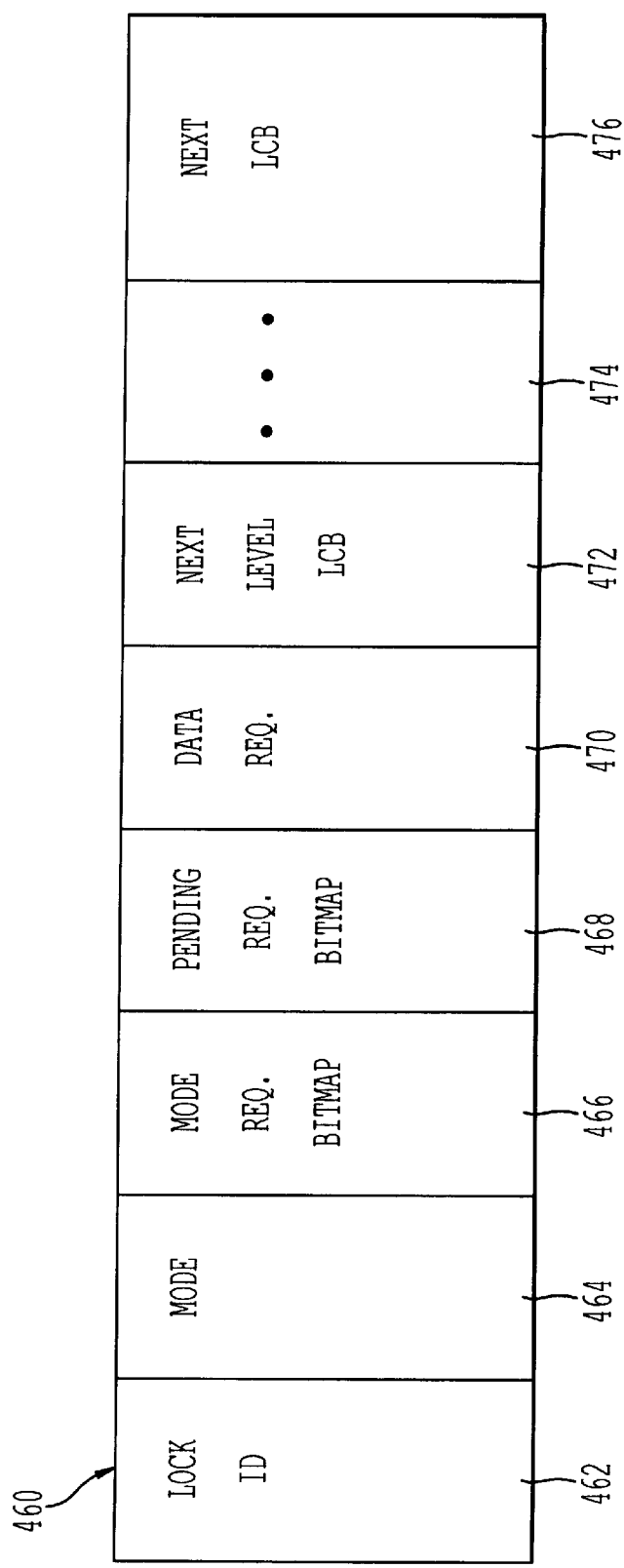
FIG. 14 illustrates an alternative implementation of the lock control block data structure.

Each of the previous embodiments preferably used an LCB or SLCB which referenced a lock request block or LRB. As an alternative or in addition to this implementation, it is possible to replace the LRBs with a granted request bit map and a pending request bit map within the LCB or SLCB itself. Referring to FIG. 14, the alternate implementation of the LCB or SLCB is illustrated as the data structure 460. This data structure integrates the information stored by the LRBs into the LCBs so that the LCBs (and SLCBs) are richer control blocks containing more information than the classical style LCBs (and SLCBs). The data structure of FIG. 14 is based upon and similar to the data structure of FIG. 3 illustrated in U.S. Pat. No. 5,983,225 which is incorporated herein by reference.

The data structure 460 includes a lock ID field 462 which will typically include a copy of the resource identifier for a locked resource or some other identification of the resource at issue. A mode field 464 indicates the most restrictive access mode of all the locks granted on the database resource represented by this LCB. A granted request bit map field 466 and a pending request bit map field 468 each contain a bit map of sufficient size (e.g., 64 or 128 bits) to represent a maximum number of concurrent transactions supported by the system (or sub-database level). Each transaction is assigned to one of the bit map transaction identifiers. The granted request bit map 466 contains a set bit for each active transaction that has been granted a lock resource represented by the LCB (or SLCB) 460. Similarly, the pending request bit map 468 contains a set bit for each active transaction that has a pending lock request (also called and access request) on the resource represented by the LCB 460. A database field 470 contains a reference to the DBCB representing the database for the resource corresponding to the LCB 460. With this embodiment, as in the other embodiments, it is possible to implement the system such that there is only a single physical copy of a given record or object, but that record might be accessible in more than one database and if not accessible in more than one database at a single point in time, it may be so at different points in time. Thus, when a transaction is accessing the resource at issue, it preferably indicates which database it is accessing the resource in, and there will be one LCB (or SLCB) for each database within which the resource at issue belongs, and the LCB (or SLCB) preferably should be able to identify explicitly that a database at issue corresponds thereto. This is the purpose of the database field 470.

With regard to a Next Level LCB 472, this field references a Next Level LCB in the same manner as shown in FIGS. 4 and 6 with regard to the referencing of the higher hierarchical level SLCBs. Field 474 represents that additional fields can be contained in LCB/SLCB 460. For example, read and write parameter bit maps, as illustrated as elements 172 and 173 of FIG. 2 of U.S. Pat. No. 5,983,225 may be utilized in order to represent read and write parameterized access modes that have been granted on the database resource represented by the LCB 460. Additionally, other fields may be included in the area 474 of the LCB 460. A Next LCB field 476 may be utilized to represent the next LCB and may correspond to field 176 of FIG. 2. Further, the database field 470 and the Next level LCB 472 may be implemented in a similar manner as the database field 477 and the Next Level LCB field 178 are implemented with respect to FIG. 2. The alternative implementation of the LCB or SLCB 460 can be substituted into any of the earlier figures in which an LCB or SLCB is used, and this would allow the possibility of eliminating the LRBs which are preferably used with those embodiments.

The present invention relates to transactions and a transaction may be considered a logical unit of work. Such a transaction may be based on a human sitting at a terminal doing work, or it could be something based on a running or a submission of an already existing computer program and a request for the system to execute the instructions of that program. A subtransaction relates to the idea of working with, under, or in association with a transaction. The dividing of a transaction into sub-units may be considered as the creation of subtransactions. If desired, and only as an example implementation, a transaction may be considered to be independent of other transactions and can be an autonomous unit of work. On the other hand, a subtransaction may be considered a non-autonomous or non-independent transaction. Thus, subtransactions can be considered a part of transactions at a higher level.

A database can be thought of as a collection of data. A subdatabase is also a collection of data, but a subdatabase is generally dynamically created and may be considered to be a transient entity. In a preferred embodiment, the subdatabase may be implemented so that it lives only as long as the creating transaction lives and when the entity which created a subdatabase ceases to exist, the subdatabase will also cease to exist. The subdatabase can be considered as being, or being related to, a sphere of control which puts a fence or line around a subset of the data and what is inside of the fence is regarded as the subdatabase. The subdatabases are also considered to be virtual databases. In this writing, the term database may be used to refer to subdatabases or virtual databases. The subdatabase may be considered virtual in the sense that it does not have to be materialized. It is not necessary to have a separate physical copy of the data in the subdatabase in accordance with an implementation of the invention. Thus, it is possible to have a single copy of the data which belongs to the Global Database, and simultaneously can belong to one or more subdatabases which corresponds to the Global Database Control Block 192, without the need to create separate physical copies of the data.

The data is preferably stored in the Global Database, such as the database illustrated in FIG. 1. The Global Database 192 is preferably implemented as a database control block which is utilized during the process of managing and operating the lock manager of the DBMS. In order to obtain the data which is actually stored in the database, the Global Database 192 and the other DBCBs DB1, DB2, . . . , DBn are not directly used as an entry point to obtain the desired data, and the data is preferably not stored in these data structures. In an embodiment of the invention, it is preferable to go through the LCBs and the SLCBs to get to the data (or to get the lock information which is utilized to obtain access to the data). Suppose that there exists a record ID ("RID") and there is a desire to access a particular record corresponding to the RID and that the access to the record is to be in a given database or subdatabase. In a basic approach, for example with regard to the data structures illustrated in FIGS. 2–10, the hash table is utilized in order to get the entry for that RID which when found will point to a possibly empty chain of LCBs or an LCB that corresponds to the particular RID. LCBs which belong to other RIDs may be ignored. If the subdatabases were not of interest or were at the level of the Global Database, the LRBs corresponding to the LCB which was found through the hash table are examined to see if there are any conflicting locks and if the lock request can be granted. If so, the LRB corresponding to the requested lock will be introduced into the chain of granted LRBs and permission to access the data will be granted. At this time, it is possible to go to another component of the system which is well known and not illustrated and may be referred to as a buffer manager or other item which allows access to the disk and the physical address of interest to fetch the record in order to obtain the actual data. If nested databases or subdatabases exist, database control blocks are utilized to obtain permission to access the data. The database control blocks are preferably not used to directly access data. As described above, in order to obtain the data, the hash table is utilized to find the corresponding LCBs that hangs off of that hash table, as described above. The entry for the RID in question is obtained and there is a move to the right in the drawings to find the LCB for the RID in question. In order to visualize how the data is obtained, reference is made to FIG. 4. In FIG. 4, there are the first level LCBs 160-1 through 160-2. From the hash table 152 of FIG.

4, the reference 154-1 is found which leads to the LCB 160-1. LCB 160-1 refers to the Global Database DBCB 192. Suppose that the piece of data has been put into database 2 (e.g., DB2) or the transaction in question is executing in the context of database 2, and therefore, it is necessary to find the SLCB for the correct resource. It is necessary to move from the first level LCB 160-1 to the second level LCB 164-1. The SLCB 164-1 references DB1 which is not the database which is of interest. Therefore, continuing up the LCB/SLCB hierarchy one level to the third level of LCBs, it is seen that the SLCB 164-2 refers to DB2 and as we are interested in DB2, the correct level of LCBs has been reached. The lock manager now examines what locks are present for this database and this resource at the SLCB 164-2. If the new lock request is compatible with whatever is already there, then the lock request is granted. Once the lock request is granted, the lock is obtained on the data but the data itself must be accessed. In order to get access to the data, the DBCB is not used in the preferred embodiment. The database control block is preferably used for concurrency control and is used by the lock manager, but it is preferably not used by the buffer manager or some other mechanism in the system that goes out to fetch the data. The database control blocks, in a preferred embodiment, are just control blocks and do not contain the data; they contain control information. So, once the lock has been granted, the system provides an indication that a certain transaction is entitled to a particular RID. Then, in accordance with conventional technology and database implementations, for example, there is an indication that a lock to the data has been granted, and it is possible to use a buffer manager or other entity, in order to obtain the data which is identified by the RID. The buffer manager preferably does not need or utilize the DBCBs to get the data. Obtaining the data is a matter of physical access paths, and where on the disk the desired data is going to reside.

In the preferred embodiment, there is only a single copy of the data, although alternative embodiments envision the use of more than one copy of the data. The record or object of whatever is desired preferably exists as one copy. It has a physical address on the disk and the buffer manager is capable of figuring out the physical address given the RID, and it does not matter to the buffer manager which subdatabase the data belongs to; the physical address is preferably the same in any case.

The SLCBs and LCBs have been illustrated as including a reference or pointer to the DBCBs. It should be noted that an alternative embodiment may eliminate this reference or pointer by including a field within the LCB or SLCB which is a number or identification which indicates that the SLCB belongs to a particular database or subdatabase. Alternative implementations of the reference to the LCB or SLCB are possible.

The data structures used to implement the subdatabases of the present invention introduce recursion into the well-known concurrency control technique known as locking. Recursion has to do with applying a given principle over and over again and in this particular context, starting out with a Global Database which stores a global collection of data items, for instance word processing or engineering or CAD/CAM design documents or structures. The concurrency control is performed by means of locking to make sure that one person or transaction does not corrupt or make improper the data which another is working on. With the present invention, a principle is to create nested databases or subdatabases which may be thought of as mini-databases, and then to perform the same basic concept and locking for the subdatabases that is done for Global Databases. Therefore, the present invention applies the principles in the Global Database to the virtual collection of subdatabases. Thus, the present invention applies the principles of recursive concurrency controls to the problem of collaboration, and this enables the creation of virtual databases or virtual sandbox environments. For these virtual environments or subdatabases, the invention allows the use of ordinary concurrency controls, and the establishment of arbitrarily complicated patterns of interactions between two or more users who desire to collaborate.

If there is a desire to cancel a modification of the data or have recoverability to a previous state of the data which relates to the property of atomicity, the invention may be implemented to maintain a log of everything that is done with each data item under the scope of a transaction. The contents of that log enable both forward and backward recovery of any item which has been modified. This is known as recoverability, and there are well-known techniques for implementing it. However, most approaches to collaboration among multiple writers will sacrifice the atomicity of transactions by splitting them up into multiple smaller transactions. Well-known examples of such approaches include open nested transactions and so-called sagas. While this enables recoverability within these much smaller atomic transactions, recoverability is lost for the much larger logical unit of work that constitutes the transaction as the user wishes to see it. Because of this, one needs to introduce the concept of compensating transactions, which are transactions that have to be created by the application developer. In other words, this is essentially a do-it-yourself approach to recoverability.

This is in contrast to what is the case with nested databases, where recoverability is not lost, and where the use of compensating transactions is not necessary. Moreover, one can continue to use well-known techniques for implementing recoverability in the presence of nested databases; no new algorithms, data structures, or techniques need be developed for that purpose. Such retainment of recoverability at all levels of databases nesting, combined with the support of this by means of standard techniques, is an advantage of the present invention over other approaches to the problem of collaborative work.

In the preferred embodiment of the invention, in order to create or begin a subdatabase, it is preferable to have write locks on the object or subdatabase in question. The transaction establishes a sphere of control where one dynamically brings certain objects into the sphere of control and manipulation of those objects based on the nature of the sphere of control in question is possible. With a write sphere of control, it is possible to modify the whole sphere of control, or portions of it. A write lock permits one to write, delete, insert, and modify data, and according to the preferred embodiment, is a prerequisite for the creation of a subdatabase. The subdatabase may be considered to create a database lock, as opposed to a write lock. If you have a database lock, it may not be possible to do all of the things which are possible with a write lock, and a database lock may actually result in the entity having the write lock to give up some rights. While some rights may be given up, the advantage of giving up the rights and creating a subdatabase is that there is a creation of a separate regime of concurrency control because the owner of the subdatabase is willing to share the objects of the sub-database with other people or entities.

The lock manager with regard to a particular transaction causes the transaction to live its life inside the scope of a certain database. Therefore, the present invention may be implemented to use a recursive algorithm that recognizes transactions having different scopes or subdatabases. The invention is different from the parameterized lock management system described in U.S. Pat. No. 5,983,225, although the present invention may be implemented along with the techniques of U.S. Pat. No. 5,983,225 in order to make the system more powerful and have additional features. The nesting or the nested databases and the use of the subdatabases in the present invention has a purpose of coordinating multiple writers of data.

Figure 15:
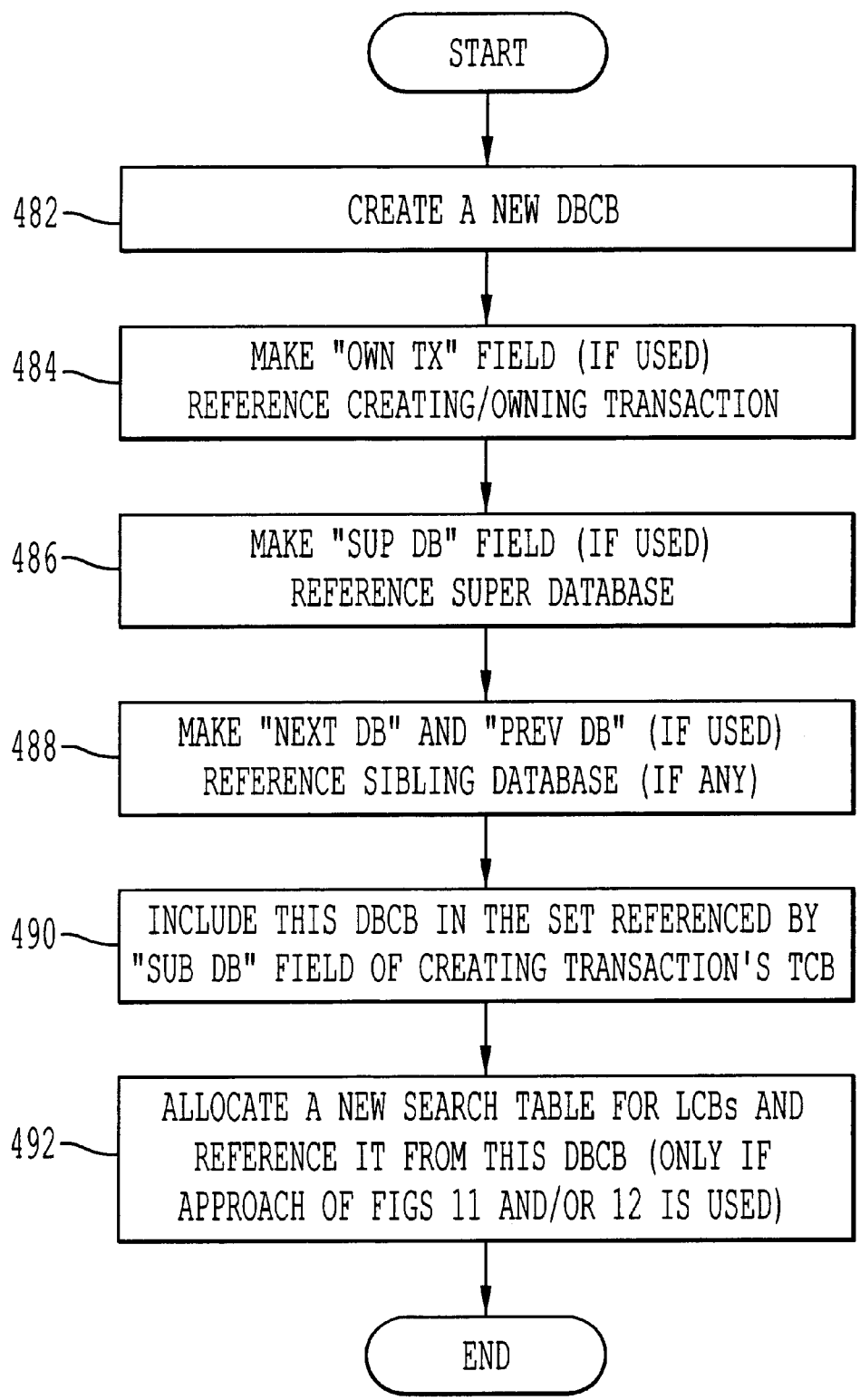
FIG. 15 is a flowchart for creating a new subdatabase.

Turning now to FIG. 15, there is illustrated a flowchart for creating a new and empty subdatabase. An implicit context of FIG. 15 is that there is a transaction executing in the database or some other subdatabase within the Global Database and the owner or person who is in control of this transaction desires to create a new database. In FIG. 15, after starting, step 482 creates a new DBCB. The database control block is created in order to have a point of control or point of reference for the existence of this new subdatabase that is about to be created. As explained above, in the preferred embodiment, it is not necessary to create a new copy of the data for the subdatabase, but if desired, this may be done. Steps 484, 486, and 488 relate the created DBCB to the other data structures which may exist. In step 484, the Own TX field of the DBCB is made to reference the creating or owning transaction. This step is performed in order to make explicit the relationship between the creating transaction and the new DBCB. It is to be noted that all steps of each flowchart are not essential and depending upon the implementation used, certain steps may be omitted if desired, or if the named data structures or fields are not used. Next, step 486 makes the Super Database field of the DBCB reference the appropriate super database of the DBCB. This is performed in order to indicate to the system or make explicit in the DBCB data structure what is the database of which this new subdatabase is a part. Step 488 then writes the Next DB and Prev DB fields in the DBCB data structure so that they reference sibling databases, if any. These sibling databases may be other subdatabases previously created by the same creating transaction, if any, such that relationships with the other subdatabases may be defined or created.

Next in FIG. 15, step 490 is performed which writes in the creating transaction's TCB the appropriate information such that this DBCB is referenced by the Sub DB field of the creating transaction's TCB. This step ensures that the super database includes this new database in its set of subdatabases that it has within itself. Last, in step 492, a new search table for the LCBs is allocated and this new search table is referenced from this DBCB. It should be noted that this step 492 does not have to be performed for all embodiments, but may be desired for the data structures of FIG. 11 and/or the data structures of FIG. 12. In the embodiments of FIG. 11 and/or FIG. 12, each DBCB preferably has its own Hash table, array, or other search structure which is used as an entry point for locating RIDs which are within its domain or subdatabase. The process of FIG. 15 then ends.

Figure 16:
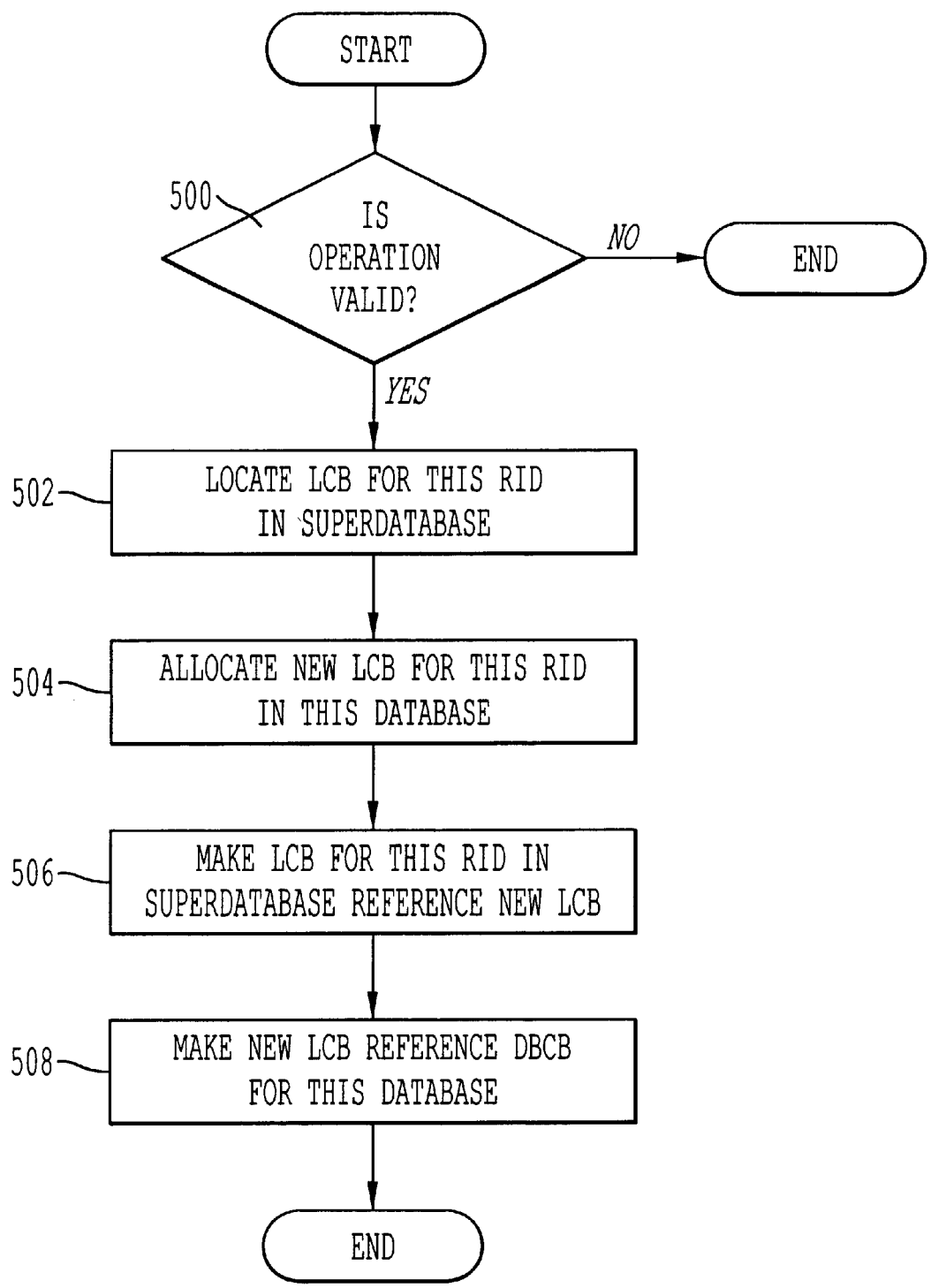
FIG. 16 is a flowchart indicating how to populate a subdatabase although physical movement of user data is not required.

FIG. 16 illustrates a process of bringing the RID into a subdatabase in order to populate the subdatabase. The subdatabase which has been created in FIG. 15 will be empty upon initial creation and FIG. 16 illustrates how an object or data item can be pulled into the subdatabase so that the object or data item can be made available to future transactions that are going to execute in the subdatabase at issue. In FIG. 16, after starting, step 500 determines if the operation at issue is valid. This step is performed because in the preferred embodiment, one cannot move any object into a subdatabase but certain conditions should exist. As an example, the transaction that created and therefore owns the subdatabase is preferred, at this point in time, to be in possession of the object that it wishes to bring into the subdatabase. Other questions or tests may be performed, such as pulling an object into the subdatabase only when it is present in the super database of this subdatabase, whether or not that super database happens to be the Global Database or some other subdatabase. Thus, in a preferred embodiment, it is possible to pull an object only from its immediately superior database in the database hierarchy. If the operation is determined not to be valid, for example, because the above two conditions are not met, the process of FIG. 16 then ends.

If step 500 determines that the operation is valid, flow proceeds to step 502 so that the object at issue can be brought into the subdatabase. The embodiment of FIG. 16 relates to the data structure arrangement such as that which is illustrated in FIGS. 2–4 and 6. Thus, step 502 locates the LCB for this RID in the super database. This step is preferably performed by going to the hash table, hashing the RID, getting a hash table entry or reference, and then following the pointer chain or reference from the hash table to the LCB at the first level. That LCB is going to identify the RID in the Global Database. If this subdatabase into which the object at issue is now being pulled is not an immediate descendent of the Global Database but has some other subdatabases above it that is between the Global Database and itself, then it is appropriate to traverse the next level database references or next level LCB from one LCB to the other until the LCB that identifies the resources in the immediate Super Database of this subdatabase is reached. And because of the tests performed with respect to step 500, it is known that there is going to exist such an LCB.

After step 502, step 504 is performed which allocates a new LCB for the RID at issue in this database or subdatabase. This new LCB is going to represent the very same resource in this new subdatabase that we have created and into which the resource is being brought. In step 506, the LCB for this RID in the super database is made to reference the new LCB. Last, step 508 makes the new LCB reference the DBCB for this database. In other words, it is desirable to make sure that the new LCB explicitly represents its connection to a database by indicating that this is my database or my context database. The process of FIG. 16 then ends.

Figure 17:
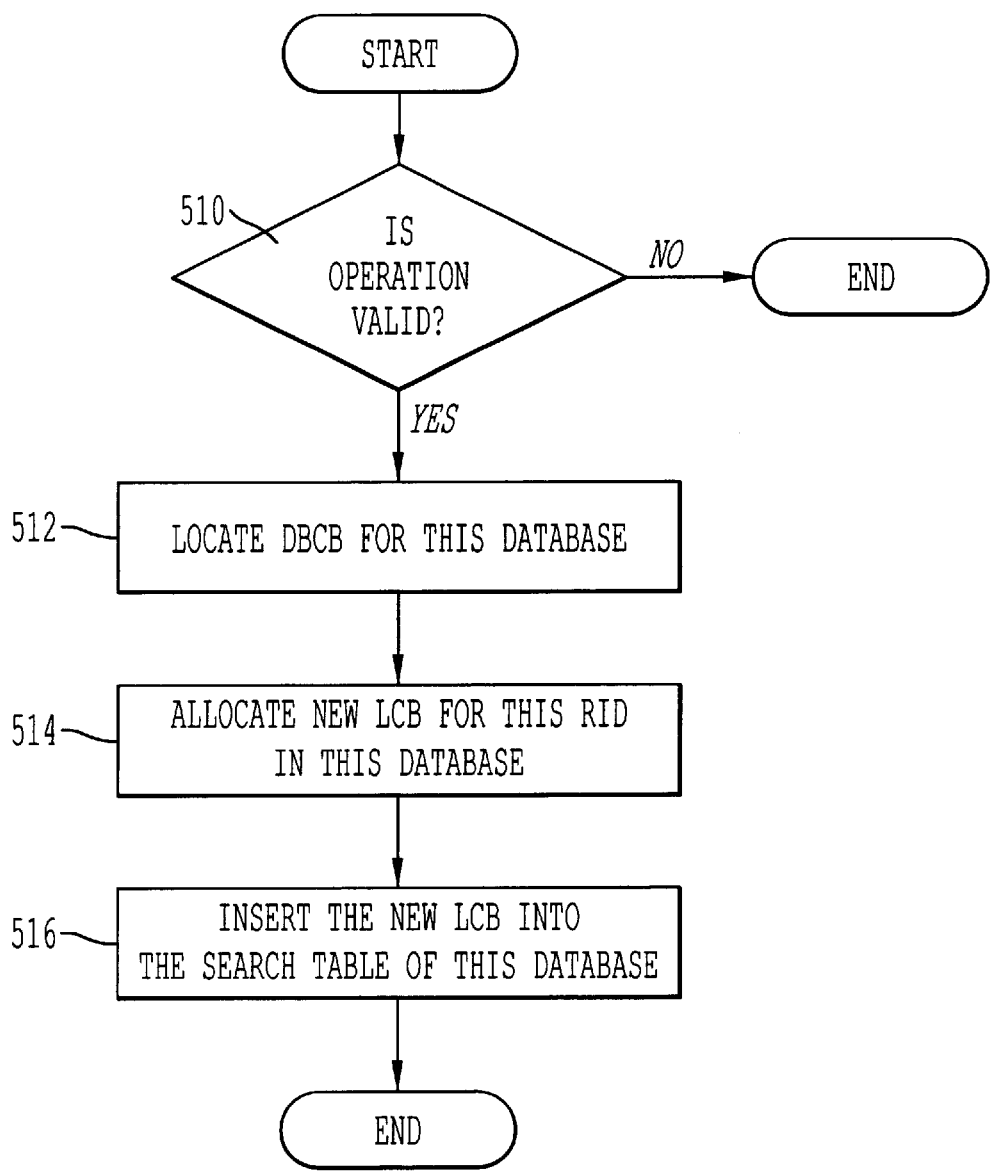
FIG. 17 is a flowchart illustrating an alternative embodiment for populating a subdatabase using the data structure of FIG. 11.

FIG. 17 is a flowchart showing how to populate a database or subdatabbase but is used with the alternative implementation having the data structures which are illustrated, for example, in FIGS. 11 and 12. A principal purpose of such populating is to implement a locking structure by creating an LCB in order to determine the lock status of a resource. After starting in FIG. 17, step 510 is performed which determines if the operation at issue is valid. This step is the same step as step 500 of FIG. 16, and therefore a repition of the explanation of this step is omitted. Next, in step 512, the DBCB for this database is located. At this time, the database such as the global database or some subdatabase which is of concern is known. Preferably, there is a database control block representing the database into which there is now an attempt to pull in an object. Moreover, it is preferable that there is a way to locate the DBCB for a given database, and that is being performed so that there is a reference to the database control block. Next, in step 514, there is an allocation of a new LCB (or SLCB) for the RID at issue in this database. In this step, a new LCB is being created as a new object is being brought into the database. In other words, if an object is in multiple databases, it will have as many LCBs representing it as there are databases in which it is present. Last, in step 516, the LCB is inserted into the search table of the database. This may be accomplished by hashing on the record ID, getting a hash table entry assuming a hash table is being used, although alternatives may be used as described above such as an array or table, and then the new LCB will be inserted into whatever hash table entry the hash function indicates it should be inserted into. If there is an empty chain of LCBs at this time (e.g., no LCBs) the LCB is inserted as a first item in the chain. If the chain is not empty, the LCB can be inserted either as the first item or as another item in the chain such as the last item or as an intermediate item, as long as the entry is inserted and reachable from the particular hash table or array entry at issue.

Figure 18:
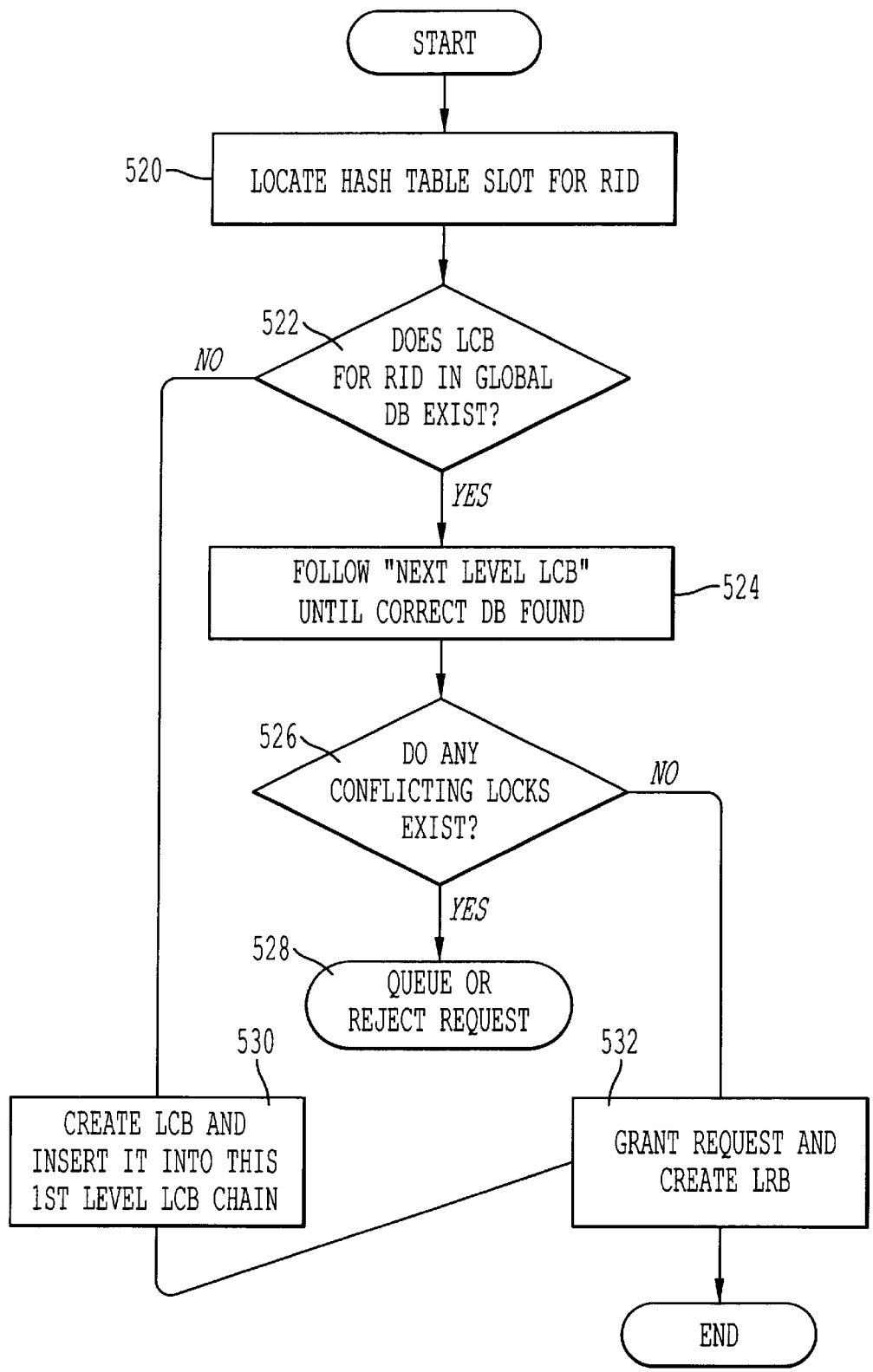
FIG. 18 is a flowchart showing the handling of a lock request in the presence of nested databases.

FIG. 18 is a flowchart showing exemplary steps of lock request processing utilizing the data structures of the embodiment of the invention illustrated with respect to FIGS. 2–4 and 6. In FIG. 18, after starting, step 520 is performed which locates the hash table slot for the RID at issue. A lock request will identify the transaction that is asking for access to a piece of data, and it will identify the RID or the record ID of the data in question along with the database in which this RID is to be found. Moreover, there will be an indication of the access mode such as whether the data is desired to be read or written. This information is available to the lock manager when processing the lock request. Thus, in order to locate the hash table slot for the RID, there is a hashing of the RID, a hash table entry is found, and the reference in the hash table entry is examined to determine if there is an LCB for this RID in the global database. If step 522 determines that the LCB for the RID does not exist in the global database, flow proceeds to step 530 which creates an LCB and inserts it into the first level LCB chain. When step 522 determines that the LCB for the RID does not exist in the global database, then the lock request can be concluded to be for the RID in the global database because otherwise, something would probably be wrong with the system, and it should not be possible to create a lock request for a data item in a nonexisting subdatabase. Thus, when a lock manager actually receives a lock request, it can be safely assumed that this lock request is in harmony with reality in the arrangements of the data structures. Thus, if there is no LCB for the RID in the global database, there is preferably no subdatabase in which the data item at issue belongs. Therefore, when the answer is NO in step 522, there is a request for a lock on or access to the resource in question within the global database. This is a relatively simple situation as an LCB is created as it doesn't already exist, and as the LCB does not already exist, it is readily determined that there is no other transaction that has a lock on the data item, so that there will be an unconditional granting of the lock which is being requested. There is thus an insertion of the LCB into the first level LCB chain which concerns the global database. After step 530, step 532 grants the request and creates an LRB which corresponds to the granted request.

Alternatively, if step 522 determines that an LCB for the RID does exist in the global database, step 524 is performed which follows the "Next Level LCB" until the correct database or subdatabase is found. Note that it is possible that step 524 can be executed zero times, so even if there is a request for a resource in the global database, it may be immediately discovered that the LCB which is being viewed is the desired or correct LCB, and therefore, it is possible to stop with this LCB and not proceed any further. Next, step 526 is performed which determines if there are any conflicting locks which exist. This is readily determined by examining whether the request is compatible with any existing locks which might already have been granted on the data item. If step 526 determines that there are conflicting locks, flow proceeds to step 528 in which the request is queued or rejected. It is possible to implement the system so that there can be a waiting period, hoping the existing locks will be released so that the lock manager can reconsider at some later point in time whether it is now possible to grant the requested lock. Alternatively in step 528, the requested lock can simply be rejected; it is a matter of design choice as to how this issue is handled. An immediate rejection of the request prevents a hanging or waiting of an arbitrary amount of time in hope of getting access to the lock which is desired.

If there are no conflicting locks which are determined to exist in step 526, flow proceeds to step 532 which grants the request and creates an LRB relating to the request in order to properly indicate the locking of the resource or associated data.

Figure 19:
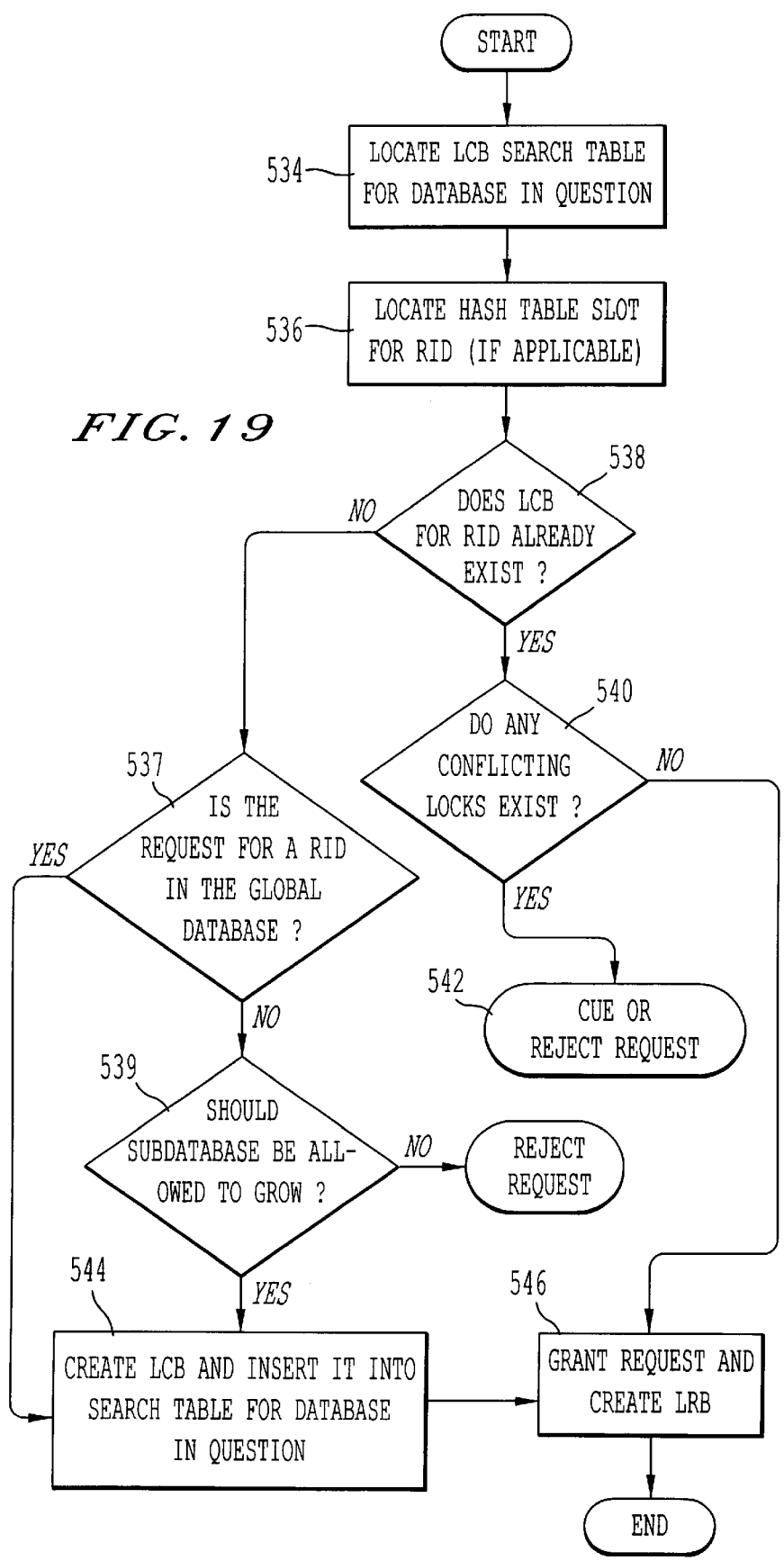
FIG. 19 is an alternative implementation of a flowchart for handling a lock request in the presence of nested databases when the lock control block has the alternative structure of FIG. 11.

FIG. 19, like FIG. 18, also illustrates how a lock request is handled in the presence of nested databases, but relates to the data structures of FIGS. 11 and 12 in which every database or subdatabase control block has its own search table. In FIG. 19, after starting, the LCB search table for the database in question is located. This may be performed by following the search table reference from the DBCB of the database identified by the lock request. Next, in step 536, the hash table slot for the RID is located, if such data structures exist for the embodiment. As an alternative where it is desired to avoid having a hash table, this embodiment may be implemented to have a more direct representation or allocation of LCBs.

Next, step 538 is performed which determines if the LCB for the RID already exists. If the LCB does not exist, flow proceeds to step 537, where it is determined whether the request is for a resource in the global database. If so, flow proceeds to 544. However, if the request is for a resource in some subdatabase, but the LCB for the resource is not present in that subdatabase's search table, then we have a special situation in that the transaction is asking for something outside the scope of its context database. Normally, such a request would be rejected, and this is indicated by the NO branch of step 539. However, the system could be programmed in such a way that the possibility of dynamically bring the requested resource in at this time, and thus dynamically growing the subdatabase in question, is kept open by the query of step 539 which determines whether the subdatabase should be allowed to grow. Such a decision could be reached with or without human intervention. In the case of a positive answer in step 539, flow proceeds to 544. If desired, the flowchart of FIG. 18 can be modified to insert between steps 522 and 530, steps 537 and 539 of FIG. 19. This will allow the functionality of steps 537 and 539 to be achieved in the process of FIG. 18.

In step 538, if it is determined that an LCB for the RID already exists, flow proceeds to step 540 in which it is determined if any conflicting locks exist. If a conflicting lock does exist, the lock request is queued or rejected, as explained with respect to step 528 of FIG. 18. If there are no conflicting locks, flow proceeds to step 546 in which the request for the lock is granted and an LRB is created, as explained above. The process of FIG. 19 then ends.

Figure 20:
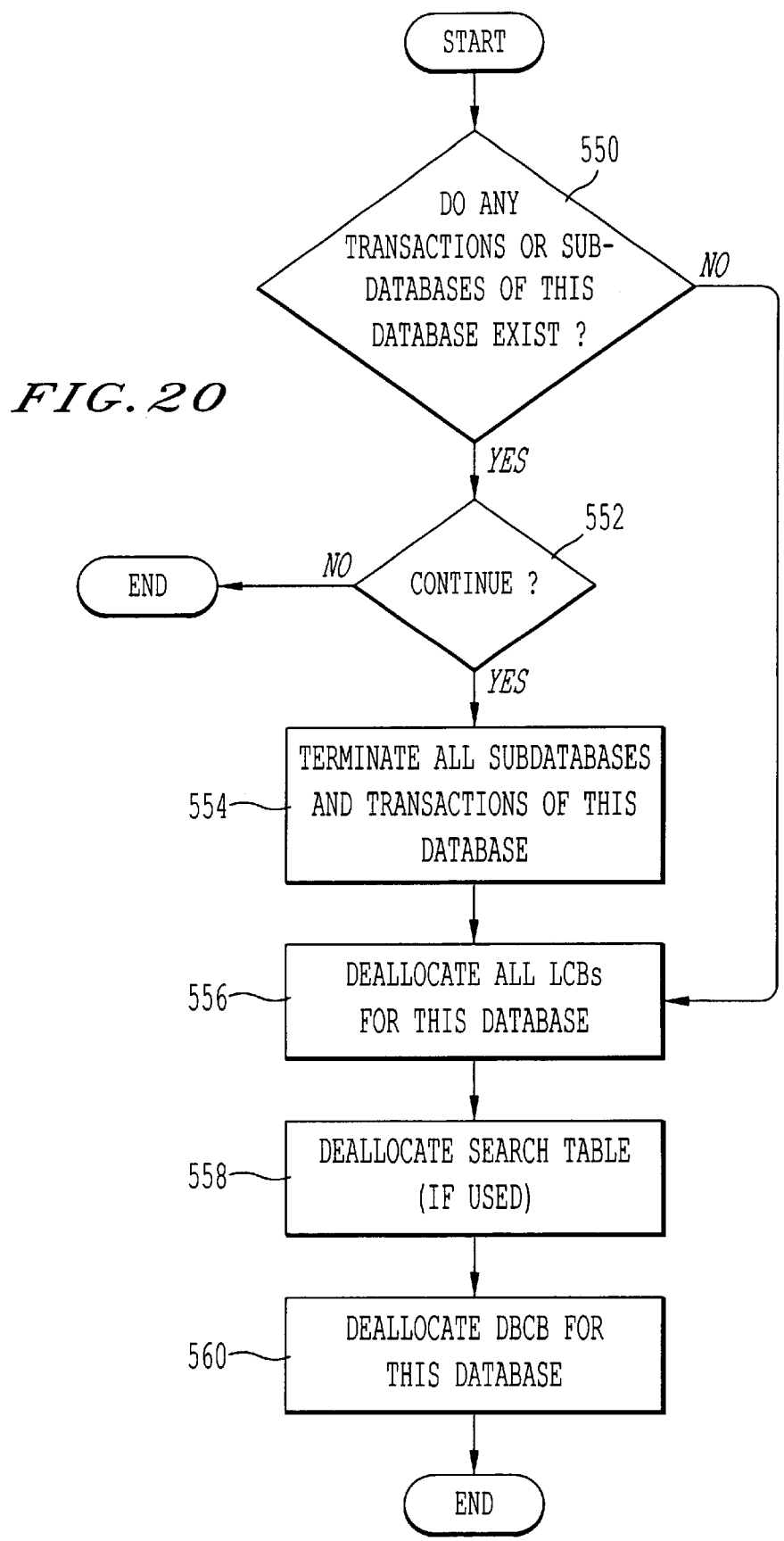
FIG. 20 is a flowchart of the process used to terminate the utilization of a subdatabase.

FIG. 20 is a flowchart illustrating the steps performed during termination of a subdatabase. After starting, step 550 determines if any transactions or subdatabase of this database exists. If the answer is YES to either of the inquiries of step 550, flow proceeds to step 552 which asks whether there is a desire for this process to continue. The decision block of step 552 can be performed in any desired way and can be a manual decision by the user after querying the user of the system if he or she still wants to terminate the subdatabase. Alternatively, there could be an automatic decision indicating whether or not it is acceptable to terminate the subdatabase. If there is a desire to preserve the subdatabase because transactions or subtransactions of this database exist, flow proceeds from step 552 and the process ends as the data at issue is desired to be preserved. The continue decision of step 552 can be a preprogrammed or computer program decision, or may be a manual decision. If there is a desire to continue with the termination in step 552, step 554 is performed in which all subdatabases and transactions of this database are terminated. This termination is another example of recursion because executing the action of step 554 will cause the flowchart of FIG. 20 to be re-executed for the items being terminated in step 554.

When step 550 determines that there are no transactions or subdatabases for the database at issue, or after performing step 554, step 556 is performed which deallocates all of the LCBs for the database at issue. This deallocation of step 556 can be safely performed as there will be no LRBs and no transactions or subdatabases depending on these LCBs so it is possible to take them away or deallocate them (e.g., removing them from the computer's memory). Next, step 558 is performed which deallocates the search table, if it is used. It is to be noted that in some instances, there may not be a search table to be deallocated, and therefore, step 558 does not need to be performed. Last, step 560 is performed which deallocates the DBCB for the database at issue, and once step 560 is performed, there will ordinarily be no more data structures in the computer memory dedicated to this subdatabase and the subdatabase now ceases to exist. The process of FIG. 20 then ends.

Figure 21A:
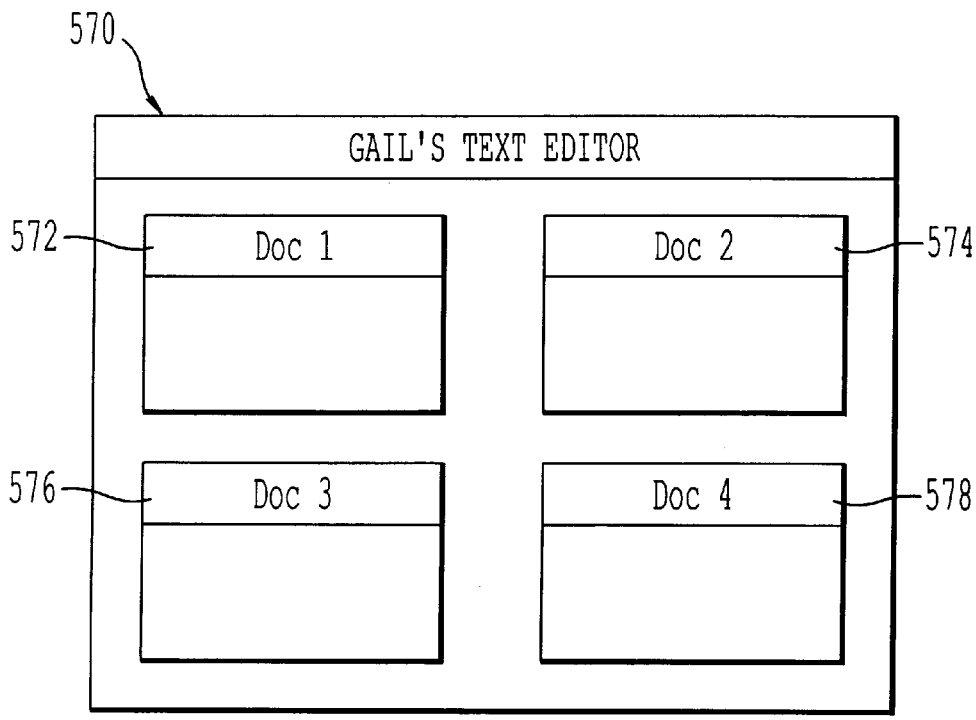
FIGS. 21A–21D illustrate an example in which a plurality of users desire to utilize a single database which includes four word processing documents which become organized into subdatabases.

In order to more readily appreciate the possible applications, consequences, and features of the present invention, an example of what the invention can do is illustrated with respect to FIGS. 21A–21D. This example is an example of the sharing of documents, but the invention has many more applications and may be used in any situation in which there is a desire to share data among a plurality of users. Moreover, the present invention may be used to share portions of a document among users so that there may be simultaneous work on a single document by a plurality of users. In the example, a single screen or computer display is shown for each user and each of the documents or data items available for that user are shown on the screen. However, it should be understood that this is merely one exemplary implementation, and in actual practice, there is no requirement or need for each of the data items in question to be displayed on a single computer screen. Referring to FIG. 21A, there is shown a computer screen 570 of Gail having four documents, document 1 572, document 2 574, document 3 576, and document 4 578. In this screen 570 of FIG. 21A, Gail has write locked documents 1, 2, 3 and 4 and she can both read and write the contents of these documents. As will be explained below with respect to the data structures showing the implementation of the example of FIGS. 21A–1D, Gail has a top-level transaction in the global database.

Figure 21B:
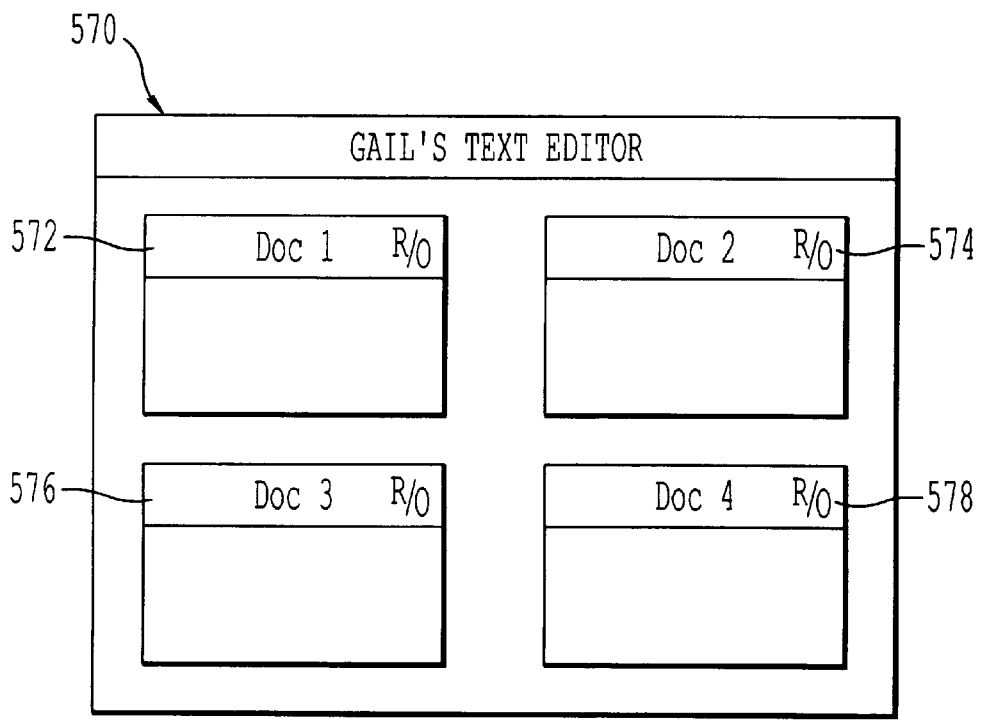

In FIG. 21B, Gail has created a subdatabase and pulled, logically speaking, documents 2, 3, and 4 into this subdatabase. This has caused those documents to become read only, as designated by "R/O" in the upper right-hand corner of each document.

Figure 21C:
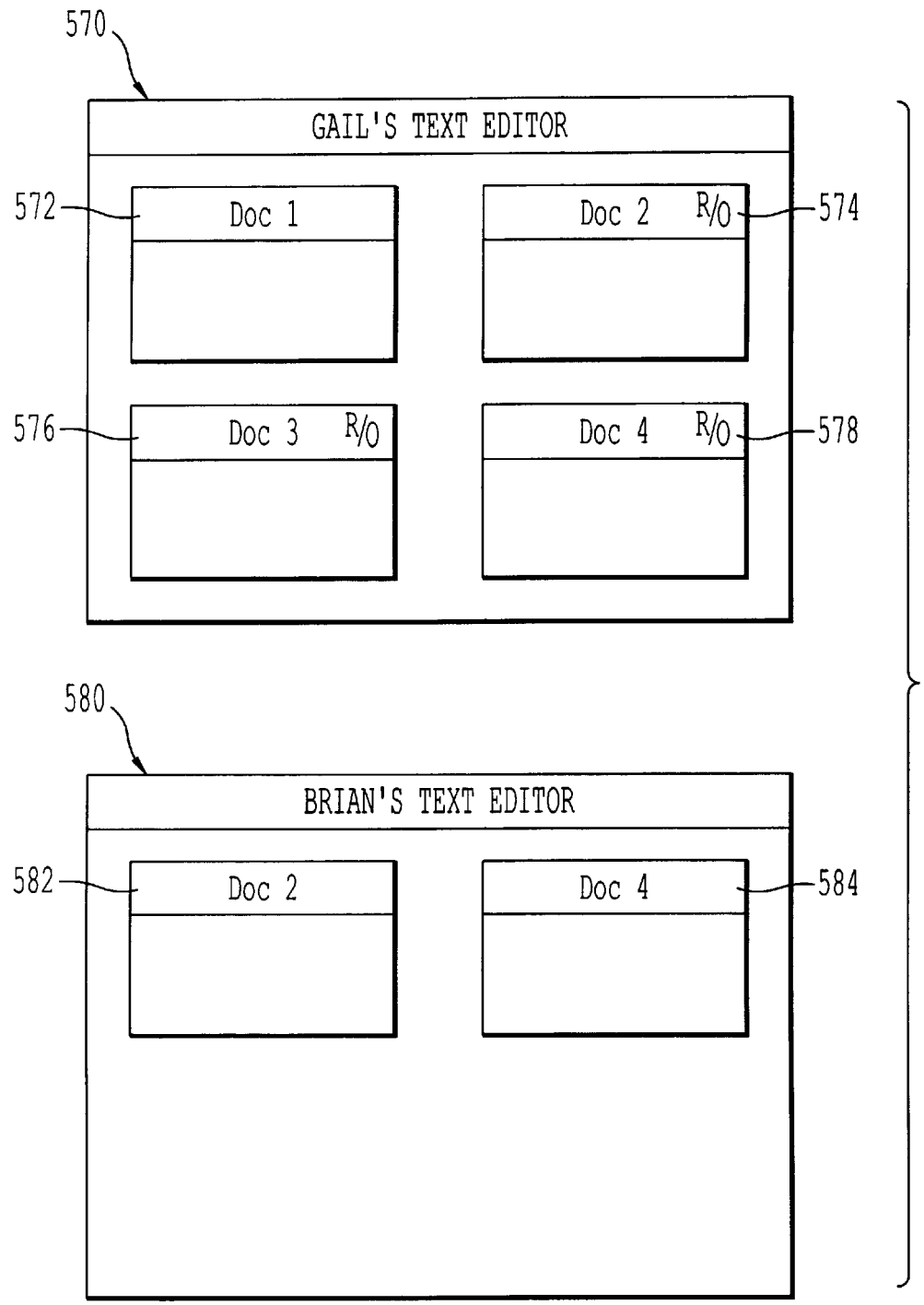

In FIG. 21C, a screen shot 570 for Gail is shown, and it is also shown that Brian now has the ability to work on document 2 582, and document 4 584 as indicated on his screen 580.

In FIG. 21C, Brian has started a transaction within Gail's subdatabase, and has write locked documents 2 and 4. Brian now has full edit capabilities of both of these documents, while Gail, for the time being, cannot write documents 2 and 4 which Brian has control of, but may read them and observe the work, if desired, which Brian is performing.

Figure 21D:
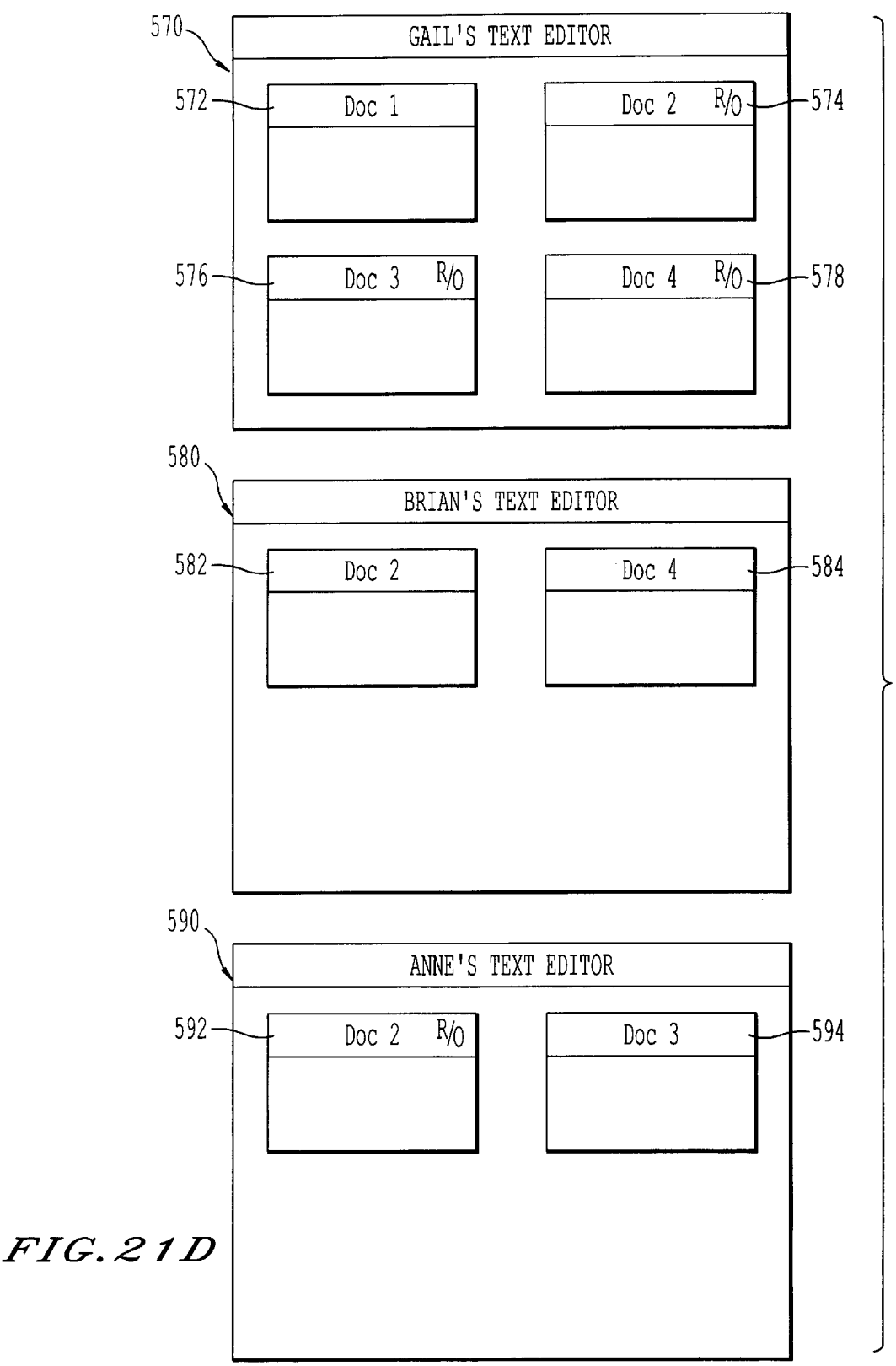

In FIG. 21D, Gail's and Brian's screens 570 and 580 can be seen, but additionally, Anne has a screen 590 which illustrates document 2 592 which is a read only document, and document 3 594. In the scenario of FIG. 21D, Anne has started a transaction in Gail's subdatabase. She has a read lock on document 2 and a write lock on document 3, indicating that only document 3 can be modified by Anne.

It is to be noted that in FIG. 21D, Brian has a write lock on document 2 582, while Anne has a read lock on document 2. In conventional systems, Brian's write lock and Anne's read lock would normally be incompatible. In order to allow Anne to browse the work of Brian, parameterized locking or other mechanism could be used. Thus, a main focus of the present invention, nested databases, can be combined with parameterized locking, to achieve a system with further capabilities.

Figure 22B:
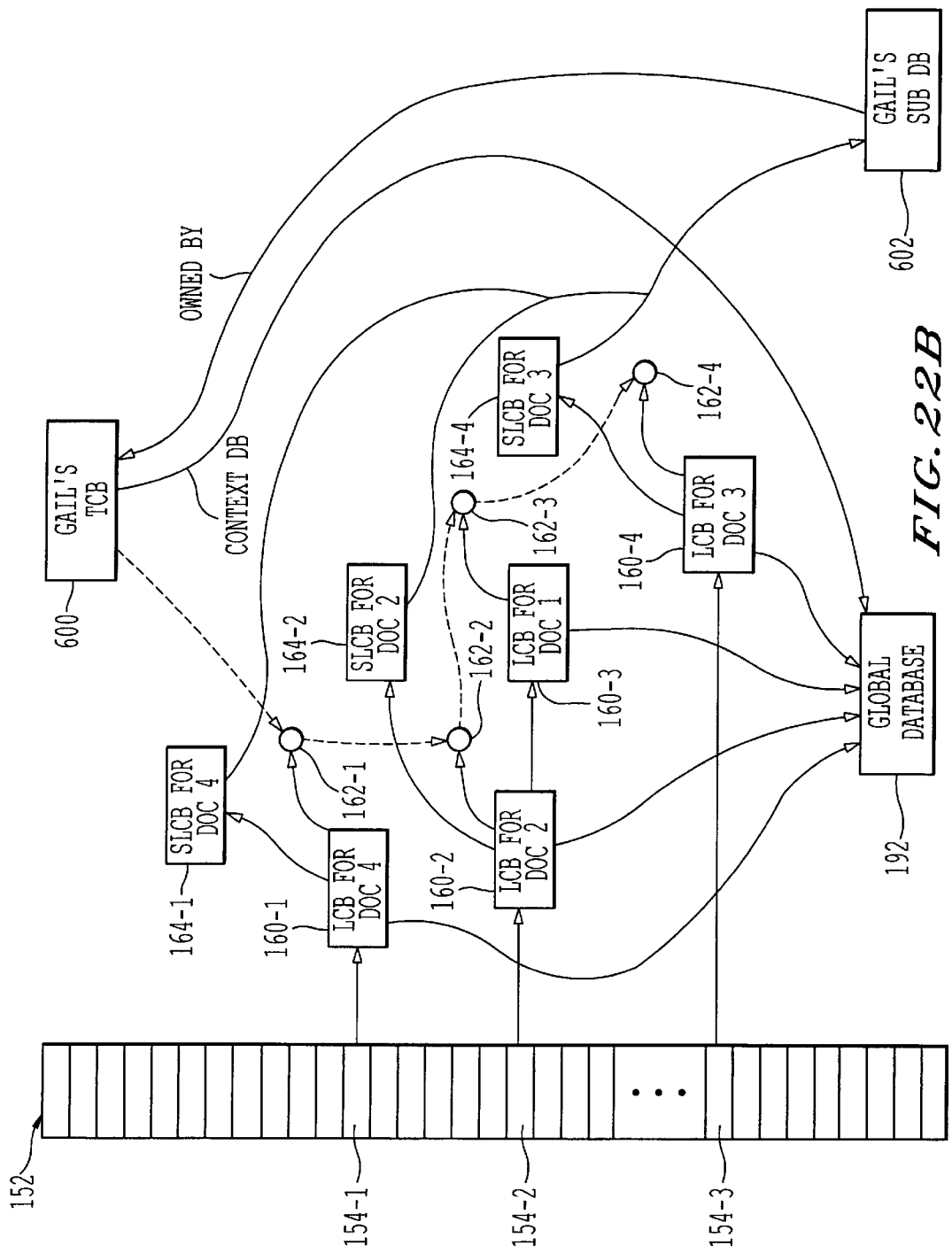

In order to implement the scenarios which exist in the example of FIGS. 21A and 21D, exemplary data structures are illustrates with respect to FIGS. 22A–22D, and 23A–23D, respectively, in order to show the manner in which the subdatabases and the sharing of the data can occur. FIGS. 22A–22D illustrate a first example of data structures which may be utilized to implement the example of FIGS. 21A–21D, respectively. In FIG. 22A, Gail has a Transaction Control Block ("TCB") 600. There are also Lock Control Blocks ("LCBs") for each of documents 1–4 which are respectively numbered 160-1 through 160-4. Lock Request Blocks ("LRBs") 162-1 through 162-4 are utilized to implement the locking of the documents, in conjunction with the respective LCBs. Each of the LCBs 160 in FIG. 22A references the Global Database 192 (actually the Global Database Control Block), thus representing that Gail has a top-level transaction in the Global Database. For the TCB 600 which is Gail's top-level transaction, there are full edit capabilities for each of documents 1–4. The LCBs for these documents, and thus the data itself, is to be considered part of or related to the global database.

In FIG. 22B, which corresponds to FIG. 21B, Gail creates a subdatabase and moves, logically speaking, documents 2, 3, and 4 into the subdatabase. A subdatabase may be created in order for Gail to invite others to collaborate with her. As Gail is creating a subdatabase, additional data structures are illustrated in FIG. 22B. In particular, as documents 2, 3, and 4 are part of the subdatabase, second level LCBs, also referred to as SLCBs, are created for documents 2, 3, and 4 and are represented by the designation 164-2, 164-4, and 164-1, respectively. It is seen that each of these SLCBs reference Gail's subdatabase control block ("DBCB") 602. There is no second level LCB or SLCB for document 1 as Gail has not moved that document into her subdatabase. Thus, at this point in time, document 1 is the only document which Gail can edit, and the other documents can only be browsed. In order to have the data structures represent that Gail can only edit document 1 as the other documents have been moved into a different subdatabase, the mode fields of the LRBs for the documents which have been moved into Gail's subdatabase may be modified to indicate the capabilities related to the documents with regard to their locking. In FIG. 22B, no transactions are active in Gail's subdatabase. Additionally, in FIG. 22B, the context database for Gail's TCB remains the global database 192, and Gail's subdatabase DBCB 602 references Gail's TCB 600 in order to indicate that Gail's subdatabase is owned by Gail's transaction.

Figure 22C:
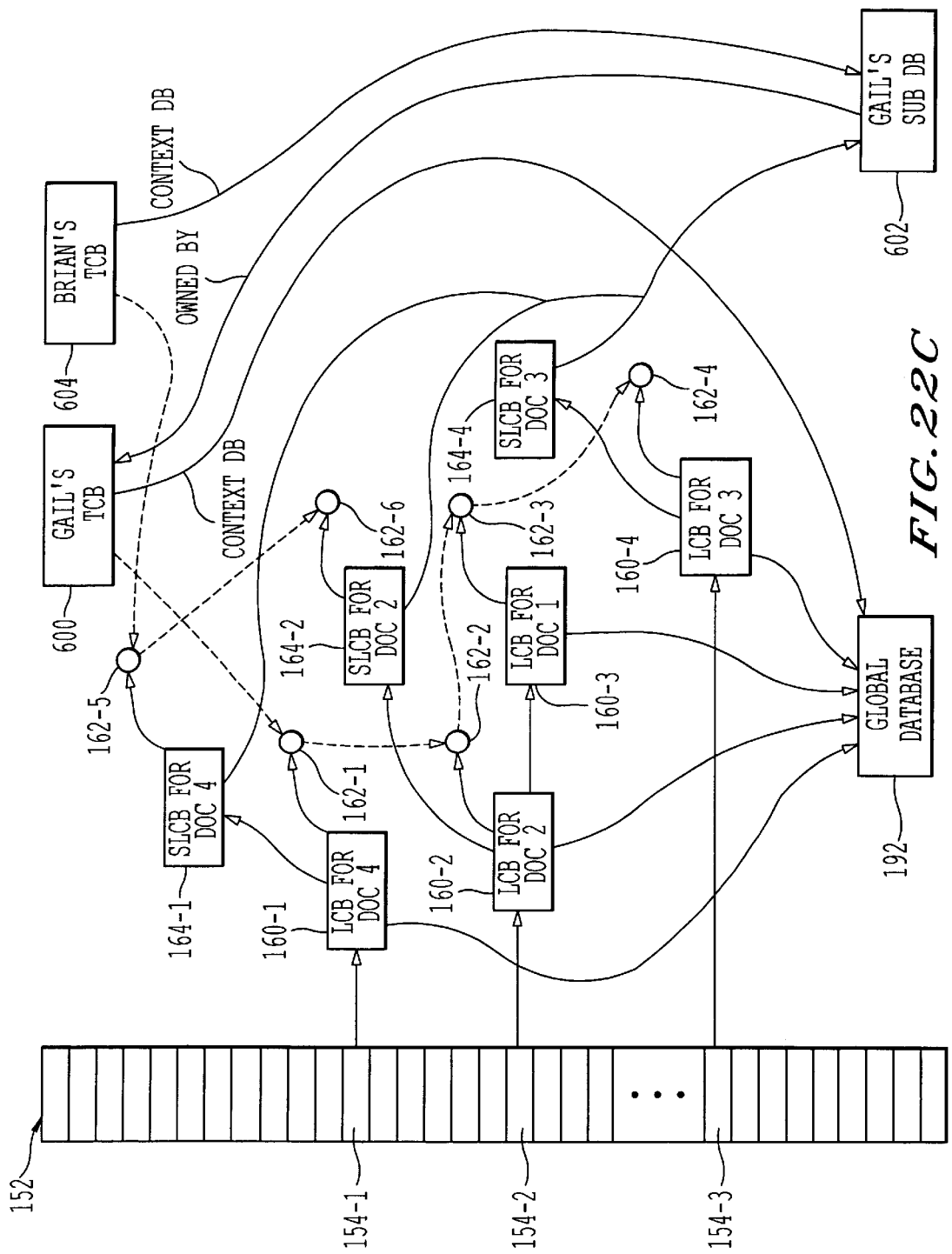

Referring to FIG. 22C, Brian has started a transaction within Gail's subdatabase, and Brian's transaction is represented by Brian's TCB 604 at the upper right-hand portion of FIG. 22C. Brian's transaction, in this particular example, can access only documents 2, 3 and 4 as these are the documents of Gail's subdatabase which Brian's transaction has permission to access. However, an implementation of this invention may allow Gail to dynamically grow her database by adding more documents to it, even after another such as Brian begins a transaction within the subdatabase. In FIG. 22C, Brian has placed write locks on documents 2 and 4, and has full edit capabilities for those documents. Thus, Gail can see what Brian is doing to the documents, but she cannot directly overwrite his changes. The ability for Brian to have a write lock on documents 2 and 4 is represented by the broken or dashed arrows or references from Brian's TCB 604 to the LRB 162-5 for document 4, which references an LRB 162-6 for document 2. Also seen in FIG. 22C is Brian's TCB 604 referencing Gail's subdatabase (or DBCB) 602, which indicates that the context database for Brian's TCB is Gail's subdatabase.

Figure 22D:
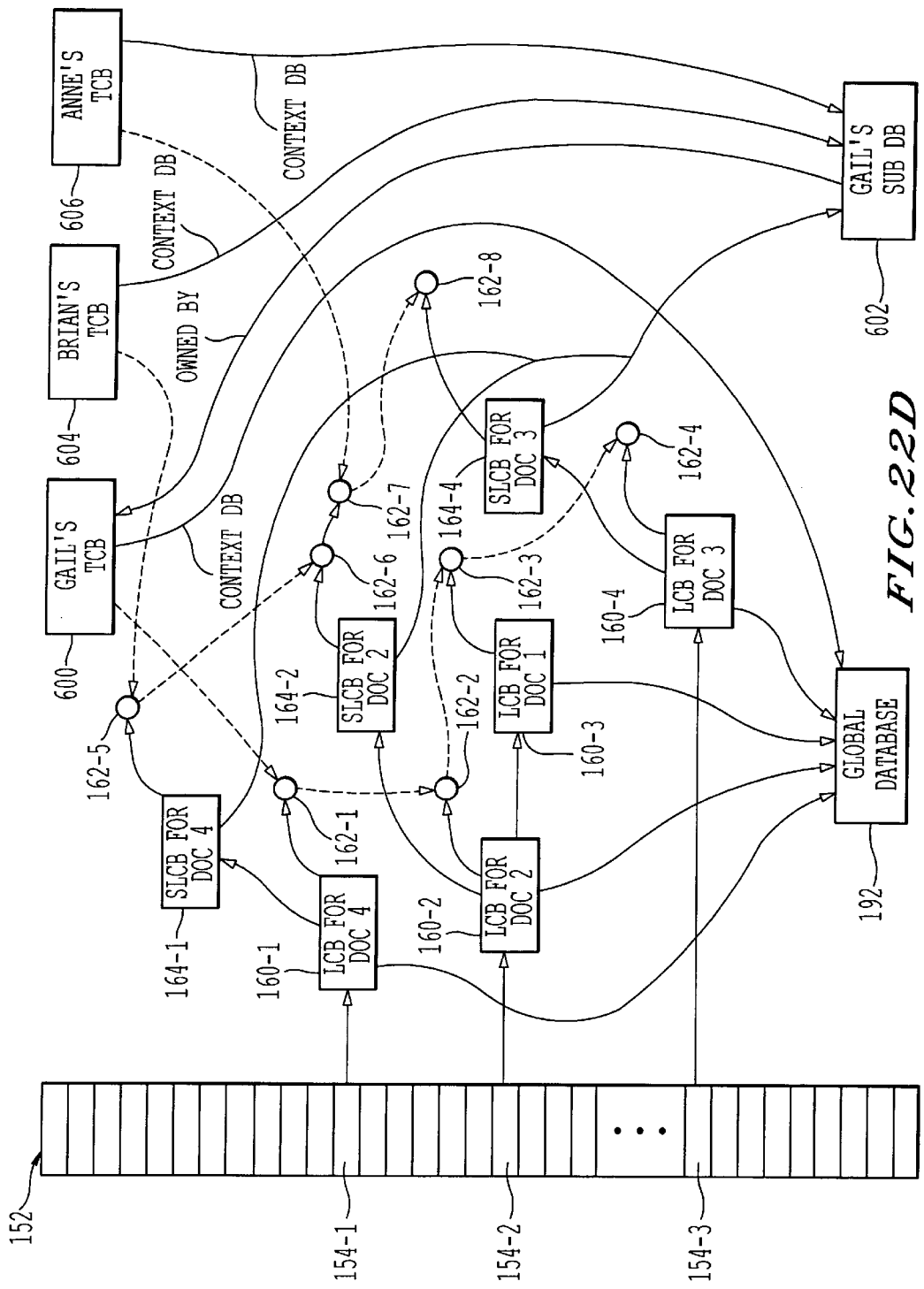

Referring to FIG. 22D which corresponds to the arrangement and access capabilities indicated in FIG. 21D, Anne has started a transaction in Gail's subdatabase. Like Brian's transaction, Anne's transaction can only access documents 2, 3 and 4, unless Gail chooses to dynamically grow her subdatabase by adding more documents to it. At this time, Anne has a write lock on document 3 and a read lock on document 2. This information may be represented by the LRB 162-7 and the LRB 162-8. The LRB 162-7 which is for the SLCB for document 2 would indicate the read lock, and the LRB 162-8 for document 3 would have its mode set to indicate the write lock. At this point in time, Anne can edit only document 3, but she can browse all the changes that Brian is making to document 2. If desired, Anne could also browse document 4, and likewise Brian could browse document 3, if desired. It is seen that Anne's TCB 606, in addition to referencing the LRBs 162-7 and 162-8, also references Gail's subdatabase 602 by the context database reference.

Figure 23A:
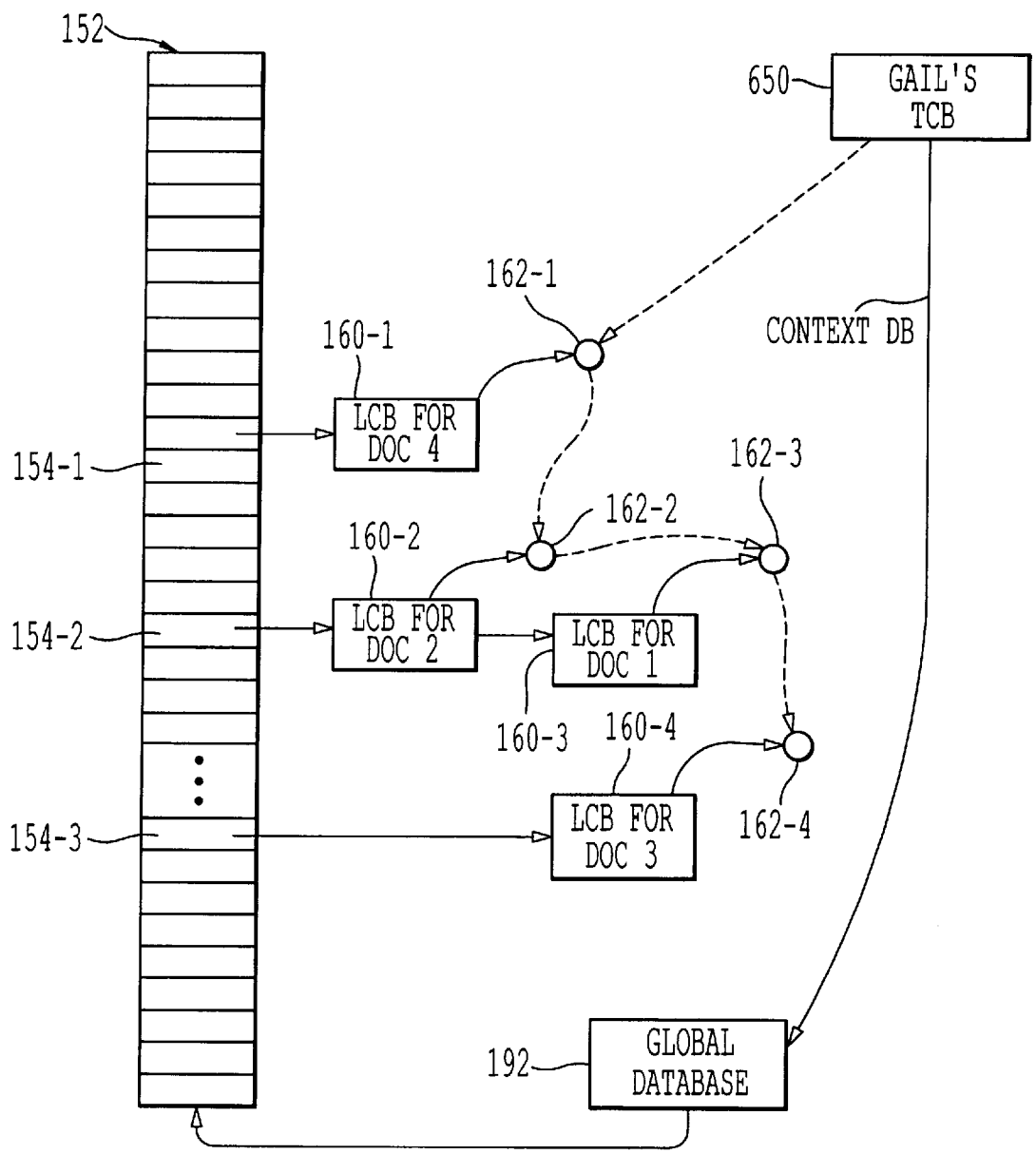

FIGS. 23A–23D illustrate an alternative implementation in which the data structures illustrated in FIG. 11 are utilized to carry out the example of FIGS. 21A–21D. In FIG. 23A, which corresponds to FIG. 21A, there are LCBs 160-1 through 160-4 for the four documents at issue, and each LCB references a corresponding LRB 162. Gail's TCB 650 references the LRBs 162, and also Gail's TCB 650 references or indicates that its context database is the Global Database 192.

In FIG. 23B which corresponds to FIG. 21B, Gail creates a subdatabase, and by doing this, a database control block 652 is created which is for Gail's subdatabase. Gail's subdatabase DBCB 652 references Gail's TCB 650, indicating that Gail's subdatabase is owned by Gail's transaction, and also Gail's subdatabase 652 references the hash table, array, or other structures 654. This structure 654 has therein SLCBs 164-1, 164-2, and 164-3 for the three documents which are part of Gail's subdatabase. The SLCBs 164 are referenced by references 656, 658, and 660 of the table 654.

In FIG. 23C which corresponds to FIG. 21C, Brian's transaction comes into existence and is represented by Brian's TCB 670 which references Gail's subdatabase control block 652 and indicates that the context database of Brian's TCB 670 or transaction is Gail's subdatabase 652. Brian obtains a lock on documents 2 and 4 which are represented by the LRBs 160-5 and 160-6, respectively.

Figure 23D:
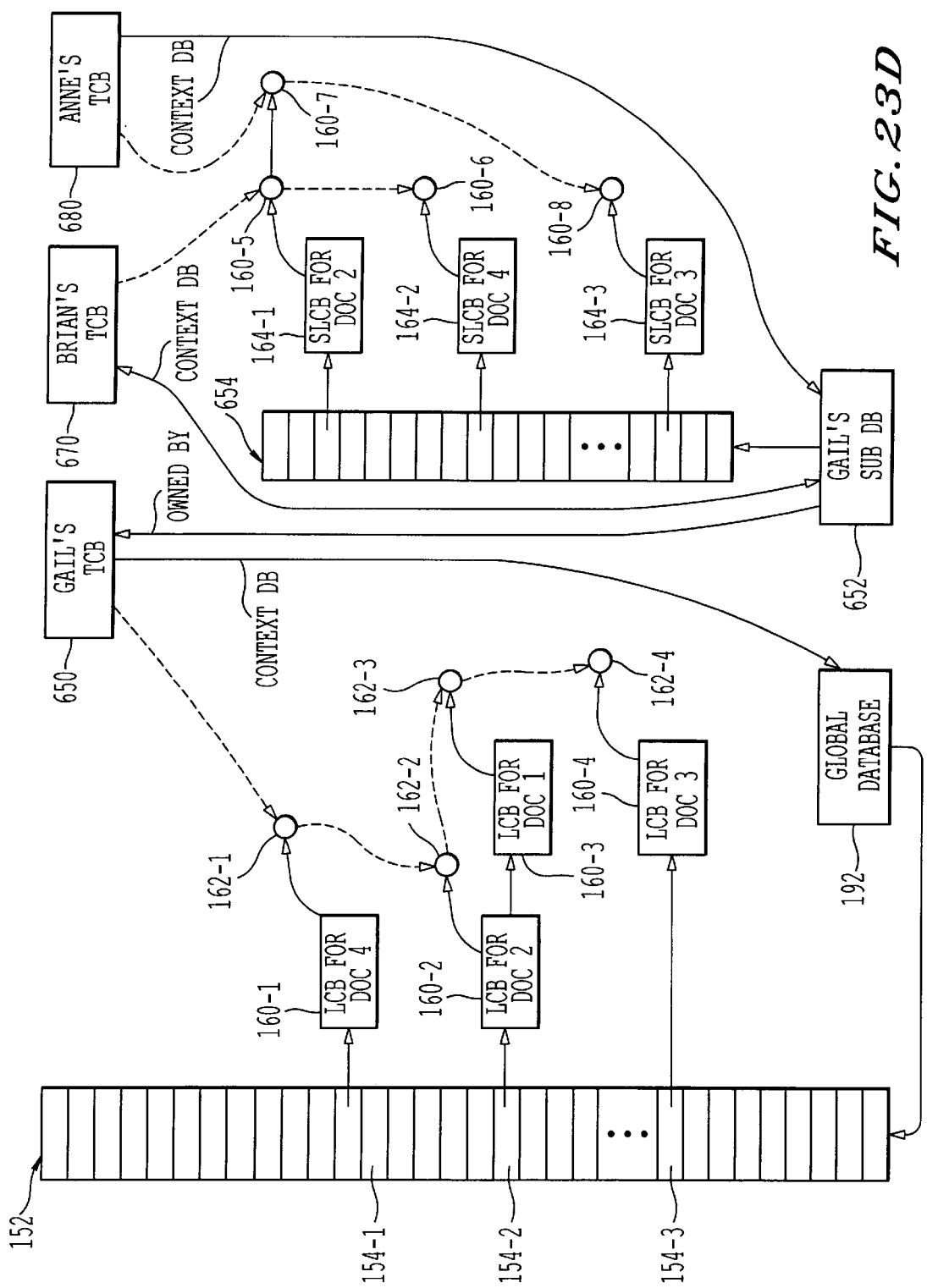

In FIG. 23D, which corresponds to the arrangement of FIG. 21D, Anne's transaction comes into existence and has Gail's subdatabase as its context database. This is indicated by the context DB reference of Anne's TCB 680 referencing Gail's DBCB 652. Additionally, Anne has certain rights to documents 2 and 3, and this is represented within the data structures by Anne's TCB 680 referencing the LRBs 160-7 and 160-8 for documents 2 and 3, respectively. The LRBs 160-7 and 160-8 would have their fields set to indicate the read only or write capabilities of access which Anne has.

The above examples described with respect to FIGS. 21A–23D pertains to the locking and sharing of different documents. However, the invention is not limited to sharing on a file or document level, but may be utilized to share a single file, document, engineering plans, etc. among a plurality of users or entities. Achieving an implementation in which a single file, document, or other data item is shared within the framework of nested databases disclosed herein relates to the issue of locking granularity, i.e., relating to what the resources the locking data structures or LCBs are representing. Thus, the present invention allows the locking of smaller sections of a file or document such as on the paragraph level, on the sentence level, or even going to the extreme of locking individual words, characters or, bits. Moreover, outside of the document processing or word processing environment, different portions of an engineering drawing could be shared on a CAD/CAM system or any other system.

In the example presented with respect to FIGS. 24A–24D, (and if desired, the earlier examples), Brian's transaction and Anne's transaction are actually subtransactions of Gail's transaction. Thus, a default assumption could be that each of the transactions Gail, Brian and Anne will all be locking at the same granularity as Gail's top-level transaction. However, as an alternative, it would be feasible to let Gail lock at the section level, and at the same time, have other independent top-level transactions that lock at the document or paragraph level. The concept of locking with multi-granularity is known, but with the present invention, both multi-granularity locking and the concept of nested databases may be utilized together and these concepts are generally considered to be orthogonal to each other (e.g., independent of each other). Further information on multi-granularity locking may be found in the Anfindsen thesis, referenced below.

Figure 24D:
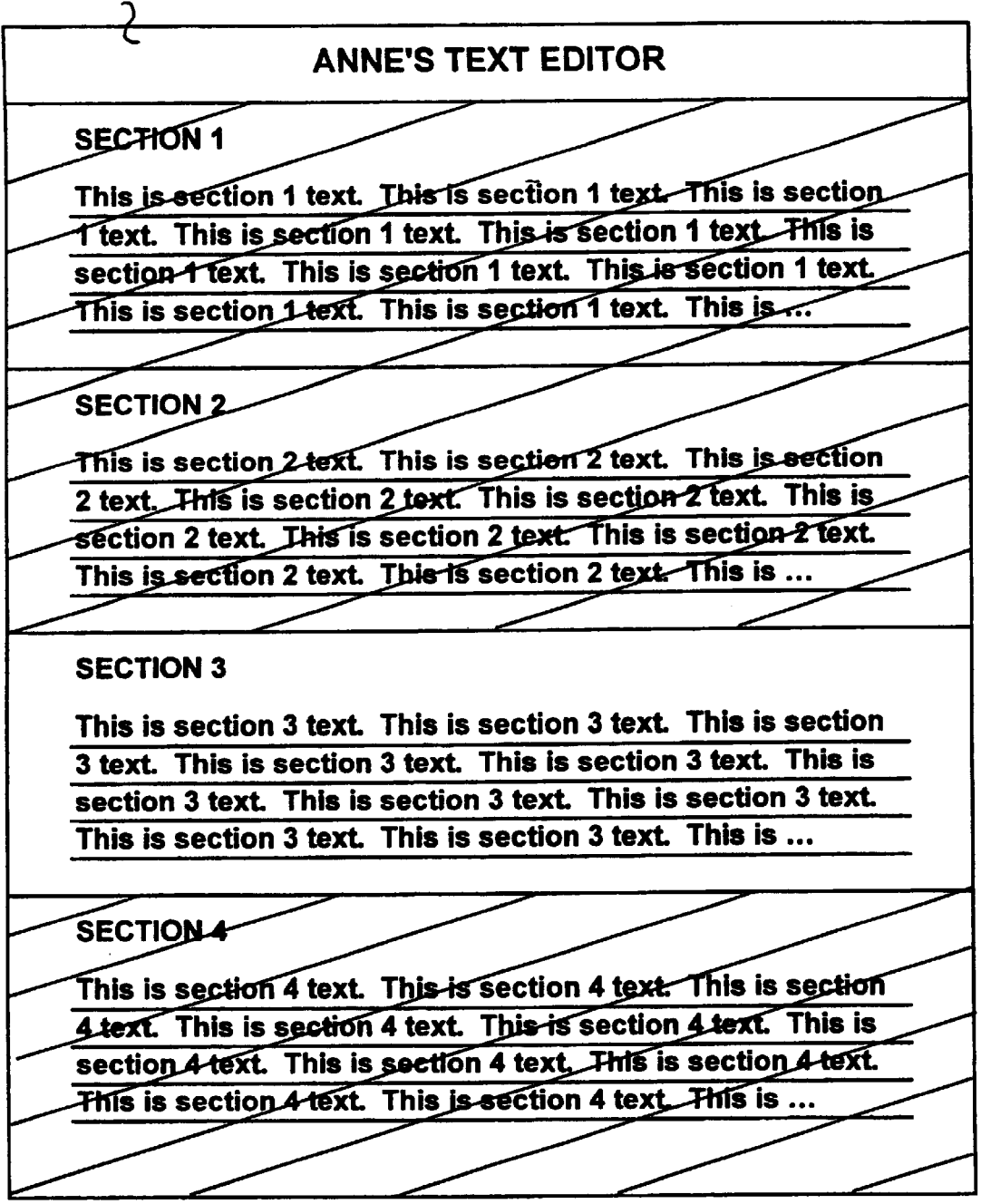

Turning now to the example of FIGS. 24A–24D, FIG. 24A illustrates an exemplarily screen image 710 of Gail's text editor. The text of the document at issue has four sections indicated by Section 1, Section 2, Section 3 and Section 4. In FIG. 24A, Gail has locked all sections of the illustrated document and has full edit capabilities of the entire document. In each section, sample text is illustrated, but any desired text may be used.

In FIG. 24B, a screen image 720 again shows Gail's text editor but in this image, Gail has delegated sections 2, 3 and 4 to a subdatabase, and those sections have now become read-only in her editor, indicated by the diagonal lines through sections 2, 3 and 4.

In FIG. 24C, a screen image 730 illustrates Brian's text editor. With regard to FIG. 24C, Brian has accessed Gail's document through-her subdatabase (in which he has been authorized by Gail to work). Brian has successfully requested write locks on sections 2 and 4, so that they are editable in his editor, while sections 1 and 3 are read-only.

It should be noted that the diagonal lines through the read-only sections of the document are for illustration purposes only and there is no requirement to have such diagonal lines crossing through the text. However, in a preferred embodiment, it maybe desirable to show that certain sections are locked and others are not. This may be accomplished by utilizing different colors of the text or background of the text for different types or modes of locks or access capabilities. For example, a color could be assigned to each person and each section or other portion of the document will be colored in accordance with the person or entity having the write lock on the data. Alternatively, a single color may be utilized to designate the section(s) of the document which are read-only.

Last, in FIG. 24D, a screen image 740 is illustrated which shows Anne's text editor. Anne has accessed Gail's document through her subdatabase (in which she has been authorized by Gail to work). Anne has successfully requested write locks on section 3, so it is editable in her editor, while sections 1, 2 and 4 are read-only.

The invention may be conveniently implemented using one or more conventional general purpose digital computers programmed according to the teachings of the specification, as will be apparent to those skilled in the computer art. Appropriate software coding can readily be prepared by skilled programmers based on the teachings of the present disclosure, as will be apparent to those skilled in the art. The invention may also be implemented by the preparation of application specific integrated circuits or by connecting an appropriate network of conventional component circuits, as will be readily apparent to those skilled in the art. Moreover, the invention may be implemented using a plurality of computers, computing devices, or other type of devices. These devices may be connected through any type of network in order to communicate data, instructions, requests for data, and any other information related to the operation of the database management system. Such a computer network may be implemented, as desired, using a wired network, a wireless network such as radio frequency, infrared, or ultrasonic type networks. As an alternative to, or in addition to using general purpose computers, the present invention is envisioned as being implemented using any type of device including personal digital assistants, such as the Palm Pilot, Internet servers, special purpose computers, and any type of Internet browser, including telephonic browsers.

The present invention includes a computer program product which is a storage medium including instructions that can be used to program a computer to perform the process of the present invention. The storage medium can include, but is not limited to, any type of disk including floppy disks, optical discs, CD-ROMs, magneto-optical disks, ROMs, RAMs, EPROMs, EEPROMs, flash memory, magnetic or optical cards, or any type of media that is suitable for storing electronic instructions including hard disk drives. The present invention also includes the data structures which are described herein, and may be stored in any of the memories or storage mediums discussed in this application.

While the present invention has been described with reference to specific preferred embodiments, it will be understood by those skilled in the art that various changes may be made and equivalence may be substituted for elements without departing from the true scope and spirit of the invention. For example, while the present invention describes data structures stored in a memory, it would be equivalent to store that data structures in a plurality of memories. Moreover, the present invention contemplates combining the data structures, if desired.

The present invention builds upon techniques and theories which have been previously described by the inventor in various publications. These publications include "Apotram—an Application Oriented Transaction Model", Doctor Scient Thesis, Ole Jørgen Anfindsen, 1997, "Supporting Cooperative Work in Multimedia Conferences by Means of Nested Databases", Ole Jørgen Anfindsen, Proceedings of Norwegian Computer Science Conference—NIK '96, 1996, pp. 311–322, and "Cooperative Work Support in Engineering Environment by Means of Nested Databases," Ole Jørgen Anfindsen, Proceedings of CEEDA, 1996, Poole, UK, pp. 325–330, each of which is incorporated by reference, as is each of the references cited in these publications. Each of the applications and explanations in these publications may be implemented by or utilized with the present invention. Further, the earlier U.S. Patents by the present inventor including U.S. Pat. Nos. 5,983,225 and 6,044,370 are incorporated by reference and may be used together with or separate from the present invention.

What is claimed as new and desired to be secured by Letters Patent of the United States is:

1. A method for processing and managing requests for concurrent access to at least one data resource present in a database in a multiuser environment, wherein access to said at least one data resource is requested through a first transaction operating within a context of the database, comprising:

creating, at a first hierarchical level representing the database, a first data structure representing a lock status of a data resource present in the database, setting one or more fields of said first data structure to indicate that said data resource is locked by said first transaction;

creating, at a second hierarchical level representing a subdatabase of said database, a second data structure representing a lock status of said data resource within the subdatabase, wherein the created subdatabase comprises a subset of the at least one data resource in the database and the created subdatabase includes at least said data resource;

creating an association between said first data structure at said first hierarchical level and said second data structure at said second hierarchical level;

setting one or more fields of said second data structure at said second hierarchical level to indicate that said data resource is not locked and is accessible to transactions operating within a context of the subdatabase; and granting access to said data resource to a second transaction operating within said context of the subdatabase by indicating in said second data structure that said data resource is locked at said second hierarchical level.

2. The method of claim 1, further comprising:

creating, at the second hierarchical level, a third data structure representing the subdatabase;

setting one or more fields in said third data structure to reference the first transaction operating within the context of the database; and setting one or more fields in the second data structure representing the lock status of the data resource in the subdatabase to reference the third data structure representing the subdatabase.

3. The method of claim 1, wherein:

the lock status on said first hierarchical level remains unchanged by any change in lock status on said second hierarchical level; and any modification of said data resource by a transaction operating within the context of the subdatabase remains uncommitted to the database until the lock on said first hierarchical level is released and the data resource is committed by the first transaction operating within the context of the database.

4. The method of claim 1, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure representing the lock status of the data resource in the subdatabase.

5. A method according to claim 1, wherein the step of creating an association comprises:

creating a reference in a field of the first data structure at said first hierarchical level that references the second data structure at said second hierarchical level.

6. A method for processing and managing requests for concurrent access to at least one data resource present in a database in a multiuser environment, wherein access to said at least one data resource is requested through a first transaction operating within a context of the database, comprising:

creating, at a first hierarchical level representing the database, a first data structure representing a lock status of a data resource present in the database;

setting one or more fields of said first data structure to indicate that said data resource is locked by said first transaction;

creating, at a second hierarchical level representing a subdatabase of said database, an association between said data resource and a search data structure, wherein the created subdatabase comprises a subset of the at least one data resource in the database, the created subdatabase includes at least said data resource, and the search data structure includes references to lock control blocks of the created subdatabase;

creating, at said second hierarchical level, a second data structure representing a lock status of said data resource within the subdatabase, and setting a field in said search data structure to reference said second data structure;

setting one or more fields of said second data structure to indicate that said data resource is not locked and is accessible to transactions operating within a context of the subdatabase; and granting access to said data resource to a second transaction operating within said context of the subdatabase by indicating in said second data structure that said data resource is locked at said second hierarchical level.

7. The method of claim 6, further comprising:

creating, at the second hierarchical level, a third data structure representing the subdatabase;

setting one or more fields in said third data structure to reference the first transaction operating within the context of the database;

setting one or more fields in said third data structure to reference said search data structure at said second hierarchical level; and setting one or more fields in the second data structure representing the lock status of the data resource to the subdatabase to reference the third data structure representing the subdatabase.

8. The method of claim 6, wherein:

the lock status on said first hierarchical level remains unchanged by any change in lock status on said second hierarchical level; and any modification of said data resource by a transaction operating within the context of the subdatabase remains uncommitted to the database until said lock on said first hierarchical level is released and the data resource is committed by the first transaction operating within the context of the database.

9. The method of claim 6, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure.

10. A method for controlling and monitoring locking of a data resource in a system of hierarchical databases, comprising:

requesting access to said data resource through a transaction;

determining if a data structure representing a lock status of said data resource exists and indicating said data resource is locked at a first hierarchical level representing a database, wherein the database includes at least said data resource;

creating, at said first hierarchical level, a first data structure representing the lock status of said data resource, when the determining step determines that the data structure representing the lock status of said data resource does not exist at said first hierarchical level, and setting one or more fields of said first data structure to indicate that said data resource is locked by the transaction operating within a context of the database;

checking whether a reference exists within said data structure to a second data structure that represents a lock status of said data resource at a second hierarchical level, the second hierarchical level representing a subdatabase, wherein the subdatabase comprises a subset of the at least said data resource in the database, when the determining step determines that the data structure does exist at said first hierarchical level;

following the reference to the second data structure when the checking step determines that the reference exists; and examining if conflicting locks are indicated by one or more fields of said second data structure, and, when conflicting locks are not indicated, setting the one or more fields of said second data structure to indicate that said data resource is locked by the transaction operating within a context of the subdatabase.

11. The method of claim 10, wherein the creating step comprises:

creating a reference from a search data structure to the first data structure representing the lock status of said data resource at the first hierarchical level.

12. A computer-implemented system tangibly embodied in a computer readable medium for processing and managing requests for concurrent access to at least one data resource present in a database in a multiuser environment, wherein access to said at least one data resource is requested through a first transaction operating within a context of the database, comprising:

means for creating, at a first hierarchical level representing the database, a first data structure representing a lock status of a data resource present in the database;

means for setting one or more fields of said first data structure to indicate that said data resource is locked by said first transaction;

means for creating, at a second hierarchical level representing a subdatabase of said database, a second data structure representing a lock status of said data resource within the subdatabase, wherein the created subdatabase comprises a subset of the at least one data resource in the database and the created subdatabase includes at least said data resource;

means for creating an association between said first data structure at said first hierarchical level and said second data structure at said second hierarchical level;

means for setting one or more fields of said second data structure at said second hierarchical level to indicate that said data resource is not locked and is accessible to transactions operating within a context of the subdatabase; and means for granting access to said data resource to a second transaction operating within said context of the subdatabase by indicating in said second data structure that said data resource is locked at said second hierarchical level.

13. The system of claim 12, further comprising: p1 means for creating, at the second hierarchical level, a third data structure representing the subdatabase;

means for setting one or more fields in said third data structure to reference the first transaction operating within the context of the database; and means for setting one or more fields in the second data structure representing the lock status of the data resource in the subdatabase to reference the third data structure representing the subdatabase.

14. The system of claim 12, wherein:

the lock status on said first hierarchical level remains unchanged by any change in lock status on said second hierarchical level; and any modification of said data resource by a transaction operating within the context of the subdatabase remains uncommitted to the database until the lock on said first hierarchical level is released and the data resource is committed by the first transaction operating within the context of the database.

15. The system of claim 12, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure representing the lock status of the data resource in the subdatabase.

16. The system of claim 12, wherein the means for creating an association comprises:

means for creating a reference in a field of the first data structure at said first hierarchical level that references the second data structure at said second hierarchical level.

17. A computer-implemented system tangibly embodied in a computer readable medium for processing and managing requests for concurrent access to at least one data resource present in a database in a multiuser environment, wherein access to said at least one data resource is requested through a first transaction operating within a context of the database, comprising:

mean for creating, at a first hierarchical level representing the database, a first data structure representing a lock status of a data resource present in the database;

mean for setting one or more fields of said first data structure to indicate that said data resource is locked by said first transaction;

mean for creating, at a second hierarchical level representing a subdatabase of said database, an association between said data resource and a search data structure, wherein the created subdatabase comprises a subset of the at least one data resource in the database, the created subdatabase includes at least said data resource, and the search data structure includes references to lock control blocks of the created subdatabase;

mean for creating, at said second hierarchical level, a second data structure representing a lock status of said data resource within the subdatabase, and setting a field in said search data structure to reference said second data structure;

mean for setting one or more fields of said second data structure to indicate that said data resource is not locked and is accessible to transactions operating within a context of the subdatabase; and mean for granting access to said data resource to a second transaction operating within said context of the subdatabase by indicating in said second data structure that said data resource is locked at said second hierarchical level.

18. The system of claim 17, further comprising:

means for creating, at the second hierarchical level, a third data structure representing the subdatabase;

means for setting one or more fields in said third data structure to reference the first transaction operating within the context of the database;

means for setting one or more fields in said third data structure to reference said search data structure at said second hierarchical level; and means for setting one or more fields in the second data structure representing the lock status of the data resource to the subdatabase to reference the third data structure representing the subdatabase.

19. The system of claim 17, wherein:

the lock status on said first hierarchical level remains unchanged by any change in lock status on said second hierarchical level; and any modification of said data resource by a transaction operating within the context of the subdatabase remains uncommitted to the database until said lock on said first hierarchical level is released and the data resource is committed by the first transaction operating within the context of the database.

20. The system of claim 17, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure.

21. A system tangibly embodied in a computer readable medium for controlling and monitoring locking of a data resource in a system of hierarchical databases, comprising:

means for requesting access to said data resource through a transaction;

means for determining if a data structure representing a lock status of said data resource exists and indicating said data resource is locked at a first hierarchical level representing a database, wherein the database includes at least said data resource;

means for creating, at said first hierarchical level, a first data structure representing the lock status of said data resource, when the determining step determines that the data structure representing the lock status of said data resource does not exist at said first hierarchical level, and setting one or more fields of said first data structure to indicate that said data resource is locked by the transaction operating within a context of the database;

means for checking whether a reference exists within said data structure to a second data structure that represents a lock status of said data resource at a second hierarchical level, the second hierarchical level representing a subdatabase, wherein the subdatabase comprises a subset of the at least said data resource in the database, when the determining step determines that the data structure does exist at said first hierarchical level;

means for following the reference to the second data structure when the checking step determines that the reference exists; and means for examining if conflicting locks are indicated by one or more fields of said second data structure, and, when conflicting locks are not indicated, setting the one or more fields of said second data structure to indicate that said data resource is locked by the transaction operating within the context of the subdatabase.

22. The system of claim 21, wherein said means for creating comprises:

means for creating a reference from a search data structure to the first data structure representing the lock status of said data resource at the first hierarchical level.

23. A computer program product having a computer readable program code means therein for processing and managing requests for concurrent access to at least one data resource present in a database in a multiuser environment, wherein access to said at least one data resource is requested through a first transaction operating within a context of the database, comprising:

means for creating, at a first hierarchical level representing the database, a first data structure representing a lock status of a data resource present in the database;

means for setting one or more fields of said first data structure to indicate that said data resource is locked by said first transaction;

means for creating, at a second hierarchical level representing a subdatabase of said database, a second data structure representing a lock status of said data resource within the subdatabase, wherein the created subdatabase comprises a subset of the at least one data resource in the database and the created subdatabase includes at least said data resource;

means for creating an association between said first data structure at said first hierarchical level and said second data structure at said second hierarchical level;

means for setting one or more fields of said second data structure at said second hierarchical level to indicate that said data resource is not locked and is accessible to transactions operating within a context of the subdatabase; and means for granting access to said data resource to a second transaction operating within said context of the subdatabase by indicating in said second data structure that said data resource is locked at said second hierarchical level.

24. The computer program product of claim 23, further comprising:

means for creating, at the second hierarchical level, a third data structure representing the subdatabase;

means for setting one or more fields in said third data structure to reference the first transaction operating within the context of the database; and means for setting one or more fields in the second data structure representing the lock status of the data resource in the subdatabase to reference the third data structure representing the subdatabase.

25. The computer program product of claim 23, wherein:

the lock status on said first hierarchical level remains unchanged by any change in lock status on said second hierarchical level; and any modification of said data resource by a transaction operating within the context of the subdatabase remains uncommitted to the database until the lock on said first hierarchical level is released and the data resource is committed by the first transaction operating within the context of the database.

26. The computer program product of claim 23, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure representing the lock status of the data resource in the subdatabase.

27. The computer program product of claim 23 wherein the means for creating an association comprises:

means for creating a reference in a field of the first data structure at said first hierarchical level which references the second data structure at said second hierarchical level.

28. A computer program product having a computer readable program code means therein for processing and managing requests for concurrent access to at least one data resource present in a database in a multiuser environment, wherein access to said at least one data resource is requested through a first transaction operating within a context of the database, comprising:

mean for creating, at a first hierarchical level representing the database, a first data structure representing a lock status of a data resource present in the database;

mean for setting one or more fields of said first data structure to indicate that said data resource is locked by said first transaction;

mean for creating, at a second hierarchical level representing a subdatabase of said database, an association between said data resource and a search data structure, wherein the created subdatabase comprises a subset of the at least one data resource in the database, the created subdatabase includes at least said data resource, and the search data structure includes references to lock control blocks of the created subdatabase;

mean for creating, at said second hierarchical level, a second data structure representing a lock status of said data resource within the subdatabase, and setting a field in said search data structure to reference said second data structure;

mean for setting one or more fields of said second data structure to indicate that said data resource is not locked and is accessible to transactions operating within a context of the subdatabase; and mean for granting access to said data resource to a second transaction operating within said context of the subdatabase by indicating in said second data structure that said data resource is locked at said second hierarchical level.

29. The computer program product of claim 28, further comprising:

means for creating, at the second hierarchical level, a third data structure representing the subdatabase;

means for setting one or more fields in said third data structure to reference the first transaction operating within the context of the database;

means for setting one or more fields in said third data structure to reference said search data structure at said second hierarchical level; and means for setting one or more fields in the second data structure representing the lock status of the data resource to the subdatabase to reference the third data structure representing the subdatabase.

30. The computer program product of claim 28, wherein:

the lock status on said first hierarchical level remains unchanged by any change in lock status on said second hierarchical level; and any modification of said data resource by a transaction operating within the context of the subdatabase remains uncommitted to the database until said lock on said first hierarchical level is released and the data resource is committed by the first transaction operating within the context of the database.

31. The computer program product of claim 28, wherein a release of the lock on the data resource at said first hierarchical level by said first transaction operating within the context of the database must be preceded by (1) a release of any lock on the data resource at said second hierarchical level by transactions operating within the context of the subdatabase, and (2) a deallocation of said second data structure.

32. A computer program product having a computer readable program code means therein for controlling and monitoring locking of a data resource in a system of hierarchical databases, comprising:

means for requesting access to said data resource through a transaction;

means for determining if a data structure representing a lock status of said data resource exists and indicating said data resource is locked at a first hierarchical level representing a database, wherein the database includes at least said data resource;

means for creating, at said first hierarchical level, a first data structure representing the lock status of said data resource, when the determining step determines that the data structure representing the lock status of said data resource does not exist at said first hierarchical level, and setting one or more fields of said first data structure to indicate that said data resource is locked by the transaction operating within a context of the database;

means for checking whether a reference exists within said data structure to a second data structure that represents a lock status of said data resource at a second hierarchical level, the second hierarchical level representing a subdatabase, wherein the subdatabase comprises a subset of the at least said data resource in the database; when the determining step determines that the data structure does exist at said first hierarchical level;

means for following the reference to the second data structure when the checking step determines that the reference exists; and means for examining if conflicting locks are indicated by one or more fields of said second data structure, and, when conflicting locks are not indicated, setting the one or more fields of said second data structure to indicate that said data resource is locked by the transaction operating within the context of the subdatabase.

33. The computer program product of claim 32, wherein said means for creating comprises:

means for creating a reference from a search data structure to the first data structure representing the lock status of said data resource at the first hierarchical level.

* * * * *